(12) United States Patent
Bernstein et al.

(10) Patent No.: US 12,456,271 B1
(45) Date of Patent: Oct. 28, 2025

(54) SYSTEM AND METHOD OF THREE-DIMENSIONAL OBJECT CLEANUP AND TEXT ANNOTATION

(71) Applicant: Apple Inc., Cupertino, CA (US)

(72) Inventors: Jeremy R. Bernstein, San Francisco, CA (US); Michelle Chua, Seattle, WA (US); Arnold H. Cachelin, Sunnyvale, CA (US); Eric Geusz, San Francisco, CA (US); Karen N. Wong, Sunnyvale, CA (US); Novaira Masood, San Jose, CA (US); Zachary Z. Becker, Kirkland, WA (US); Shem Nguyen, Oakland, CA (US)

(73) Assignee: Apple Inc., Cupertino, CA (US)

( * ) Notice: Subject to any disclaimer, the term of this patent is extended or adjusted under 35 U.S.C. 154(b) by 421 days.

(21) Appl. No.: 18/057,172

(22) Filed: Nov. 18, 2022

Related U.S. Application Data

(60) Provisional application No. 63/264,327, filed on Nov. 19, 2021.

(51) Int. Cl.
  *G06T 19/20* (2011.01)
(52) U.S. Cl.
  CPC ........ *G06T 19/20* (2013.01); *G06T 2219/004* (2013.01); *G06T 2219/2016* (2013.01)
(58) Field of Classification Search
  CPC ............... G06T 19/20; G06T 2219/004; G06T 2219/2016
  See application file for complete search history.

(56) References Cited

U.S. PATENT DOCUMENTS

| | | |
|---|---|---|
| 1,173,824 A | 2/1916 | Mckee |
| 5,015,188 A | 5/1991 | Pellosie et al. |

(Continued)

FOREIGN PATENT DOCUMENTS

| | | |
|---|---|---|
| CA | 3033344 A1 | 2/2018 |
| CN | 102298493 A | 12/2011 |

(Continued)

OTHER PUBLICATIONS

Adding Environments, Available online at: https://manual.keyshot.com/manual/environments/adding-environments/, [retrieved on Jun. 9, 2023], 2 pages.

(Continued)

*Primary Examiner* — Said Broome
*Assistant Examiner* — Andrew Shin
(74) *Attorney, Agent, or Firm* — Kubota & Basol LLP

(57) ABSTRACT

Some examples of the disclosure are directed to object manipulators and associated processes for manipulating an object representation in a three-dimensional environment. The object representation may correspond to a scan of a real-world object in a real-world environment. The object manipulators may include an object cleanup manipulator and a text annotation manipulator. The object cleanup manipulator may be selectable to display one or more control affordances providing functionality for selectively removing portions of the object representation in the three-dimensional environment and/or selectively adjusting one or more parameters of the object representation in the three-dimensional environment. The text annotation manipulator may be selectable to display one or more control affordances providing functionality for selectively generating one or more text labels in the three-dimensional environment. The one or more text labels may be associated with the object representation in the three-dimensional environment.

20 Claims, 27 Drawing Sheets

(56) References Cited

U.S. PATENT DOCUMENTS

| | | |
|---|---|---|
| 5,422,812 A | 6/1995 | Knoll et al. |
| 5,515,488 A | 5/1996 | Hoppe et al. |
| 5,524,195 A | 6/1996 | Clanton et al. |
| 5,610,828 A | 3/1997 | Kodosky et al. |
| 5,737,553 A | 4/1998 | Bartok |
| 5,740,440 A | 4/1998 | West |
| 5,751,287 A | 5/1998 | Hahn et al. |
| 5,758,122 A | 5/1998 | Corda et al. |
| 5,794,178 A | 8/1998 | Caid et al. |
| 5,809,267 A | 9/1998 | Moran et al. |
| 5,877,766 A | 3/1999 | Bates et al. |
| 5,880,411 A | 3/1999 | Gillespie et al. |
| 5,900,849 A | 5/1999 | Gallery |
| 5,933,143 A | 8/1999 | Kobayashi |
| 5,990,886 A | 11/1999 | Serdy et al. |
| 6,061,060 A | 5/2000 | Berry et al. |
| 6,078,310 A | 6/2000 | Tognazzini |
| 6,108,004 A | 8/2000 | Medl |
| 6,112,015 A | 8/2000 | Planas et al. |
| 6,154,559 A | 11/2000 | Beardsley |
| 6,167,433 A | 12/2000 | Maples et al. |
| 6,295,069 B1 | 9/2001 | Shirur |
| 6,426,745 B1 | 7/2002 | Isaacs et al. |
| 6,456,296 B1 | 9/2002 | Cataudella et al. |
| 6,584,465 B1 | 6/2003 | Zhu et al. |
| 6,750,873 B1 | 6/2004 | Bernardini et al. |
| 6,756,997 B1 | 6/2004 | Ward et al. |
| 7,035,903 B1 | 4/2006 | Baldonado |
| 7,096,120 B2 | 8/2006 | Hull |
| 7,134,130 B1 | 11/2006 | Thomas |
| 7,137,074 B1 | 11/2006 | Newton et al. |
| 7,230,629 B2 | 6/2007 | Reynolds et al. |
| 7,298,370 B1 | 11/2007 | Middler et al. |
| 7,580,576 B2 | 8/2009 | Wang et al. |
| 7,634,718 B2 | 12/2009 | Nakajima |
| 7,706,579 B2 | 4/2010 | Oijer |
| 7,721,226 B2 | 5/2010 | Barabe et al. |
| 8,341,541 B2 | 12/2012 | Holecek et al. |
| 8,436,872 B2 | 5/2013 | Wright et al. |
| 8,593,558 B2 | 11/2013 | Gardiner et al. |
| 8,724,856 B1 | 5/2014 | King |
| 8,730,156 B2 | 5/2014 | Weising et al. |
| 8,793,620 B2 | 7/2014 | Stafford |
| 8,793,729 B2 | 7/2014 | Adimatyam et al. |
| 8,803,873 B2 | 8/2014 | Yoo et al. |
| 8,866,880 B2 | 10/2014 | Tan et al. |
| 8,896,632 B2 | 11/2014 | Macdougall et al. |
| 8,947,323 B1 | 2/2015 | Raffle et al. |
| 8,970,478 B2 | 3/2015 | Johansson |
| 8,970,629 B2 | 3/2015 | Kim et al. |
| 8,994,718 B2 | 3/2015 | Latta et al. |
| 9,007,301 B1 | 4/2015 | Raffle et al. |
| 9,108,109 B2 | 8/2015 | Pare et al. |
| 9,158,115 B1 | 10/2015 | Worley et al. |
| 9,164,975 B2 | 10/2015 | Milewski et al. |
| 9,185,062 B1 | 11/2015 | Yang et al. |
| 9,189,611 B2 | 11/2015 | Wssingbo |
| 9,196,072 B2 | 11/2015 | Oh et al. |
| 9,201,500 B2 | 12/2015 | Srinivasan et al. |
| 9,214,137 B2 | 12/2015 | Bala et al. |
| 9,230,368 B2 | 1/2016 | Keane et al. |
| 9,237,334 B2 | 1/2016 | Cheng et al. |
| 9,241,149 B2 | 1/2016 | Redmann |
| 9,245,388 B2 | 1/2016 | Poulos et al. |
| 9,256,785 B2 | 2/2016 | Qvarfordt |
| 9,293,118 B2 | 3/2016 | Matsui |
| 9,294,757 B1 | 3/2016 | Lewis et al. |
| 9,298,334 B1 | 3/2016 | Zimmerman et al. |
| 9,316,827 B2 | 4/2016 | Lindley et al. |
| 9,383,189 B2 | 7/2016 | Bridges et al. |
| 9,384,594 B2 | 7/2016 | Maciocci et al. |
| 9,396,580 B1 | 7/2016 | Nowrouzezahrai et al. |
| 9,400,559 B2 | 7/2016 | Latta et al. |
| 9,426,193 B2 | 8/2016 | Goodman |
| 9,436,357 B2 | 9/2016 | Pallakoff et al. |
| 9,437,047 B2 | 9/2016 | Chang et al. |
| 9,448,635 B2 | 9/2016 | Macdougall et al. |
| 9,448,687 B1 | 9/2016 | Mckenzie et al. |
| 9,465,479 B2 | 10/2016 | Cho et al. |
| 9,491,374 B1 | 11/2016 | Avrahami et al. |
| 9,519,371 B2 | 12/2016 | Nishida |
| 9,526,127 B1 | 12/2016 | Taubman et al. |
| 9,544,257 B2 | 1/2017 | Ogundokun et al. |
| 9,563,331 B2 | 2/2017 | Poulos et al. |
| 9,575,559 B2 | 2/2017 | Andrysco |
| 9,588,651 B1 | 3/2017 | Buchanan et al. |
| 9,612,722 B2 | 4/2017 | Miller et al. |
| 9,619,105 B1 | 4/2017 | Dal Mutto |
| 9,619,519 B1 | 4/2017 | Dorner |
| 9,672,588 B1 | 6/2017 | Doucette et al. |
| 9,681,112 B2 | 6/2017 | Son |
| 9,684,372 B2 | 6/2017 | Xun et al. |
| 9,734,402 B2 | 8/2017 | Jang et al. |
| 9,778,814 B2 | 10/2017 | Ambrus et al. |
| 9,829,708 B1 | 11/2017 | Asada |
| 9,851,866 B2 | 12/2017 | Goossens et al. |
| 9,864,498 B2 | 1/2018 | Olsson et al. |
| 9,870,130 B2 | 1/2018 | Schubert et al. |
| 9,886,087 B1 | 2/2018 | Wald et al. |
| 9,933,833 B2 | 4/2018 | Tu et al. |
| 9,934,614 B2 | 4/2018 | Ramsby et al. |
| 9,952,042 B2 | 4/2018 | Abovitz et al. |
| 10,026,209 B1 | 7/2018 | Dagley et al. |
| 10,049,460 B2 | 8/2018 | Romano et al. |
| 10,101,803 B2 | 10/2018 | Faaborg et al. |
| 10,175,483 B2 | 1/2019 | Salter et al. |
| 10,192,347 B2 | 1/2019 | Bui et al. |
| 10,203,764 B2 | 2/2019 | Katz et al. |
| 10,307,671 B2 | 6/2019 | Barney et al. |
| 10,339,721 B1 | 7/2019 | Dascola et al. |
| 10,353,532 B1 | 7/2019 | Holz et al. |
| 10,373,381 B2 | 8/2019 | Nuernberger et al. |
| 10,394,320 B2 | 8/2019 | George-svahn et al. |
| 10,448,189 B2 | 10/2019 | Link |
| 10,488,941 B2 | 11/2019 | Lam et al. |
| 10,499,044 B1 | 12/2019 | Giokaris et al. |
| 10,534,439 B2 | 1/2020 | Raffa et al. |
| 10,545,584 B2 | 1/2020 | Tome et al. |
| 10,564,714 B2 | 2/2020 | Marggraff et al. |
| 10,565,448 B2 | 2/2020 | Bell et al. |
| 10,642,368 B2 | 5/2020 | Chen |
| 10,664,043 B2 | 5/2020 | Ikuta et al. |
| 10,664,048 B2 | 5/2020 | Cieplinski et al. |
| 10,664,050 B2 | 5/2020 | Alcaide et al. |
| 10,671,241 B1 | 6/2020 | Jia et al. |
| 10,678,403 B2 | 6/2020 | Duarte et al. |
| 10,691,216 B2 | 6/2020 | Geisner et al. |
| 10,699,488 B1 | 6/2020 | Terrano |
| 10,701,661 B1 | 6/2020 | Coelho et al. |
| 10,708,965 B2 | 7/2020 | Subramanian et al. |
| 10,712,900 B2 | 7/2020 | Osman et al. |
| 10,732,721 B1 | 8/2020 | Clements |
| 10,754,434 B2 | 8/2020 | Hall et al. |
| 10,762,716 B1 | 9/2020 | Paul et al. |
| 10,768,421 B1 | 9/2020 | Rosenberg et al. |
| 10,768,693 B2 | 9/2020 | Powderly et al. |
| 10,776,933 B2 | 9/2020 | Faulkner |
| 10,846,864 B2 | 11/2020 | Kim et al. |
| 10,852,814 B1 | 12/2020 | Caron et al. |
| 10,861,242 B2 | 12/2020 | Lacey et al. |
| 10,890,967 B2 | 1/2021 | Stellmach et al. |
| 10,922,744 B2 | 2/2021 | Mahajan |
| 10,929,099 B2 | 2/2021 | Querze et al. |
| 10,936,148 B1 | 3/2021 | Merkl et al. |
| 10,956,724 B1 | 3/2021 | Terrano |
| 10,983,663 B2 | 4/2021 | Iglesias |
| 11,003,308 B1 | 5/2021 | Dryer et al. |
| 11,023,035 B1 | 6/2021 | Atlas et al. |
| 11,055,920 B1 | 7/2021 | Bramwell et al. |
| 11,079,995 B1 | 8/2021 | Hulbert et al. |
| 11,082,463 B2 | 8/2021 | Felman |
| 11,112,875 B1 | 9/2021 | Zhou et al. |
| 11,138,798 B2 | 10/2021 | Paul et al. |
| 11,146,909 B1 | 10/2021 | Pinto et al. |

(56) References Cited

U.S. PATENT DOCUMENTS

| | | |
|---|---|---|
| 11,175,791 B1 | 11/2021 | Patnaikuni et al. |
| 11,176,755 B1 | 11/2021 | Tichenor et al. |
| 11,199,898 B2 | 12/2021 | Blume et al. |
| 11,200,742 B1 | 12/2021 | Post et al. |
| 11,204,678 B1 | 12/2021 | Baker et al. |
| 11,232,643 B1 | 1/2022 | Stevens et al. |
| 11,243,734 B2 | 2/2022 | Boissière et al. |
| 11,249,556 B1 | 2/2022 | Schwarz et al. |
| 11,262,885 B1 | 3/2022 | Burckel |
| 11,294,472 B2 | 4/2022 | Tang et al. |
| 11,294,475 B1 | 4/2022 | Pinchon et al. |
| 11,307,653 B1 | 4/2022 | Qian et al. |
| 11,340,756 B2 | 5/2022 | Faulkner et al. |
| 11,343,420 B1 | 5/2022 | Herz et al. |
| 11,347,319 B2 | 5/2022 | Goel et al. |
| 11,348,300 B2 | 5/2022 | Zimmermann et al. |
| 11,379,033 B2 | 7/2022 | O'hern et al. |
| 11,380,323 B2 | 7/2022 | Shin et al. |
| 11,409,363 B2 | 8/2022 | Chen et al. |
| 11,416,080 B2 | 8/2022 | Heo et al. |
| 11,432,095 B1 | 8/2022 | Satongar et al. |
| 11,461,973 B2 | 10/2022 | Pinchon |
| 11,496,571 B2 | 11/2022 | Berliner et al. |
| 11,531,402 B1 | 12/2022 | Stolzenberg |
| 11,531,459 B2 | 12/2022 | Poupyrev et al. |
| 11,557,102 B2 | 1/2023 | Palangie et al. |
| 11,567,625 B2 | 1/2023 | Faulkner et al. |
| 11,573,363 B2 | 2/2023 | Zou et al. |
| 11,574,452 B2 | 2/2023 | Berliner et al. |
| 11,599,239 B2 | 3/2023 | Rockel et al. |
| 11,615,596 B2 | 3/2023 | Faulkner et al. |
| 11,641,460 B1 | 5/2023 | Geusz et al. |
| 11,669,155 B2 | 6/2023 | Bowman et al. |
| 11,720,171 B2 | 8/2023 | Pastrana Vicente et al. |
| 11,726,577 B2 | 8/2023 | Katz |
| 11,730,226 B2 | 8/2023 | Stolarz et al. |
| 11,733,824 B2 | 8/2023 | Iskandar et al. |
| 11,762,457 B1 | 9/2023 | Ikkai et al. |
| 11,762,473 B2 | 9/2023 | Cipoletta et al. |
| 11,768,544 B2 | 9/2023 | Schwarz et al. |
| 11,847,748 B2 | 12/2023 | Liu et al. |
| 11,861,136 B1 | 1/2024 | Faulkner et al. |
| 11,875,013 B2 | 1/2024 | Lemay et al. |
| 11,886,643 B2 | 1/2024 | Irie et al. |
| 11,899,845 B2 | 2/2024 | Chung et al. |
| 11,909,453 B2 | 2/2024 | Javaudin et al. |
| 11,914,759 B2 | 2/2024 | Klein et al. |
| 11,922,588 B2 | 3/2024 | Fillhardt et al. |
| 11,928,263 B2 | 3/2024 | Jung et al. |
| 11,934,569 B2 | 3/2024 | Pastrana Vicente et al. |
| 11,954,242 B2 | 4/2024 | Dascola et al. |
| 11,983,326 B2 | 5/2024 | Lacey |
| 11,988,832 B2 | 5/2024 | Singh et al. |
| 11,989,965 B2 | 5/2024 | Tarighat Mehrabani |
| 11,995,301 B2 | 5/2024 | Hylak et al. |
| 12,032,803 B2 | 7/2024 | Pastrana Vicente et al. |
| 12,062,127 B2 | 8/2024 | Park et al. |
| 12,099,653 B2 | 9/2024 | Chawda et al. |
| 12,099,695 B1 | 9/2024 | Smith et al. |
| 12,113,948 B1 | 10/2024 | Smith et al. |
| 12,118,200 B1 | 10/2024 | Shutzberg et al. |
| 12,154,236 B1 | 11/2024 | Herman et al. |
| 12,236,546 B1 | 2/2025 | Lipton |
| 2001/0047250 A1 | 11/2001 | Schuller et al. |
| 2002/0024675 A1 | 2/2002 | Foxlin |
| 2002/0030692 A1 | 3/2002 | Griesert |
| 2002/0044152 A1 | 4/2002 | Abbott et al. |
| 2002/0065778 A1 | 5/2002 | Bouet et al. |
| 2003/0038754 A1 | 2/2003 | Goldstein et al. |
| 2003/0151611 A1 | 8/2003 | Turpin et al. |
| 2003/0222924 A1 | 12/2003 | Baron |
| 2004/0059784 A1 | 3/2004 | Caughey |
| 2004/0104806 A1 | 6/2004 | Yui et al. |
| 2004/0230912 A1 | 11/2004 | Clow et al. |
| 2004/0243926 A1 | 12/2004 | Trenbeath et al. |
| 2005/0044510 A1 | 2/2005 | Yi |
| 2005/0062738 A1 | 3/2005 | Handley et al. |
| 2005/0073136 A1 | 4/2005 | Larsson et al. |
| 2005/0100210 A1 | 5/2005 | Rice et al. |
| 2005/0138572 A1 | 6/2005 | Good et al. |
| 2005/0144570 A1 | 6/2005 | Loverin et al. |
| 2005/0144571 A1 | 6/2005 | Loverin et al. |
| 2005/0175218 A1 | 8/2005 | Vertegaal et al. |
| 2005/0198143 A1 | 9/2005 | Moody et al. |
| 2005/0216866 A1 | 9/2005 | Rosen et al. |
| 2005/0248299 A1 | 11/2005 | Chemel et al. |
| 2006/0028400 A1 | 2/2006 | Lapstun et al. |
| 2006/0034590 A1 | 2/2006 | Teramoto |
| 2006/0080702 A1 | 4/2006 | Diez et al. |
| 2006/0156228 A1 | 7/2006 | Gallo et al. |
| 2006/0256083 A1 | 11/2006 | Rosenberg |
| 2006/0283214 A1 | 12/2006 | Donadon et al. |
| 2007/0259716 A1 | 11/2007 | Mattice et al. |
| 2008/0181502 A1 | 7/2008 | Yang |
| 2008/0186255 A1 | 8/2008 | Cohen et al. |
| 2008/0211771 A1 | 9/2008 | Richardson |
| 2009/0037844 A1 | 2/2009 | Kim et al. |
| 2009/0049408 A1 | 2/2009 | Naaman et al. |
| 2009/0064035 A1 | 3/2009 | Shibata et al. |
| 2009/0146779 A1 | 6/2009 | Kumar et al. |
| 2009/0231356 A1 | 9/2009 | Barnes et al. |
| 2009/0254843 A1 | 10/2009 | Van et al. |
| 2009/0319181 A1 | 12/2009 | Khosravy et al. |
| 2010/0097375 A1 | 4/2010 | Tadaishi et al. |
| 2010/0115459 A1 | 5/2010 | Kinnunen et al. |
| 2010/0177049 A1 | 7/2010 | Levy et al. |
| 2010/0185949 A1 | 7/2010 | Jaeger |
| 2010/0188503 A1 | 7/2010 | Tsai et al. |
| 2010/0188572 A1 | 7/2010 | Card, II |
| 2010/0269145 A1 | 10/2010 | Ingrassia et al. |
| 2010/0293504 A1 | 11/2010 | Hachiya |
| 2010/0302245 A1 | 12/2010 | Best |
| 2010/0328432 A1 | 12/2010 | Tanaka |
| 2011/0018895 A1 | 1/2011 | Buzyn et al. |
| 2011/0018896 A1 | 1/2011 | Buzyn et al. |
| 2011/0098029 A1 | 4/2011 | Rhoads et al. |
| 2011/0142321 A1 | 6/2011 | Huffman |
| 2011/0156879 A1 | 6/2011 | Matsushita et al. |
| 2011/0164163 A1 | 7/2011 | Bilbrey et al. |
| 2011/0169927 A1 | 7/2011 | Mages et al. |
| 2011/0175932 A1 | 7/2011 | Yu et al. |
| 2011/0216060 A1 | 9/2011 | Weising et al. |
| 2011/0243448 A1 | 10/2011 | Kawabuchi et al. |
| 2011/0254865 A1 | 10/2011 | Yee et al. |
| 2011/0289691 A1 | 12/2011 | Laflèche et al. |
| 2011/0310001 A1 | 12/2011 | Madau et al. |
| 2011/0320969 A1 | 12/2011 | Hwang et al. |
| 2012/0038751 A1 | 2/2012 | Yuan et al. |
| 2012/0066638 A1 | 3/2012 | Ohri |
| 2012/0075496 A1 | 3/2012 | Akifusa et al. |
| 2012/0086624 A1 | 4/2012 | Thompson et al. |
| 2012/0113223 A1 | 5/2012 | Hilliges et al. |
| 2012/0124525 A1 | 5/2012 | Kang |
| 2012/0131631 A1 | 5/2012 | Bhogal et al. |
| 2012/0170089 A1 | 7/2012 | Kim et al. |
| 2012/0170840 A1 | 7/2012 | Caruso et al. |
| 2012/0184372 A1 | 7/2012 | Laarakkers et al. |
| 2012/0194547 A1 | 8/2012 | Johnson et al. |
| 2012/0249741 A1 | 10/2012 | Maciocci et al. |
| 2012/0256956 A1* | 10/2012 | Kasahara ............... G06T 7/73 345/633 |
| 2012/0256967 A1 | 10/2012 | Baldwin et al. |
| 2012/0257035 A1 | 10/2012 | Larsen |
| 2012/0272179 A1 | 10/2012 | Stafford |
| 2012/0290401 A1 | 11/2012 | Neven |
| 2012/0304087 A1 | 11/2012 | Walkin et al. |
| 2013/0010062 A1 | 1/2013 | Redmann |
| 2013/0027860 A1 | 1/2013 | Masaki et al. |
| 2013/0088516 A1 | 4/2013 | Ota et al. |
| 2013/0093727 A1 | 4/2013 | Eriksson et al. |
| 2013/0127850 A1 | 5/2013 | Bindon |
| 2013/0148850 A1 | 6/2013 | Matsuda et al. |
| 2013/0169533 A1 | 7/2013 | Jahnke |
| 2013/0190044 A1 | 7/2013 | Kulas |

(56) References Cited

U.S. PATENT DOCUMENTS

| | | |
|---|---|---|
| 2013/0211843 A1 | 8/2013 | Clarkson |
| 2013/0222227 A1 | 8/2013 | Johansson et al. |
| 2013/0222410 A1 | 8/2013 | Kameyama et al. |
| 2013/0229345 A1 | 9/2013 | Day et al. |
| 2013/0246955 A1 | 9/2013 | Schwesig et al. |
| 2013/0249922 A1 | 9/2013 | Hachiya |
| 2013/0263016 A1 | 10/2013 | Lehtiniemi et al. |
| 2013/0265227 A1 | 10/2013 | Julian |
| 2013/0271397 A1 | 10/2013 | Hildreth et al. |
| 2013/0278501 A1 | 10/2013 | Bulzacki |
| 2013/0286004 A1 | 10/2013 | Mcculloch et al. |
| 2013/0293456 A1 | 11/2013 | Son et al. |
| 2013/0300648 A1 | 11/2013 | Kim et al. |
| 2013/0300654 A1 | 11/2013 | Seki |
| 2013/0307945 A1 | 11/2013 | Cheng et al. |
| 2013/0321462 A1 | 12/2013 | Salter et al. |
| 2013/0325326 A1 | 12/2013 | Blumenberg et al. |
| 2013/0326341 A1 | 12/2013 | Nonaka |
| 2013/0326364 A1 | 12/2013 | Latta et al. |
| 2013/0328925 A1 | 12/2013 | Latta et al. |
| 2013/0332890 A1 | 12/2013 | Ramic et al. |
| 2013/0335301 A1 | 12/2013 | Wong et al. |
| 2013/0342564 A1 | 12/2013 | Kinnebrew et al. |
| 2013/0342570 A1 | 12/2013 | Kinnebrew et al. |
| 2013/0345975 A1 | 12/2013 | Vulcano et al. |
| 2014/0002338 A1 | 1/2014 | Raffa et al. |
| 2014/0002444 A1 | 1/2014 | Bennett et al. |
| 2014/0028548 A1 | 1/2014 | Bychkov et al. |
| 2014/0040832 A1 | 2/2014 | Regelous |
| 2014/0049462 A1 | 2/2014 | Weinberger et al. |
| 2014/0063058 A1 | 3/2014 | Fialho et al. |
| 2014/0068692 A1 | 3/2014 | Archibong et al. |
| 2014/0071241 A1 | 3/2014 | Yang et al. |
| 2014/0075361 A1 | 3/2014 | Reynolds et al. |
| 2014/0078176 A1 | 3/2014 | Kim et al. |
| 2014/0104206 A1 | 4/2014 | Anderson |
| 2014/0108942 A1 | 4/2014 | Freeman et al. |
| 2014/0114845 A1 | 4/2014 | Rogers et al. |
| 2014/0125584 A1 | 5/2014 | Xun et al. |
| 2014/0125585 A1 | 5/2014 | Song et al. |
| 2014/0126782 A1 | 5/2014 | Takai et al. |
| 2014/0129990 A1 | 5/2014 | Xin et al. |
| 2014/0132499 A1 | 5/2014 | Schwesinger et al. |
| 2014/0139426 A1 | 5/2014 | Kryze et al. |
| 2014/0164928 A1 | 6/2014 | Kim |
| 2014/0168267 A1 | 6/2014 | Kim et al. |
| 2014/0168453 A1 | 6/2014 | Shoemake et al. |
| 2014/0198017 A1 | 7/2014 | Lamb et al. |
| 2014/0232639 A1 | 8/2014 | Hayashi et al. |
| 2014/0237366 A1 | 8/2014 | Poulos et al. |
| 2014/0247208 A1 | 9/2014 | Henderek et al. |
| 2014/0247210 A1 | 9/2014 | Henderek et al. |
| 2014/0258942 A1 | 9/2014 | Kutliroff et al. |
| 2014/0267400 A1 | 9/2014 | Mabbutt et al. |
| 2014/0268054 A1 | 9/2014 | Olsson et al. |
| 2014/0282272 A1 | 9/2014 | Kies et al. |
| 2014/0285641 A1 | 9/2014 | Kato et al. |
| 2014/0298273 A1 | 10/2014 | Blackstone et al. |
| 2014/0304612 A1 | 10/2014 | Collin |
| 2014/0320404 A1 | 10/2014 | Kasahara |
| 2014/0331187 A1 | 11/2014 | Hicks et al. |
| 2014/0333666 A1 | 11/2014 | Poulos et al. |
| 2014/0347391 A1 | 11/2014 | Keane et al. |
| 2014/0351727 A1 | 11/2014 | Danton et al. |
| 2014/0351753 A1 | 11/2014 | Shin et al. |
| 2014/0362111 A1 | 12/2014 | Kim |
| 2014/0363074 A1 | 12/2014 | Dolfing et al. |
| 2014/0368537 A1 | 12/2014 | Salter et al. |
| 2014/0368620 A1 | 12/2014 | Li et al. |
| 2014/0372957 A1 | 12/2014 | Keane et al. |
| 2014/0375541 A1 | 12/2014 | Nister et al. |
| 2014/0375683 A1 | 12/2014 | Salter et al. |
| 2015/0009118 A1 | 1/2015 | Thomas et al. |
| 2015/0035822 A1 | 2/2015 | Arsan et al. |
| 2015/0042679 A1 | 2/2015 | Järvenpää |
| 2015/0058718 A1 | 2/2015 | Kim et al. |
| 2015/0067580 A1 | 3/2015 | Um et al. |
| 2015/0077335 A1 | 3/2015 | Taguchi et al. |
| 2015/0082180 A1 | 3/2015 | Ames et al. |
| 2015/0095844 A1 | 4/2015 | Cho et al. |
| 2015/0121466 A1 | 4/2015 | Brands et al. |
| 2015/0123890 A1 | 5/2015 | Kapur et al. |
| 2015/0123901 A1 | 5/2015 | Schwesinger et al. |
| 2015/0128075 A1 | 5/2015 | Kempinski |
| 2015/0131850 A1 | 5/2015 | Qvarfordt |
| 2015/0135108 A1 | 5/2015 | Pope et al. |
| 2015/0145887 A1 | 5/2015 | Forutanpour et al. |
| 2015/0149929 A1 | 5/2015 | Shepherd et al. |
| 2015/0153833 A1 | 6/2015 | Pinault et al. |
| 2015/0169506 A1 | 6/2015 | Leventhal et al. |
| 2015/0177937 A1 | 6/2015 | Poletto et al. |
| 2015/0193982 A1 | 7/2015 | Mihelich et al. |
| 2015/0205106 A1 | 7/2015 | Norden |
| 2015/0212576 A1 | 7/2015 | Ambrus et al. |
| 2015/0220152 A1 | 8/2015 | Tait et al. |
| 2015/0221132 A1 | 8/2015 | Kruglick |
| 2015/0242095 A1 | 8/2015 | Sonnenberg |
| 2015/0254905 A1 | 9/2015 | Ramsby et al. |
| 2015/0262428 A1 | 9/2015 | Tatzgern et al. |
| 2015/0317831 A1 | 11/2015 | Ebstyne et al. |
| 2015/0317832 A1 | 11/2015 | Ebstyne et al. |
| 2015/0331240 A1 | 11/2015 | Poulos et al. |
| 2015/0331576 A1 | 11/2015 | Piya et al. |
| 2015/0332091 A1 | 11/2015 | Kim et al. |
| 2015/0370323 A1 | 12/2015 | Cieplinski et al. |
| 2015/0381974 A1 | 12/2015 | Hoffman et al. |
| 2016/0012642 A1 | 1/2016 | Lee et al. |
| 2016/0015470 A1 | 1/2016 | Border |
| 2016/0018898 A1 | 1/2016 | Tu et al. |
| 2016/0018900 A1 | 1/2016 | Tu et al. |
| 2016/0025971 A1 | 1/2016 | Crow et al. |
| 2016/0026242 A1 | 1/2016 | Burns et al. |
| 2016/0026243 A1 | 1/2016 | Bertram et al. |
| 2016/0026253 A1 | 1/2016 | Bradski et al. |
| 2016/0041391 A1 | 2/2016 | Van et al. |
| 2016/0050642 A1 | 2/2016 | Brown et al. |
| 2016/0062636 A1 | 3/2016 | Jung et al. |
| 2016/0085301 A1 | 3/2016 | Lopez |
| 2016/0093108 A1 | 3/2016 | Mao et al. |
| 2016/0098093 A1 | 4/2016 | Cheon et al. |
| 2016/0098094 A1 | 4/2016 | Minkkinen |
| 2016/0127690 A1 | 5/2016 | Kaehler et al. |
| 2016/0133044 A1 | 5/2016 | Lynch |
| 2016/0133052 A1 | 5/2016 | Choi et al. |
| 2016/0171304 A1 | 6/2016 | Golding et al. |
| 2016/0179191 A1 | 6/2016 | Kim et al. |
| 2016/0179336 A1 | 6/2016 | Ambrus et al. |
| 2016/0189426 A1 | 6/2016 | Thomas et al. |
| 2016/0193104 A1 | 7/2016 | Du |
| 2016/0196692 A1 | 7/2016 | Kjallstrom et al. |
| 2016/0210784 A1 | 7/2016 | Ramsby et al. |
| 2016/0216768 A1 | 7/2016 | Goetz et al. |
| 2016/0224122 A1 | 8/2016 | Dietz et al. |
| 2016/0225012 A1 | 8/2016 | Ha et al. |
| 2016/0225164 A1 | 8/2016 | Tomlin et al. |
| 2016/0253063 A1 | 9/2016 | Critchlow |
| 2016/0253821 A1 | 9/2016 | Romano et al. |
| 2016/0275702 A1 | 9/2016 | Reynolds et al. |
| 2016/0291922 A1 | 10/2016 | Montgomerie et al. |
| 2016/0306434 A1 | 10/2016 | Ferrin |
| 2016/0309081 A1 | 10/2016 | Frahm et al. |
| 2016/0313890 A1 | 10/2016 | Walline et al. |
| 2016/0334940 A1 | 11/2016 | Kandadai et al. |
| 2016/0350973 A1 | 12/2016 | Shapira et al. |
| 2016/0357266 A1 | 12/2016 | Patel et al. |
| 2016/0370858 A1 | 12/2016 | Leppänen et al. |
| 2016/0373647 A1 | 12/2016 | García Morate et al. |
| 2016/0373714 A1 | 12/2016 | Lee et al. |
| 2016/0379409 A1 | 12/2016 | Gavriliuc et al. |
| 2017/0032568 A1 | 2/2017 | Gharpure et al. |
| 2017/0038829 A1 | 2/2017 | Lanier et al. |
| 2017/0038837 A1 | 2/2017 | Faaborg et al. |
| 2017/0038849 A1 | 2/2017 | Hwang |
| 2017/0039770 A1 | 2/2017 | Lanier et al. |

(56) References Cited

U.S. PATENT DOCUMENTS

| | | |
|---|---|---|
| 2017/0052393 A1 | 2/2017 | Kweon |
| 2017/0052595 A1 | 2/2017 | Poulos et al. |
| 2017/0053383 A1 | 2/2017 | Heo |
| 2017/0060230 A1 | 3/2017 | Faaborg et al. |
| 2017/0061694 A1 | 3/2017 | Giraldi et al. |
| 2017/0090566 A1 | 3/2017 | George-svahn et al. |
| 2017/0109930 A1* | 4/2017 | Holzer .................. G06T 13/20 |
| 2017/0115728 A1 | 4/2017 | Park et al. |
| 2017/0123487 A1 | 5/2017 | Hazra et al. |
| 2017/0131964 A1 | 5/2017 | Baek et al. |
| 2017/0132694 A1 | 5/2017 | Damy |
| 2017/0132822 A1 | 5/2017 | Marschke et al. |
| 2017/0146801 A1 | 5/2017 | Stempora |
| 2017/0147180 A1 | 5/2017 | Yoon et al. |
| 2017/0148339 A1 | 5/2017 | Van Curen et al. |
| 2017/0153866 A1 | 6/2017 | Grinberg et al. |
| 2017/0154326 A1 | 6/2017 | Jo et al. |
| 2017/0162177 A1 | 6/2017 | Lebeck et al. |
| 2017/0169616 A1 | 6/2017 | Wiley et al. |
| 2017/0178392 A1 | 6/2017 | Zuccarino et al. |
| 2017/0206691 A1 | 7/2017 | Harrises et al. |
| 2017/0206692 A1 | 7/2017 | Sheaffer et al. |
| 2017/0212583 A1 | 7/2017 | Krasadakis |
| 2017/0213388 A1 | 7/2017 | Margolis et al. |
| 2017/0221264 A1 | 8/2017 | Perry |
| 2017/0228130 A1 | 8/2017 | Palmaro |
| 2017/0236332 A1 | 8/2017 | Kipman et al. |
| 2017/0243352 A1 | 8/2017 | Kutliroff et al. |
| 2017/0251143 A1 | 8/2017 | Peruch et al. |
| 2017/0256096 A1 | 9/2017 | Faaborg et al. |
| 2017/0270715 A1 | 9/2017 | Lindsay et al. |
| 2017/0285737 A1 | 10/2017 | Khalid et al. |
| 2017/0287215 A1 | 10/2017 | Lalonde et al. |
| 2017/0287225 A1 | 10/2017 | Powderly et al. |
| 2017/0302903 A1 | 10/2017 | Ng et al. |
| 2017/0308163 A1 | 10/2017 | Cieplinski et al. |
| 2017/0315715 A1 | 11/2017 | Fujita et al. |
| 2017/0326457 A1 | 11/2017 | Tilton et al. |
| 2017/0344223 A1 | 11/2017 | Holzer et al. |
| 2017/0351094 A1 | 12/2017 | Poulos et al. |
| 2017/0357389 A1 | 12/2017 | Fleizach et al. |
| 2017/0358141 A1 | 12/2017 | Stafford et al. |
| 2017/0364198 A1 | 12/2017 | Yoganandan et al. |
| 2018/0005433 A1 | 1/2018 | Kohler et al. |
| 2018/0024681 A1 | 1/2018 | Bernstein et al. |
| 2018/0045963 A1 | 2/2018 | Hoover et al. |
| 2018/0075658 A1 | 3/2018 | Lanier et al. |
| 2018/0077383 A1 | 3/2018 | Akao et al. |
| 2018/0081519 A1 | 3/2018 | Kim |
| 2018/0084287 A1 | 3/2018 | Shimura |
| 2018/0088787 A1 | 3/2018 | Bereza et al. |
| 2018/0095634 A1 | 4/2018 | Alexander |
| 2018/0095636 A1 | 4/2018 | Valdivia et al. |
| 2018/0095649 A1 | 4/2018 | Valdivia et al. |
| 2018/0101223 A1 | 4/2018 | Ishihara et al. |
| 2018/0103209 A1 | 4/2018 | Fischler et al. |
| 2018/0114364 A1 | 4/2018 | Mcphee et al. |
| 2018/0120944 A1 | 5/2018 | Wang et al. |
| 2018/0122138 A1 | 5/2018 | Piya et al. |
| 2018/0130255 A1 | 5/2018 | Hazeghi et al. |
| 2018/0136815 A1 | 5/2018 | Tomizuka et al. |
| 2018/0143693 A1 | 5/2018 | Calabrese et al. |
| 2018/0150204 A1 | 5/2018 | Macgillivray |
| 2018/0150997 A1 | 5/2018 | Austin |
| 2018/0157332 A1 | 6/2018 | Nie |
| 2018/0158222 A1 | 6/2018 | Hayashi |
| 2018/0165853 A1 | 6/2018 | Inagi et al. |
| 2018/0173404 A1 | 6/2018 | Smith |
| 2018/0181199 A1 | 6/2018 | Harvey et al. |
| 2018/0181272 A1 | 6/2018 | Olsson et al. |
| 2018/0188802 A1 | 7/2018 | Okumura |
| 2018/0197336 A1 | 7/2018 | Rochford et al. |
| 2018/0197341 A1 | 7/2018 | Loberg et al. |
| 2018/0210628 A1 | 7/2018 | Mcphee et al. |
| 2018/0218214 A1 | 8/2018 | Pestun et al. |
| 2018/0220195 A1 | 8/2018 | Panchaksharaiah et al. |
| 2018/0239144 A1 | 8/2018 | Woods et al. |
| 2018/0247449 A1 | 8/2018 | Park et al. |
| 2018/0275753 A1 | 9/2018 | Publicover et al. |
| 2018/0286126 A1 | 10/2018 | Schwarz et al. |
| 2018/0300023 A1 | 10/2018 | Hein |
| 2018/0300952 A1 | 10/2018 | Evans et al. |
| 2018/0302687 A1 | 10/2018 | Bhattacharjee et al. |
| 2018/0315248 A1 | 11/2018 | Bastov et al. |
| 2018/0322701 A1 | 11/2018 | Pahud et al. |
| 2018/0330544 A1 | 11/2018 | Corso et al. |
| 2018/0348861 A1 | 12/2018 | Uscinski et al. |
| 2018/0348986 A1 | 12/2018 | Sawaki |
| 2018/0350099 A1 | 12/2018 | Yerkes et al. |
| 2018/0350119 A1 | 12/2018 | Kocharlakota et al. |
| 2019/0012060 A1 | 1/2019 | Moore et al. |
| 2019/0018479 A1 | 1/2019 | Minami |
| 2019/0018498 A1 | 1/2019 | West et al. |
| 2019/0034076 A1 | 1/2019 | Vinayak et al. |
| 2019/0043259 A1 | 2/2019 | Wang et al. |
| 2019/0050062 A1 | 2/2019 | Chen et al. |
| 2019/0056785 A1 | 2/2019 | Suk |
| 2019/0065027 A1 | 2/2019 | Hauenstein et al. |
| 2019/0073109 A1 | 3/2019 | Zhang et al. |
| 2019/0080572 A1 | 3/2019 | Kim et al. |
| 2019/0088149 A1 | 3/2019 | Fink et al. |
| 2019/0094963 A1 | 3/2019 | Nijs |
| 2019/0094979 A1 | 3/2019 | Hall et al. |
| 2019/0096134 A1 | 3/2019 | Amacker et al. |
| 2019/0101991 A1 | 4/2019 | Brennan |
| 2019/0102953 A1 | 4/2019 | Lindsay et al. |
| 2019/0130622 A1 | 5/2019 | Hoover et al. |
| 2019/0130633 A1 | 5/2019 | Haddad et al. |
| 2019/0138183 A1 | 5/2019 | Rosas et al. |
| 2019/0146128 A1 | 5/2019 | Cao et al. |
| 2019/0155495 A1 | 5/2019 | Klein et al. |
| 2019/0164340 A1 | 5/2019 | Pejic et al. |
| 2019/0172261 A1 | 6/2019 | Alt et al. |
| 2019/0172262 A1 | 6/2019 | Mchugh et al. |
| 2019/0188895 A1 | 6/2019 | Miller et al. |
| 2019/0188918 A1 | 6/2019 | Brewer et al. |
| 2019/0204906 A1 | 7/2019 | Ross et al. |
| 2019/0212827 A1 | 7/2019 | Kin et al. |
| 2019/0213389 A1 | 7/2019 | Peruch et al. |
| 2019/0227763 A1 | 7/2019 | Kaufthal |
| 2019/0228503 A1 | 7/2019 | Tokuchi |
| 2019/0228589 A1 | 7/2019 | Dascola et al. |
| 2019/0238818 A1 | 8/2019 | Held et al. |
| 2019/0251884 A1 | 8/2019 | Burns et al. |
| 2019/0258365 A1 | 8/2019 | Zurmoehle et al. |
| 2019/0266774 A1 | 8/2019 | Sommerlade et al. |
| 2019/0279407 A1 | 9/2019 | Mchugh et al. |
| 2019/0294312 A1 | 9/2019 | Rohrbacher |
| 2019/0302977 A1 | 10/2019 | Pendergast et al. |
| 2019/0310757 A1 | 10/2019 | Lee et al. |
| 2019/0324529 A1 | 10/2019 | Stellmach et al. |
| 2019/0325654 A1 | 10/2019 | Stisser et al. |
| 2019/0332244 A1 | 10/2019 | Beszteri et al. |
| 2019/0333278 A1 | 10/2019 | Palangie et al. |
| 2019/0339770 A1 | 11/2019 | Kurlethimar et al. |
| 2019/0340816 A1 | 11/2019 | Rogers |
| 2019/0340832 A1 | 11/2019 | Srinivasan et al. |
| 2019/0346678 A1 | 11/2019 | Nocham |
| 2019/0346922 A1 | 11/2019 | Young et al. |
| 2019/0349575 A1 | 11/2019 | Knepper et al. |
| 2019/0354259 A1 | 11/2019 | Park |
| 2019/0361521 A1 | 11/2019 | Stellmach et al. |
| 2019/0362557 A1 | 11/2019 | Lacey et al. |
| 2019/0362560 A1 | 11/2019 | Choi et al. |
| 2019/0369569 A1 | 12/2019 | Olsen et al. |
| 2019/0370492 A1 | 12/2019 | Falchuk et al. |
| 2019/0371072 A1 | 12/2019 | Lindberg et al. |
| 2019/0371279 A1 | 12/2019 | Mak |
| 2019/0377487 A1 | 12/2019 | Bailey et al. |
| 2019/0379765 A1 | 12/2019 | Fajt et al. |
| 2019/0384406 A1 | 12/2019 | Smith et al. |
| 2020/0004401 A1 | 1/2020 | Hwang et al. |
| 2020/0005539 A1 | 1/2020 | Hwang et al. |
| 2020/0012341 A1 | 1/2020 | Stellmach et al. |

(56) References Cited

U.S. PATENT DOCUMENTS

| | | |
|---|---|---|
| 2020/0020157 A1 | 1/2020 | Powers et al. |
| 2020/0026349 A1 | 1/2020 | Fontanel et al. |
| 2020/0038120 A1 | 2/2020 | Ziraknejad et al. |
| 2020/0043243 A1 | 2/2020 | Bhushan et al. |
| 2020/0045249 A1 | 2/2020 | Francois et al. |
| 2020/0048825 A1 | 2/2020 | Schultz et al. |
| 2020/0051527 A1 | 2/2020 | Ngo |
| 2020/0081526 A1 | 3/2020 | Walker et al. |
| 2020/0082602 A1 | 3/2020 | Jones |
| 2020/0089314 A1 | 3/2020 | Poupyrev et al. |
| 2020/0092537 A1 | 3/2020 | Sutter et al. |
| 2020/0098140 A1 | 3/2020 | Jagnow et al. |
| 2020/0098173 A1 | 3/2020 | Mccall |
| 2020/0099989 A1 | 3/2020 | Niemirska et al. |
| 2020/0106965 A1 | 4/2020 | Malia et al. |
| 2020/0117213 A1 | 4/2020 | Tian et al. |
| 2020/0126291 A1 | 4/2020 | Nguyen et al. |
| 2020/0128227 A1 | 4/2020 | Chavez et al. |
| 2020/0128232 A1 | 4/2020 | Hwang et al. |
| 2020/0129850 A1 | 4/2020 | Ohashi |
| 2020/0135141 A1 | 4/2020 | Day et al. |
| 2020/0159017 A1 | 5/2020 | Lin et al. |
| 2020/0214682 A1 | 7/2020 | Zaslavsky et al. |
| 2020/0218074 A1 | 7/2020 | Hoover et al. |
| 2020/0225735 A1 | 7/2020 | Schwarz |
| 2020/0225746 A1 | 7/2020 | Bar-Zeev et al. |
| 2020/0225747 A1 | 7/2020 | Bar-Zeev et al. |
| 2020/0225830 A1 | 7/2020 | Tang et al. |
| 2020/0226814 A1 | 7/2020 | Tang et al. |
| 2020/0226823 A1 | 7/2020 | Stachniak et al. |
| 2020/0242844 A1 | 7/2020 | Bae et al. |
| 2020/0257245 A1 | 8/2020 | Linville et al. |
| 2020/0257484 A1 | 8/2020 | Qian et al. |
| 2020/0272303 A1 | 8/2020 | Jia et al. |
| 2020/0285314 A1 | 9/2020 | Cieplinski et al. |
| 2020/0286299 A1 | 9/2020 | Wang et al. |
| 2020/0319704 A1 | 10/2020 | Kathuria et al. |
| 2020/0322178 A1 | 10/2020 | Wang et al. |
| 2020/0322575 A1 | 10/2020 | Valli |
| 2020/0328913 A1 | 10/2020 | Wyas et al. |
| 2020/0356221 A1 | 11/2020 | Behzadi et al. |
| 2020/0357374 A1 | 11/2020 | Verweij et al. |
| 2020/0363867 A1 | 11/2020 | Azimi et al. |
| 2020/0371602 A1 | 11/2020 | Kanda |
| 2020/0371673 A1 | 11/2020 | Faulkner |
| 2020/0379626 A1 | 12/2020 | Guyomard et al. |
| 2020/0387214 A1 | 12/2020 | Ravasz et al. |
| 2020/0387228 A1 | 12/2020 | Ravasz et al. |
| 2020/0387287 A1 | 12/2020 | Ravasz et al. |
| 2020/0410960 A1 | 12/2020 | Saito et al. |
| 2021/0011556 A1 | 1/2021 | Atlas et al. |
| 2021/0034163 A1 | 2/2021 | Goel et al. |
| 2021/0034319 A1 | 2/2021 | Wang et al. |
| 2021/0055789 A1 | 2/2021 | Tsai et al. |
| 2021/0067418 A1 | 3/2021 | Ely et al. |
| 2021/0074062 A1 | 3/2021 | Madonna et al. |
| 2021/0090337 A1 | 3/2021 | Ravasz et al. |
| 2021/0090348 A1 | 3/2021 | Croxford et al. |
| 2021/0096726 A1 | 4/2021 | Faulkner et al. |
| 2021/0097766 A1 | 4/2021 | Palangie et al. |
| 2021/0097776 A1 | 4/2021 | Faulkner et al. |
| 2021/0102820 A1 | 4/2021 | Le et al. |
| 2021/0103333 A1 | 4/2021 | Cieplinski et al. |
| 2021/0125414 A1 | 4/2021 | Berkebile |
| 2021/0142552 A1 | 5/2021 | Kimura et al. |
| 2021/0158624 A1 | 5/2021 | Moon et al. |
| 2021/0165484 A1 | 6/2021 | Suguhara et al. |
| 2021/0165923 A1 | 6/2021 | Johnston |
| 2021/0166437 A1 | 6/2021 | Legendre et al. |
| 2021/0173340 A1 | 6/2021 | Kim |
| 2021/0173536 A1 | 6/2021 | Kondo |
| 2021/0191600 A1 | 6/2021 | Lemay et al. |
| 2021/0225043 A1 | 7/2021 | Tang et al. |
| 2021/0227601 A1 | 7/2021 | Eom et al. |
| 2021/0241483 A1 | 8/2021 | Dryer et al. |
| 2021/0248674 A1 | 8/2021 | Ogunbunmi |
| 2021/0272367 A1 | 9/2021 | Richter |
| 2021/0279967 A1 | 9/2021 | Gernoth et al. |
| 2021/0286502 A1 | 9/2021 | Lemay et al. |
| 2021/0287439 A1 | 9/2021 | Goodrich et al. |
| 2021/0295592 A1 | 9/2021 | Von Cramon |
| 2021/0295602 A1 | 9/2021 | Scapel et al. |
| 2021/0303074 A1 | 9/2021 | Vanblon et al. |
| 2021/0303107 A1 | 9/2021 | Pla I Conesa et al. |
| 2021/0312684 A1 | 10/2021 | Zimmermann et al. |
| 2021/0312713 A1 | 10/2021 | Peri et al. |
| 2021/0312717 A1 | 10/2021 | Mao |
| 2021/0326094 A1 | 10/2021 | Buerli et al. |
| 2021/0327140 A1 | 10/2021 | Rothkopf et al. |
| 2021/0331069 A1 | 10/2021 | Gustafson et al. |
| 2021/0333864 A1 | 10/2021 | Harvey et al. |
| 2021/0350564 A1 | 11/2021 | Peuhkurinen et al. |
| 2021/0350604 A1 | 11/2021 | Pejsa et al. |
| 2021/0358294 A1 | 11/2021 | Parashar et al. |
| 2021/0365108 A1 | 11/2021 | Burns et al. |
| 2021/0366440 A1 | 11/2021 | Burns et al. |
| 2021/0368136 A1 | 11/2021 | Chalmers et al. |
| 2021/0374221 A1 | 12/2021 | Markhasin et al. |
| 2021/0375022 A1 | 12/2021 | Lee et al. |
| 2021/0383097 A1 | 12/2021 | Guerard et al. |
| 2021/0400744 A1 | 12/2021 | Chen et al. |
| 2021/0402306 A1 | 12/2021 | Huang |
| 2021/0405760 A1 | 12/2021 | Schoen |
| 2022/0011577 A1 | 1/2022 | Lawver et al. |
| 2022/0011855 A1 | 1/2022 | Hazra et al. |
| 2022/0012002 A1 | 1/2022 | Bar-zeev et al. |
| 2022/0028108 A1 | 1/2022 | Haapoja et al. |
| 2022/0030197 A1 | 1/2022 | Ishimoto |
| 2022/0070241 A1 | 3/2022 | Yerli |
| 2022/0076496 A1 | 3/2022 | Palangie et al. |
| 2022/0083145 A1 | 3/2022 | Matsunaga et al. |
| 2022/0083197 A1 | 3/2022 | Rockel et al. |
| 2022/0084279 A1 | 3/2022 | Lindmeier et al. |
| 2022/0091722 A1 | 3/2022 | Faulkner et al. |
| 2022/0091723 A1 | 3/2022 | Faulkner et al. |
| 2022/0092862 A1 | 3/2022 | Faulkner et al. |
| 2022/0100265 A1* | 3/2022 | Kies ............... G06F 3/011 |
| 2022/0100270 A1 | 3/2022 | Pastrana Vicente et al. |
| 2022/0101593 A1 | 3/2022 | Rockel et al. |
| 2022/0101612 A1 | 3/2022 | Palangie et al. |
| 2022/0104910 A1 | 4/2022 | Shelton et al. |
| 2022/0121275 A1 | 4/2022 | Balaji et al. |
| 2022/0121344 A1 | 4/2022 | Pastrana Vicente et al. |
| 2022/0124286 A1 | 4/2022 | Punwani et al. |
| 2022/0130107 A1 | 4/2022 | Lindh |
| 2022/0130126 A1 | 4/2022 | Delgado et al. |
| 2022/0137701 A1 | 5/2022 | Bowman et al. |
| 2022/0137705 A1 | 5/2022 | Hashimoto et al. |
| 2022/0148257 A1 | 5/2022 | Boubekeur et al. |
| 2022/0155853 A1 | 5/2022 | Fan et al. |
| 2022/0155909 A1 | 5/2022 | Kawashima et al. |
| 2022/0157083 A1 | 5/2022 | Jandhyala et al. |
| 2022/0165013 A1 | 5/2022 | Velez et al. |
| 2022/0179503 A1 | 6/2022 | Timonen et al. |
| 2022/0187907 A1 | 6/2022 | Lee et al. |
| 2022/0191570 A1 | 6/2022 | Reid et al. |
| 2022/0197403 A1 | 6/2022 | Hughes et al. |
| 2022/0198755 A1 | 6/2022 | Pinchon |
| 2022/0206298 A1 | 6/2022 | Goodman |
| 2022/0214743 A1 | 7/2022 | Dascola et al. |
| 2022/0221976 A1 | 7/2022 | Agarwal et al. |
| 2022/0229524 A1 | 7/2022 | Mckenzie et al. |
| 2022/0229534 A1 | 7/2022 | Terre et al. |
| 2022/0232191 A1 | 7/2022 | Kawakami et al. |
| 2022/0239718 A1 | 7/2022 | Song et al. |
| 2022/0244536 A1 | 8/2022 | Sha et al. |
| 2022/0245888 A1 | 8/2022 | Singh et al. |
| 2022/0253125 A1 | 8/2022 | Wallen et al. |
| 2022/0253136 A1 | 8/2022 | Holder et al. |
| 2022/0253149 A1 | 8/2022 | Berliner et al. |
| 2022/0253194 A1 | 8/2022 | Berliner et al. |
| 2022/0255995 A1 | 8/2022 | Berliner et al. |
| 2022/0276720 A1 | 9/2022 | Yasui |
| 2022/0279303 A1 | 9/2022 | Marculescu et al. |

(56) References Cited

U.S. PATENT DOCUMENTS

| | | |
|---|---|---|
| 2022/0287676 A1 | 9/2022 | Steines et al. |
| 2022/0291808 A1 | 9/2022 | Stevens et al. |
| 2022/0292783 A1 | 9/2022 | Jayaram et al. |
| 2022/0292784 A1 | 9/2022 | Jayaram et al. |
| 2022/0292785 A1 | 9/2022 | Jayaram et al. |
| 2022/0295032 A1 | 9/2022 | Jayaram et al. |
| 2022/0295040 A1 | 9/2022 | Jayaram et al. |
| 2022/0295139 A1 | 9/2022 | Jayaram et al. |
| 2022/0301264 A1 | 9/2022 | O'leary et al. |
| 2022/0303680 A1 | 9/2022 | Ahmed et al. |
| 2022/0311950 A1 | 9/2022 | Ith et al. |
| 2022/0317776 A1 | 10/2022 | Sundstrom et al. |
| 2022/0319453 A1 | 10/2022 | Llull et al. |
| 2022/0326837 A1 | 10/2022 | Dessero et al. |
| 2022/0335697 A1 | 10/2022 | Harding et al. |
| 2022/0350463 A1 | 11/2022 | Walkin et al. |
| 2022/0365595 A1 | 11/2022 | Cieplinski et al. |
| 2022/0365740 A1 | 11/2022 | Chang et al. |
| 2022/0374136 A1 | 11/2022 | Chang et al. |
| 2022/0382385 A1 | 12/2022 | Chen et al. |
| 2022/0383592 A1 | 12/2022 | Hare et al. |
| 2022/0397962 A1 | 12/2022 | Goel et al. |
| 2022/0408164 A1 | 12/2022 | Lee et al. |
| 2022/0413691 A1 | 12/2022 | Becker et al. |
| 2022/0414975 A1 | 12/2022 | Becker et al. |
| 2022/0414999 A1 | 12/2022 | Ravasz et al. |
| 2022/0415094 A1 | 12/2022 | Kim et al. |
| 2023/0004216 A1 | 1/2023 | Rodgers et al. |
| 2023/0007335 A1 | 1/2023 | Gupta et al. |
| 2023/0008537 A1 | 1/2023 | Henderson et al. |
| 2023/0021861 A1 | 1/2023 | Fujiwara et al. |
| 2023/0027040 A1 | 1/2023 | Wang et al. |
| 2023/0030699 A1 | 2/2023 | Zion et al. |
| 2023/0031832 A1 | 2/2023 | Lipton et al. |
| 2023/0032545 A1 | 2/2023 | Mindlin et al. |
| 2023/0032771 A1 | 2/2023 | Zion et al. |
| 2023/0068660 A1 | 3/2023 | Brent et al. |
| 2023/0069764 A1 | 3/2023 | Jonker et al. |
| 2023/0074080 A1 | 3/2023 | Miller et al. |
| 2023/0076326 A1 | 3/2023 | Xu et al. |
| 2023/0086766 A1 | 3/2023 | Olwal et al. |
| 2023/0092282 A1 | 3/2023 | Boesel et al. |
| 2023/0092874 A1 | 3/2023 | Krivoruchko et al. |
| 2023/0093979 A1 | 3/2023 | Stauber et al. |
| 2023/0094522 A1 | 3/2023 | Stauber et al. |
| 2023/0100610 A1 | 3/2023 | Pastrana Vicente et al. |
| 2023/0100689 A1 | 3/2023 | Chiu et al. |
| 2023/0103161 A1 | 3/2023 | Li et al. |
| 2023/0114080 A1 | 4/2023 | Yang et al. |
| 2023/0119162 A1 | 4/2023 | Lipton et al. |
| 2023/0120052 A1 | 4/2023 | Wallen et al. |
| 2023/0133579 A1 | 5/2023 | Chang et al. |
| 2023/0152889 A1 | 5/2023 | Cieplinski et al. |
| 2023/0152935 A1 | 5/2023 | McKenzie et al. |
| 2023/0154122 A1 | 5/2023 | Dascola et al. |
| 2023/0163987 A1 | 5/2023 | Young et al. |
| 2023/0168745 A1 | 6/2023 | Yoda |
| 2023/0168788 A1 | 6/2023 | Faulkner et al. |
| 2023/0176806 A1 | 6/2023 | Chen et al. |
| 2023/0185426 A1 | 6/2023 | Rockel et al. |
| 2023/0186577 A1 | 6/2023 | Rockel et al. |
| 2023/0206572 A1 | 6/2023 | Pazmino et al. |
| 2023/0221833 A1 | 7/2023 | Holder et al. |
| 2023/0244857 A1 | 8/2023 | Weiss et al. |
| 2023/0259265 A1 | 8/2023 | Krivoruchko et al. |
| 2023/0260240 A1 | 8/2023 | Jayaram et al. |
| 2023/0266859 A1 | 8/2023 | Day et al. |
| 2023/0273706 A1 | 8/2023 | Smith et al. |
| 2023/0274504 A1 | 8/2023 | Ren et al. |
| 2023/0290042 A1 | 9/2023 | Casella et al. |
| 2023/0308610 A1 | 9/2023 | Henderson et al. |
| 2023/0315270 A1 | 10/2023 | Hylak et al. |
| 2023/0316634 A1 | 10/2023 | Chiu et al. |
| 2023/0316658 A1 | 10/2023 | Smith et al. |
| 2023/0325004 A1 | 10/2023 | Burns et al. |
| 2023/0325046 A1 | 10/2023 | De Almeida E De Vincenzo et al. |
| 2023/0333646 A1 | 10/2023 | Pastrana Vicente et al. |
| 2023/0334808 A1 | 10/2023 | Sundstrom et al. |
| 2023/0341932 A1 | 10/2023 | Silva et al. |
| 2023/0343049 A1 | 10/2023 | Boesel et al. |
| 2023/0351702 A1 | 11/2023 | Tan et al. |
| 2023/0353398 A1 | 11/2023 | White |
| 2023/0359199 A1 | 11/2023 | Adachi et al. |
| 2023/0377259 A1 | 11/2023 | Becker et al. |
| 2023/0377295 A1 | 11/2023 | Angevine et al. |
| 2023/0377299 A1 | 11/2023 | Becker et al. |
| 2023/0377300 A1 | 11/2023 | Becker et al. |
| 2023/0384907 A1 | 11/2023 | Boesel et al. |
| 2023/0388357 A1 | 11/2023 | Faulkner et al. |
| 2023/0394755 A1 | 12/2023 | Negoita et al. |
| 2023/0396854 A1 | 12/2023 | Sanders et al. |
| 2024/0037886 A1 | 2/2024 | Chiu et al. |
| 2024/0062279 A1 | 2/2024 | Scully et al. |
| 2024/0070948 A1 | 2/2024 | Bradley et al. |
| 2024/0086031 A1 | 3/2024 | Palangie et al. |
| 2024/0086032 A1 | 3/2024 | Palangie et al. |
| 2024/0087256 A1 | 3/2024 | Hylak et al. |
| 2024/0094863 A1 | 3/2024 | Smith et al. |
| 2024/0094866 A1 | 3/2024 | Lemay et al. |
| 2024/0094882 A1 | 3/2024 | Brewer et al. |
| 2024/0095984 A1 | 3/2024 | Ren et al. |
| 2024/0102821 A1 | 3/2024 | Vallet et al. |
| 2024/0103613 A1 | 3/2024 | Chawda et al. |
| 2024/0103616 A1 | 3/2024 | Yerkes et al. |
| 2024/0103636 A1 | 3/2024 | Lindmeier et al. |
| 2024/0103676 A1 | 3/2024 | Pastrana Vicente et al. |
| 2024/0103684 A1 | 3/2024 | Yu et al. |
| 2024/0103685 A1 | 3/2024 | Pazmino et al. |
| 2024/0103686 A1 | 3/2024 | Pazmino et al. |
| 2024/0103687 A1 | 3/2024 | Pastrana Vicente et al. |
| 2024/0103701 A1 | 3/2024 | Pastrana Vicente et al. |
| 2024/0103704 A1 | 3/2024 | Pastrana Vicente et al. |
| 2024/0103707 A1 | 3/2024 | Henderson et al. |
| 2024/0103716 A1 | 3/2024 | Pastrana Vicente et al. |
| 2024/0103803 A1 | 3/2024 | Krivoruchko et al. |
| 2024/0104836 A1 | 3/2024 | Dessero et al. |
| 2024/0104843 A1 | 3/2024 | Mckenzie et al. |
| 2024/0104870 A1 | 3/2024 | Fuste Lleixa et al. |
| 2024/0104873 A1 | 3/2024 | Pastrana Vicente et al. |
| 2024/0104875 A1 | 3/2024 | Couche et al. |
| 2024/0104876 A1 | 3/2024 | Couche et al. |
| 2024/0104877 A1 | 3/2024 | Henderson et al. |
| 2024/0119682 A1 | 4/2024 | Rudman et al. |
| 2024/0135612 A1 | 4/2024 | Hold-geoffroy et al. |
| 2024/0152256 A1 | 5/2024 | Dascola et al. |
| 2024/0185514 A1 | 6/2024 | Singh et al. |
| 2024/0192764 A1 | 6/2024 | Dascola et al. |
| 2024/0193892 A1 | 6/2024 | Lutter et al. |
| 2024/0200967 A1 | 6/2024 | Arroyo et al. |
| 2024/0203066 A1 | 6/2024 | Kawashima et al. |
| 2024/0205509 A1 | 6/2024 | Kim et al. |
| 2024/0221273 A1 | 7/2024 | Dusseau et al. |
| 2024/0221291 A1 | 7/2024 | Henderson et al. |
| 2024/0233097 A1 | 7/2024 | Ngo et al. |
| 2024/0233288 A1 | 7/2024 | Stauber et al. |
| 2024/0256032 A1 | 8/2024 | Holder et al. |
| 2024/0265656 A1 | 8/2024 | Victor-Faichney et al. |
| 2024/0265796 A1 | 8/2024 | Ippadi Veerabhadre Gowda et al. |
| 2024/0272722 A1 | 8/2024 | Gitter et al. |
| 2024/0272782 A1 | 8/2024 | Pastrana Vicente et al. |
| 2024/0273838 A1 | 8/2024 | Palangie et al. |
| 2024/0281108 A1 | 8/2024 | Krivoruchko et al. |
| 2024/0281109 A1 | 8/2024 | Manjunath et al. |
| 2024/0291953 A1 | 8/2024 | Cerra et al. |
| 2024/0302948 A1 | 9/2024 | Hylak et al. |
| 2024/0310971 A1 | 9/2024 | Kawashima et al. |
| 2024/0338104 A1 | 10/2024 | Salter et al. |
| 2024/0338921 A1 | 10/2024 | Burgner et al. |
| 2024/0361832 A1 | 10/2024 | Calderone et al. |
| 2024/0361833 A1 | 10/2024 | Calderone et al. |
| 2024/0361835 A1 | 10/2024 | Hylak et al. |
| 2024/0361901 A1 | 10/2024 | Ravasz et al. |
| 2024/0393876 A1 | 11/2024 | Chawda et al. |

(56) References Cited

U.S. PATENT DOCUMENTS

| | | |
|---|---|---|
| 2024/0402800 A1 | 12/2024 | Shutzberg et al. |
| 2024/0402821 A1 | 12/2024 | Meyer et al. |
| 2024/0403080 A1 | 12/2024 | Laurita et al. |
| 2024/0404206 A1 | 12/2024 | Chiu et al. |
| 2024/0404207 A1 | 12/2024 | Laurita et al. |
| 2024/0404232 A1 | 12/2024 | Rockwell et al. |
| 2024/0404233 A1 | 12/2024 | Boesel et al. |
| 2024/0411444 A1 | 12/2024 | Shutzberg et al. |
| 2024/0420435 A1 | 12/2024 | Gitter et al. |
| 2024/0428488 A1 | 12/2024 | Ren et al. |
| 2025/0005855 A1 | 1/2025 | Holder et al. |
| 2025/0005864 A1 | 1/2025 | Dessero et al. |
| 2025/0008057 A1 | 1/2025 | Chiu et al. |
| 2025/0013343 A1 | 1/2025 | Smith et al. |
| 2025/0013344 A1 | 1/2025 | Smith et al. |
| 2025/0024008 A1 | 1/2025 | Cerra et al. |
| 2025/0028423 A1 | 1/2025 | Dessero et al. |
| 2025/0029319 A1 | 1/2025 | Boesel et al. |
| 2025/0029328 A1 | 1/2025 | Smith et al. |
| 2025/0031002 A1 | 1/2025 | Hawkins et al. |
| 2025/0036253 A1 | 1/2025 | Stauber et al. |
| 2025/0036255 A1 | 1/2025 | Pastrana Vicente et al. |
| 2025/0069328 A1 | 2/2025 | Herscher et al. |
| 2025/0077060 A1 | 3/2025 | Becker et al. |
| 2025/0077066 A1 | 3/2025 | Lutter |
| 2025/0078420 A1 | 3/2025 | Dessero et al. |
| 2025/0078429 A1 | 3/2025 | Dascola et al. |
| 2025/0103132 A1 | 3/2025 | Rickwald et al. |
| 2025/0104335 A1 | 3/2025 | Huang et al. |
| 2025/0104367 A1 | 3/2025 | Huang et al. |
| 2025/0106581 A1 | 3/2025 | Lutter et al. |
| 2025/0106582 A1 | 3/2025 | Lutter et al. |
| 2025/0110605 A1 | 4/2025 | Huang et al. |
| 2025/0111472 A1 | 4/2025 | Lutter et al. |
| 2025/0111605 A1 | 4/2025 | Huang et al. |
| 2025/0111622 A1 | 4/2025 | Stern et al. |
| 2025/0117079 A1 | 4/2025 | Chiu et al. |
| 2025/0118038 A1 | 4/2025 | Sorrentino et al. |
| 2025/0130707 A1 | 4/2025 | Stauber et al. |
| 2025/0156031 A1 | 5/2025 | Holder et al. |
| 2025/0157136 A1 | 5/2025 | Lindmeier et al. |
| 2025/0165069 A1 | 5/2025 | Calderone et al. |

FOREIGN PATENT DOCUMENTS

| | | |
|---|---|---|
| CN | 104714771 A | 6/2015 |
| CN | 104981681 A | 10/2015 |
| CN | 105264461 A | 1/2016 |
| CN | 105264478 A | 1/2016 |
| CN | 106990838 A | 7/2017 |
| CN | 108519818 A | 9/2018 |
| CN | 108633307 A | 10/2018 |
| CN | 110476142 A | 11/2019 |
| CN | 110543230 A | 12/2019 |
| CN | 110673718 A | 1/2020 |
| CN | 111641843 A | 9/2020 |
| CN | 111913565 A | 11/2020 |
| CN | 112068757 A | 12/2020 |
| CN | 109491508 B | 8/2022 |
| CN | 115309271 A | 11/2022 |
| CN | 116132905 A | 5/2023 |
| CN | 117043722 A | 11/2023 |
| CN | 117857981 A | 4/2024 |
| CN | 118102204 A | 5/2024 |
| EP | 0816983 A2 | 1/1998 |
| EP | 1530115 A2 | 5/2005 |
| EP | 1562021 A1 | 8/2005 |
| EP | 2393056 A1 | 12/2011 |
| EP | 2458486 A1 | 5/2012 |
| EP | 2551763 A1 | 1/2013 |
| EP | 2741175 A2 | 6/2014 |
| EP | 2893297 A1 | 7/2015 |
| EP | 2947545 A1 | 11/2015 |
| EP | 3088997 A1 | 11/2016 |
| EP | 3118722 A1 | 1/2017 |
| EP | 3249497 A1 | 11/2017 |
| EP | 3316075 A1 | 5/2018 |
| EP | 3336805 A1 | 6/2018 |
| EP | 3451135 A1 | 3/2019 |
| EP | 3503101 A1 | 6/2019 |
| EP | 3506151 A1 | 7/2019 |
| EP | 3570144 A1 | 11/2019 |
| EP | 3588255 A1 | 1/2020 |
| EP | 3654147 A1 | 5/2020 |
| EP | 4155867 A1 | 3/2023 |
| EP | 3688726 B1 | 8/2023 |
| GB | 2540791 A | 2/2017 |
| JP | H06-4596 A | 1/1994 |
| JP | H10-51711 A | 2/1998 |
| JP | H10-78845 A | 3/1998 |
| JP | H11-289555 A | 10/1999 |
| JP | 2005-215144 A | 8/2005 |
| JP | 2005-333524 A | 12/2005 |
| JP | 2006-4093 A | 1/2006 |
| JP | 2006-107048 A | 4/2006 |
| JP | 2006-146803 A | 6/2006 |
| JP | 2006-295236 A | 10/2006 |
| JP | 2011-203880 A | 10/2011 |
| JP | 2012-234550 A | 11/2012 |
| JP | 2013-178639 A | 9/2013 |
| JP | 2013-196158 A | 9/2013 |
| JP | 2013-254358 A | 12/2013 |
| JP | 2013-257716 A | 12/2013 |
| JP | 2014-21565 A | 2/2014 |
| JP | 2014-59840 A | 4/2014 |
| JP | 2014-71663 A | 4/2014 |
| JP | 2014-99184 A | 5/2014 |
| JP | 2014-514652 A | 6/2014 |
| JP | 2015-56173 A | 3/2015 |
| JP | 2015-515040 A | 5/2015 |
| JP | 2015-118332 A | 6/2015 |
| JP | 2016-96513 A | 5/2016 |
| JP | 2016-194744 A | 11/2016 |
| JP | 2017-27206 A | 2/2017 |
| JP | 2017-58528 A | 3/2017 |
| JP | 2017-126009 A | 7/2017 |
| JP | 2017-531221 A | 10/2017 |
| JP | 2018-5516 A | 1/2018 |
| JP | 2018-5517 A | 1/2018 |
| JP | 2018-41477 A | 3/2018 |
| JP | 2018-514005 A | 5/2018 |
| JP | 2018-88118 A | 6/2018 |
| JP | 2018-101019 A | 6/2018 |
| JP | 2018-106499 A | 7/2018 |
| JP | 6438869 B2 | 12/2018 |
| JP | 2019-40333 A | 3/2019 |
| JP | 2019-169154 A | 10/2019 |
| JP | 2019-175449 A | 10/2019 |
| JP | 2019-532382 A | 11/2019 |
| JP | 2019-536131 A | 12/2019 |
| JP | 2020-503595 A | 1/2020 |
| JP | 2020-86913 A | 6/2020 |
| JP | 2022-53334 A | 4/2022 |
| JP | 2022-175629 A | 11/2022 |
| JP | 2023-52278 A | 4/2023 |
| KR | 10-2011-0017236 A | 2/2011 |
| KR | 20140097654 A | 8/2014 |
| KR | 10-2016-0012139 A | 2/2016 |
| KR | 20170027240 A | 3/2017 |
| KR | 20180102171 A | 9/2018 |
| KR | 10-2019-0100957 A | 8/2019 |
| KR | 10-2020-0010296 A | 1/2020 |
| KR | 10-2020-0035103 A | 4/2020 |
| KR | 20200110788 A | 9/2020 |
| KR | 20200135496 A | 12/2020 |
| KR | 10-2021-0083016 A | 7/2021 |
| WO | 2010/026519 A1 | 3/2010 |
| WO | 2011/008638 A1 | 1/2011 |
| WO | 2012/145180 A1 | 10/2012 |
| WO | 2014/203301 A1 | 12/2014 |
| WO | 2015/130150 A1 | 9/2015 |
| WO | 2015/192117 A1 | 12/2015 |
| WO | 2015/195216 A1 | 12/2015 |
| WO | 2016/118344 A1 | 7/2016 |

(56) References Cited

FOREIGN PATENT DOCUMENTS

| | | |
|---|---|---|
| WO | 2017/024142 A1 | 2/2017 |
| WO | 2017/088487 A1 | 6/2017 |
| WO | 2018/046957 A2 | 3/2018 |
| WO | 2018/090060 A1 | 5/2018 |
| WO | 2018/175735 A1 | 9/2018 |
| WO | 2019/067902 A1 | 4/2019 |
| WO | 2019/074771 A1 | 4/2019 |
| WO | 2019/142560 A1 | 7/2019 |
| WO | 2019/172678 A1 | 9/2019 |
| WO | 2019/213111 A1 | 11/2019 |
| WO | 2019/217163 A1 | 11/2019 |
| WO | 2020/066682 A1 | 4/2020 |
| WO | 2020/121483 A1 | 6/2020 |
| WO | 2020/247256 A1 | 12/2020 |
| WO | 2021/061349 A1 | 4/2021 |
| WO | 2021/061351 A1 | 4/2021 |
| WO | 2021/133053 A1 | 7/2021 |
| WO | 2021/173839 A1 | 9/2021 |
| WO | 2021/202783 A1 | 10/2021 |
| WO | 2022/046340 A1 | 3/2022 |
| WO | 2022/055821 A1 | 3/2022 |
| WO | 2022/055822 A1 | 3/2022 |
| WO | 2022/066399 A1 | 3/2022 |
| WO | 2022/066535 A2 | 3/2022 |
| WO | 2022/067075 A1 | 3/2022 |
| WO | 2022/067343 A2 | 3/2022 |
| WO | 2022/072187 A2 | 4/2022 |
| WO | 2022/146936 A1 | 7/2022 |
| WO | 2022/146938 A1 | 7/2022 |
| WO | 2022/147146 A1 | 7/2022 |
| WO | 2022/164881 A1 | 8/2022 |
| WO | 2022/192040 A1 | 9/2022 |
| WO | 2022/208797 A1 | 10/2022 |
| WO | 2022/225795 A1 | 10/2022 |
| WO | 2023/043646 A1 | 3/2023 |
| WO | 2023/096940 A2 | 6/2023 |
| WO | 2023/141535 A1 | 7/2023 |

OTHER PUBLICATIONS

Area Light, Available online at: https://manual.keyshot.com/manual/materials/material-types/light-sources/area-light/, [retrieved on Jun. 9, 2023], 24 pages.
Artec Leo Full 3D Scanning Demo w/ Sample Data, Digitize Designs, LLC, Available online at: <https://www.youtube.com/watch?v=ecBKo_h3Pug>, [retrieved on Sep. 1, 2022], Feb. 22, 2019, 3 pages.
Feature Highlights, Available online at: https://manual.keyshot.com/manual/whats-new/feature-highlights/, [retrieved on Jun. 9, 2023], 28 pages.
Final Office Action received for U.S. Appl. No. 17/469,788, mailed on Nov. 16, 2023, 24 pages.
Final Office Action received for U.S. Appl. No. 17/807,226, mailed on Nov. 30, 2023, 23 pages.
Final Office Action received for U.S. Appl. No. 17/812,965, mailed on Jan. 31, 2024, 9 pages.
Slambekova, Dana, "Gaze and Gesture Based Object Interaction in Virtual World", [retrieved on Dec. 17, 2015]. Retrieved from the Internet: <URL:https://www.cs.rit.edu/~dxs4659/Report.pdf>, May 31, 2012, 54 pages.
International Search Report received for PCT Patent Application No. PCT/US2021/049520, mailed on Apr. 8, 2022, 8 pages.
International Search Report received for PCT Patent Application No. PCT/US2022/071208, mailed on Aug. 18, 2022, 9 pages.
Light Manager, Available online at: https://manual.keyshot.com/manual/lighting/lighting-manager/, [retrieved on Jun. 9, 2023], 3 pages.
Non Final Office Action received for U.S. Appl. No. 17/814,455, mailed on Feb. 16, 2024, 24 pages.
Non-Final Office Action received for U.S. Appl. No. 17/469,788, mailed on Mar. 2, 2023, 22 pages.
Non-Final Office Action received for U.S. Appl. No. 17/807,226, mailed on Jun. 26, 2023, 21 pages.
Non-Final Office Action received for U.S. Appl. No. 17/812,965, mailed on Jun. 8, 2023, 8 pages.
Non-Final Office Action received for U.S. Appl. No. 17/814,462, mailed on Feb. 1, 2024, 30 pages.
Notice of Allowance received for U.S. Appl. No. 17/807,236, mailed on Feb. 5, 2024, 13 pages.
Notice of Allowance received for U.S. Appl. No. 18/317,893, mailed on Nov. 22, 2023, 9 pages.
Restriction Requirement received for U.S. Appl. No. 17/905,483, mailed on Dec. 7, 2023, 7 pages.
Search Report received for United Kingdom Patent Application No. GB2210885.6, mailed on Jan. 27, 2023, 1 page.
Cas and Chary XR, "Oculus Go & Your Phone As 2nd Controller!!—An Inexpensive Way To Play PC VR Games", posted on Mar. 8, 2019, https://www.youtube.com/watch?v=i_iRVa0kemw, 2019, 4 pages.
Gamedbharat, "I Want to Rotate a Object on Double Tap, Can Any One Help Me With This?", posted on Jul. 26, 2017, https://discussions.unity.com/t/i-want-to-rotate-a-object-on-double-tap-can-any-one-help-me-with-this/192010, 2017, 3 pages.
Locher et al., "Mobile Phone and Cloud—a Dream Team for 3D Reconstruction", 2016 IEEE Winter Conference on Applications of Computer Vision (WACV), 2016, pp. 1-8.
Ex Parte Quayle Action received for U.S. Appl. No. 17/655,347, mailed on Jul. 8, 2024, 6 pages.
International Search Report received for PCT Patent Application No. PCT/US2023/074955, mailed on Feb. 1, 2024, 6 pages.
Non-Final Office Action received for U.S. Appl. No. 17/469,788, mailed on Mar. 21, 2024, 24 pages.
Non-Final Office Action received for U.S. Appl. No. 17/905,483, mailed on Mar. 27, 2024, 16 pages.
Non-Final Office Action received for U.S. Appl. No. 18/317,893, mailed on Apr. 25, 2024, 18 pages.
Notice of Allowance received for U.S. Appl. No. 17/807,226, mailed on Jul. 3, 2024, 9 pages.
Notice of Allowance received for U.S. Appl. No. 17/807,236, mailed on Jul. 10, 2024, 9 pages.
Notice of Allowance received for U.S. Appl. No. 18/317,893, mailed on Mar. 6, 2024, 8 pages.
Ro et al., "AR Pointer: Advanced Ray-Casting Interface Using Laser Pointer Metaphor for Object Manipulation in 3D Augmented Reality Environment", Applied Sciences, vol. 9, No. 3078, [retrieved on Jul. 27, 2020], Jul. 30, 2019, 18 pages.
Final Office Action received for U.S. Appl. No. 17/814,462, mailed on Nov. 1, 2024, 44 pages.
Notice of Allowance received for U.S. Appl. No. 17/469,788, mailed on Oct. 15, 2024, 7 pages.
Notice of Allowance received for U.S. Appl. No. 17/655,347, mailed on Oct. 9, 2024, 7 pages.
Notice of Allowance received for U.S. Appl. No. 17/812,965, mailed on Jul. 26, 2024, 6 pages.
Notice of Allowance received for U.S. Appl. No. 17/812,965, mailed on Nov. 15, 2024, 6 pages.
Notice of Allowance received for U.S. Appl. No. 17/814,455, mailed on Oct. 7, 2024, 10 pages.
Notice of Allowance received for U.S. Appl. No. 18/473,180, mailed on Aug. 22, 2024, 13 pages.
Extended European Search Report received for European Patent Application No. 25169060.8, mailed on May 12, 2025, 10 pages.
Extended European Search Report received for European Patent Application No. 25169059.0, mailed on May 12, 2025, 11 pages.
Non-Final Office Action received for U.S. Appl. No. 18/473,197, mailed on May 1, 2025, 14 pages.
Notice of Allowance received for U.S. Appl. No. 18/322,469, mailed on Mar. 19, 2025, 14 pages.
Non-Final Office Action received for U.S. Appl. No. 18/473,187, mailed on May 16, 2025, 15 pages.
Corrected Notice of Allowability received for U.S. Appl. No. 18/146,234, mailed on Mar. 20, 2025, 2 pages.
Corrected Notice of Allowability received for U.S. Appl. No. 18/473,180, mailed on Apr. 1, 2025, 2 pages.

(56) References Cited

OTHER PUBLICATIONS

Non-Final Office Action received for U.S. Appl. No. 18/473,176, mailed on May 14, 2025, 23 pages.
Final Office Action received for U.S. Appl. No. 18/149,640, mailed on May 21, 2025, 24 pages.
Non-Final Office Action received for U.S. Appl. No. 18/174,403, mailed on Mar. 20, 2025, 26 pages.
Non-Final Office Action received for U.S. Appl. No. 18/317,890, mailed on Apr. 17, 2025, 26 pages.
Non-Final Office Action received for U.S. Appl. No. 18/327,844, mailed on Mar. 24, 2025, 27 pages.
Final Office Action received for U.S. Appl. No. 17/933,020, mailed on May 21, 2025, 28 pages.
Non-Final Office Action received for U.S. Appl. No. 18/317,886, mailed on Apr. 30, 2025, 34 pages.
European Search Report received for European Patent Application No. 22723527.2, mailed on May 12, 2025, 4 pages.
International Search Report received for PCT Patent Application No. PCT/US2023/074978, mailed on Apr. 4, 2024, 4 pages.
International Search Report received for PCT Patent Application No. PCT/US2024/012828, mailed on May 6, 2024, 4 pages.
International Search Report received for PCT Patent Application No. PCT/US2024/032109, mailed on Sep. 13, 2024, 4 pages.
International Search Report received for PCT Patent Application No. PCT/US2024/043470, mailed on Oct. 29, 2024, 4 pages.
International Search Report received for PCT Patent Application No. PCT/US2023/074960, mailed on Feb. 12, 2024, 6 pages.
International Search Report received for PCT Patent Application No. PCT/US2024/032153, mailed on Nov. 11, 2024, 6 pages.
Extended European Search Report received for European Patent Application No. EP24221722.2, mailed on Apr. 17, 2025, 7 pages.
International Search Report received for PCT Patent Application No. PCT/US2023/074973, mailed on Mar. 7, 2024, 7 pages.
Non-Final Office Action received for U.S. Appl. No. 18/882,622, mailed on May 22, 2025, 8 pages.
Notice of Allowance received for U.S. Appl. No. 18/473,182, mailed on Apr. 23, 2025, 8 pages.
Notice of Allowance received for U.S. Appl. No. 17/655,521, mailed on Apr. 16, 2025, 8 pages.
Notice of Allowance received for U.S. Appl. No. 18/427,434, mailed on Apr. 17, 2025, 9 pages.
Notice of Allowance received for U.S. Appl. No. 18/473,179, mailed on May 8, 2025, 9 pages.
Notice of Allowance received for U.S. Appl. No. 18/515,188, mailed on Mar. 20, 2025, 9 pages.
Applicant-Initiated Interview Summary received for U.S. Appl. No. 18/119,219, mailed on May 21, 2024, 3 pages.
AquaSnap Window Manager: dock, snap, tile, organize [online], Nurgo Software, Available online at: <https://www.nurgo-software.com/products/aquasnap>, [retrieved on Jul. 27, 2023], 5 pages.
Artec Leo, Artec 3D [online], 2018 [retrieved on Apr. 25, 2024]. Retrieved from the Internet: <URL: https://artec3d.com/portable-3d-scanners/artec-leo>, 39 pages.
Corrected Notice of Allowability received for U.S. Appl. No. 17/448,875, mailed on Apr. 24, 2024, 4 pages.
Corrected Notice of Allowability received for U.S. Appl. No. 17/469,788, mailed on Feb. 12, 2025, 2 pages.
Corrected Notice of Allowability received for U.S. Appl. No. 17/479,791, mailed on May 19, 2023, 2 pages.
Corrected Notice of Allowability received for U.S. Appl. No. 17/659,147, mailed on Feb. 14, 2024, 6 pages.
Corrected Notice of Allowability received for U.S. Appl. No. 17/932,655, mailed on Oct. 12, 2023, 2 pages.
Corrected Notice of Allowability received for U.S. Appl. No. 17/932,999, mailed on Feb. 20, 2025, 2 pages.
Corrected Notice of Allowability received for U.S. Appl. No. 17/932,999, mailed on Jan. 23, 2025, 9 pages.
Corrected Notice of Allowability received for U.S. Appl. No. 17/935,095, mailed on Oct. 18, 2024, 3 pages.
Corrected Notice of Allowability received for U.S. Appl. No. 18/146,234, mailed on Feb. 6, 2025, 2 pages.
Corrected Notice of Allowability received for U.S. Appl. No. 18/154,757, mailed on Aug. 30, 2024, 2 pages.
Corrected Notice of Allowability received for U.S. Appl. No. 18/174,337, mailed on Jan. 15, 2025, 2 pages.
Corrected Notice of Allowability received for U.S. Appl. No. 18/421,827, mailed on Aug. 29, 2024, 2 pages.
Corrected Notice of Allowability received for U.S. Appl. No. 18/463,739, mailed on Oct. 4, 2024, 2 pages.
Corrected Notice of Allowability received for U.S. Appl. No. 18/465,098, mailed on Mar. 13, 2024, 3 pages.
Corrected Notice of Allowance received for U.S. Appl. No. 17/478,593, mailed on Dec. 21, 2022, 2 pages.
Corrected Notice of Allowance received for U.S. Appl. No. 18/119,219, mailed on Sep. 11, 2024, 2 pages.
Corrected Notice of Allowance received for U.S. Appl. No. 18/152,656, mailed on Dec. 20, 2024, 5 pages.
Curious Blocks Alternatives 12, progsoft [online]. Profsoft, Available Online at: <URL: https://progsoft.net/en/software/curious-blocks>, [retrieved on Apr. 25, 2024], 2024, 7 pages.
European Search Report received for European Patent Application No. 21791153.6, mailed on Mar. 22, 2024, 5 pages.
European Search Report received for European Patent Application No. 21801378.7, mailed on Jul. 10, 2024, 5 pages.
European Search Report received for European Patent Application No. 22703771.0, mailed on Feb. 26, 2025, 4 pages.
Extended European Search Report received for European Patent Application No. 23158818.7, mailed on Jul. 3, 2023, 12 pages.
Extended European Search Report received for European Patent Application No. 23158929.2, mailed on Jun. 27, 2023, 12 pages.
Extended European Search Report received for European Patent Application No. 23197572.3, mailed on Feb. 19, 2024, 7 pages.
Extended European Search Report received for European Patent Application No. 24158036.4, mailed on Jul. 18, 2024, 12 pages.
Extended European Search Report received for European Patent Application No. 24159868.9, mailed on Oct. 9, 2024, 13 pages.
Extended European Search Report received for European Patent Application No. 24171800.6, mailed on Sep. 5, 2024, 15 pages.
Extended European Search Report received for European Patent Application No. 24171804.8, mailed on Sep. 5, 2024, 13 pages.
Extended European Search Report received for European Patent Application No. 24178730.8, mailed on Oct. 14, 2024, 8 pages.
Extended European Search Report received for European Patent Application No. 24178752.2, mailed on Oct. 4, 2024, 8 pages.
Extended European Search Report received for European Patent Application No. 24179233.2, mailed on Oct. 2, 2024, 10 pages.
Extended European Search Report received for European Patent Application No. 24179830.5, mailed on Nov. 5, 2024, 11 pages.
Extended European Search Report received for European Patent Application No. 24190323.6, mailed on Dec. 12, 2024, 9 pages.
Extended European Search Report received for European Patent Application No. 24217335.9, mailed on Feb. 24, 2025, 8 pages.
Eye-supported target positioning in MRTK, Mixed Reality Toolkit Documentation [online]. Features and Architecture [retrieved on Mar. 21, 2025]. Retrieved from the Internet: <URL: https://microsoft.github.io/MixedRealityToolkit-Unity/Documentation/Eye_Tracking/Eye_Tracking_Positioning.html>, 2 pages.
Final Office Action received for U.S. Appl. No. 14/531,874, mailed on Nov. 4, 2016, 10 pages.
Final Office Action received for U.S. Appl. No. 15/644,639, mailed on Sep. 19, 2019, 12 pages.
Final Office Action received for U.S. Appl. No. 17/202,034, mailed on May 4, 2023, 41 pages.
Final Office Action received for U.S. Appl. No. 17/202,034, mailed on Nov. 4, 2024, 50 pages.
Final Office Action received for U.S. Appl. No. 17/448,875, mailed on Mar. 16, 2023, 24 pages.
Final Office Action received for U.S. Appl. No. 17/580,495, mailed on Feb. 12, 2025, 29 pages.
Final Office Action received for U.S. Appl. No. 17/580,495, mailed on May 13, 2024, 29 pages.

(56) References Cited

OTHER PUBLICATIONS

Final Office Action received for U.S. Appl. No. 17/655,521, mailed on Apr. 10, 2024, 18 pages.
Final Office Action received for U.S. Appl. No. 17/659,147, mailed on Oct. 4, 2023, 17 pages.
Final Office Action received for U.S. Appl. No. 17/816,314, mailed on Jan. 20, 2023, 11 pages.
Final Office Action received for U.S. Appl. No. 17/905,483, mailed on Jan. 8, 2025, 19 pages.
Final Office Action received for U.S. Appl. No. 17/934,104, mailed on Oct. 18, 2024, 28 pages.
Final Office Action received for U.S. Appl. No. 17/935,095, mailed on Dec. 29, 2023, 15 pages.
Final Office Action received for U.S. Appl. No. 18/157,040, mailed on Dec. 2, 2024, 25 pages.
Final Office Action received for U.S. Appl. No. 18/182,300, mailed on Feb. 16, 2024, 32 pages.
Final Office Action received for U.S. Appl. No. 18/182,300, mailed on Oct. 31, 2024, 34 pages.
Final Office Action received for U.S. Appl. No. 18/327,844, mailed on Nov. 29, 2024, 25 pages.
Final Office Action received for U.S. Appl. No. 18/375,280, mailed on Jul. 12, 2024, 19 pages.
Final Office Action received for U.S. Appl. No. 18/473,196, mailed on Dec. 6, 2024, 22 pages.
Home | Virtual Desktop [online], Virtual Desktop, Available online at: <https://www.vrdesktop.net>, [retrieved on Jun. 29, 2023], 4 pages.
How to Use Your Phone or Tablet in VR! | iOS and Android, YouTube [online]. YouTube, Dec. 20, 2017, Available online at <https://www.youtube.com/watch?v=QhfZjbVUxZE>, [Retrieved from Internet on Dec. 23, 2022], 4 pages.
International Search Report received for PCT Application No. PCT/US2022/076603, mailed on Jan. 9, 2023, 4 pages.
International Search Report received for PCT Application No. PCT/US2022/076608, mailed Feb. 24, 2023, 8 pages.
International Search Report received for PCT Application No. PCT/US2022/076719, mailed on Mar. 3, 2023, 8 pages.
International Search Report received for PCT Application No. PCT/US2023/018213, mailed on Jul. 26, 2023, 6 pages.
International Search Report received for PCT Application No. PCT/US2023/060052, mailed on May 24, 2023, 6 pages.
International Search Report received for PCT Application No. PCT/US2023/060943, mailed on Jun. 6, 2023, 7 pages.
International Search Report received for PCT Application No. PCT/US2023/074962, mailed on Jan. 19, 2024, 9 pages.
International Search Report received for PCT Application No. PCT/US2024/030107, mailed on Oct. 23, 2024, 9 pages.
International Search Report received for PCT Application No. PCT/US2024/032314, mailed on Nov. 11, 2024, 6 pages.
International Search Report received for PCT Application No. PCT/US2024/032451, mailed on Nov. 15, 2024, 6 pages.
International Search Report received for PCT Application No. PCT/US2024/032456, mailed on Nov. 14, 2024, 6 pages.
International Search Report received for PCT Patent Application No. PCT/US2015/029727, mailed on Nov. 2, 2015, 6 pages.
International Search Report received for PCT Patent Application No. PCT/US2021/022413, mailed on Aug. 13, 2021, 7 pages.
International Search Report received for PCT Patent Application No. PCT/US2021/050948, mailed on Mar. 4, 2022, 6 pages.
International Search Report received for PCT Patent Application No. PCT/US2021/071518, mailed on Feb. 25, 2022, 7 pages.
International Search Report received for PCT Patent Application No. PCT/US2021/071595, mailed on Mar. 17, 2022, 7 pages.
International Search Report received for PCT Patent Application No. PCT/US2021/071596, mailed on Apr. 8, 2022, 7 pages.
International Search Report received for PCT Patent Application No. PCT/US2022/013208, mailed on Apr. 26, 2022, 7 pages.
International Search Report received for PCT Patent Application No. PCT/US2022/071228, mailed on Aug. 25, 2022, 6 pages.
International Search Report received for PCT Patent Application No. PCT/US2022/071704, mailed on Aug. 26, 2022, 6 pages.
International Search Report received for PCT Patent Application No. PCT/US2022/076808, mailed on Mar. 28, 2023, 6 pages.
International Search Report received for PCT Patent Application No. PCT/US2022/076985, mailed on Feb. 20, 2023, 5 pages.
International Search Report received for PCT Patent Application No. PCT/US2022/082379, mailed on May 30, 2023, 7 pages.
International Search Report received for PCT Patent Application No. PCT/US2023/019309, mailed on Sep. 1, 2023, 6 pages.
International Search Report received for PCT Patent Application No. PCT/US2023/060429, mailed on Jun. 28, 2023, 7 pages.
International Search Report received for PCT Patent Application No. PCT/US2023/060592, mailed on Jun. 14, 2023, 7 pages.
International Search Report received for PCT Patent Application No. PCT/US2023/074257, mailed on Nov. 21, 2023, 5 pages.
International Search Report received for PCT Patent Application No. PCT/US2023/074793, mailed on Feb. 6, 2024, 6 pages.
International Search Report received for PCT Patent Application No. PCT/US2023/074950, mailed on Jan. 3, 2024, 7 pages.
International Search Report received for PCT Patent Application No. PCT/US2023/074957, mailed on Jan. 30, 2024, 7 pages.
International Search Report received for PCT Patent Application No. PCT/US2023/074968, mailed on Feb. 26, 2024, 7 pages.
International Search Report received for PCT Patent Application No. PCT/US2023/074979, mailed on Feb. 26, 2024, 6 pages.
International Search Report received for PCT Patent Application No. PCT/US2024/013602, mailed on Apr. 29, 2024, 4 pages.
International Search Report received for PCT Patent Application No. PCT/US2024/026102, mailed on Aug. 26, 2024, 5 pages.
International Search Report received for PCT Patent Application No. PCT/US2024/030661, mailed on Nov. 4, 2024, 5 pages.
International Search Report received for PCT Patent Application No. PCT/US2024/032140, mailed on Sep. 10, 2024, 4 pages.
International Search Report received for PCT Patent Application No. PCT/US2024/032423, mailed on Sep. 25, 2024, 5 pages.
International Search Report received for PCT Patent Application No. PCT/US2024/032455, mailed on Sep. 25, 2024, 4 pages.
International Search Report received for PCT Patent Application No. PCT/US2024/039190, mailed on Nov. 22, 2024, 5 pages.
International Search Report received for PCT Patent Application No. PCT/US2024/039204, mailed on Nov. 14, 2024, 4 pages.
Kitasenju Design, X [online], X Corp., Available Online at: <URL: https://twitter.com/kitasenjudesign/status/1282665402812608513>, [retrieved on Apr. 25, 2024], 2024, 1 page.
Letter Restarting Period for Response received for U.S. Appl. No. 15/644,639, mailed on Sep. 28, 2018, 8 pages.
MagicaVoxel 0.99.5 Review, YouTube [online], Google LLC, Available Online at: <URL: https://www.youtube.com/watch?v=WPPFnHQWwFk>, [retrieved on Apr. 25, 2024], 2024, 2 pages.
Non-Final Office Action received for U.S. Appl. No. 14/531,874, mailed on May 18, 2016, 11 pages.
Non-Final Office Action received for U.S. Appl. No. 15/644,639, mailed on Apr. 12, 2019, 11 pages.
Non-Final Office Action received for U.S. Appl. No. 15/644,639, mailed on Sep. 10, 2018, 9 pages.
Non-Final Office Action received for U.S. Appl. No. 16/881,599, mailed on Apr. 28, 2021, 8 pages.
Non-Final Office Action received for U.S. Appl. No. 17/123,000, mailed on Nov. 12, 2021, 8 pages.
Non-Final Office Action received for U.S. Appl. No. 17/202,034, mailed on Jan. 19, 2024, 44 pages.
Non-Final Office Action received for U.S. Appl. No. 17/202,034, mailed on Jul. 20, 2022, 38 pages.
Non-Final Office Action received for U.S. Appl. No. 17/448,875, mailed on Oct. 6, 2022, 25 pages.
Non-Final Office Action received for U.S. Appl. No. 17/448,875, mailed on Sep. 29, 2023, 30 pages.
Non-Final Office Action received for U.S. Appl. No. 17/479,791, mailed on May 11, 2022, 18 pages.
Non-Final Office Action received for U.S. Appl. No. 17/580,495, mailed on Aug. 15, 2024, 28 pages.

(56) References Cited

OTHER PUBLICATIONS

Non-Final Office Action received for U.S. Appl. No. 17/580,495, mailed on Dec. 11, 2023, 27 pages.
Non-Final Office Action received for U.S. Appl. No. 17/655,521, mailed on Aug. 23, 2023, 13 pages.
Non-Final Office Action received for U.S. Appl. No. 17/655,521, mailed on Nov. 27, 2024, 17 pages.
Non-Final Office Action received for U.S. Appl. No. 17/659,147, mailed on Mar. 16, 2023, 19 pages.
Non-Final Office Action received for U.S. Appl. No. 17/816,314, mailed on Jul. 6, 2023, 10 pages.
Non-Final Office Action received for U.S. Appl. No. 17/816,314, mailed on Sep. 23, 2022, 10 pages.
Non-Final Office Action received for U.S. Appl. No. 17/932,655, mailed on Apr. 20, 2023, 10 pages.
Non-Final Office Action received for U.S. Appl. No. 17/932,999, mailed on Feb. 23, 2024, 22 pages.
Non-Final Office Action received for U.S. Appl. No. 17/933,020, mailed on Jan. 30, 2025, 26 pages.
Non-Final Office Action received for U.S. Appl. No. 17/934,104, mailed on Mar. 25, 2024, 26 pages.
Non-Final Office Action received for U.S. Appl. No. 17/935,095, mailed on Jun. 22, 2023, 15 pages.
Non-Final Office Action received for U.S. Appl. No. 18/119,219, mailed on Mar. 28, 2024, 15 pages.
Non-Final Office Action received for U.S. Appl. No. 18/149,640, mailed on Jan. 15, 2025, 17 pages.
Non-Final Office Action received for U.S. Appl. No. 18/153,943, mailed on Dec. 31, 2024, 33 pages.
Non-Final Office Action received for U.S. Appl. No. 18/154,697, mailed on Nov. 24, 2023, 10 pages.
Non-Final Office Action received for U.S. Appl. No. 18/157,040, mailed on May 2, 2024, 25 pages.
Non-Final Office Action received for U.S. Appl. No. 18/182,300, mailed on May 29, 2024, 33 pages.
Non-Final Office Action received for U.S. Appl. No. 18/182,300, mailed on Oct. 26, 2023, 29 pages.
Non-Final Office Action received for U.S. Appl. No. 18/298,994, mailed on Mar. 7, 2025, 26 pages.
Non-Final Office Action received for U.S. Appl. No. 18/304,290, mailed on Mar. 5, 2025, 111 pages.
Non-Final Office Action received for U.S. Appl. No. 18/322,469, mailed on Nov. 15, 2024, 34 pages.
Non-Final Office Action received for U.S. Appl. No. 18/327,844, mailed on May 17, 2024, 20 pages.
Non-Final Office Action received for U.S. Appl. No. 18/336,770, mailed on Jun. 5, 2024, 12 pages.
Non-Final Office Action received for U.S. Appl. No. 18/375,280, mailed on Nov. 27, 2024, 17 pages.
Non-Final Office Action received for U.S. Appl. No. 18/424,644, mailed on Jan. 29, 2025, 18 pages.
Non-Final Office Action received for U.S. Appl. No. 18/427,434, mailed on Nov. 21, 2024, 17 pages.
Non-Final Office Action received for U.S. Appl. No. 18/429,301, mailed on Jun. 12, 2024, 28 pages.
Non-Final Office Action received for U.S. Appl. No. 18/473,196, mailed on Aug. 16, 2024, 21 pages.
Non-Final Office Action received for U.S. Appl. No. 18/473,196, mailed on Feb. 28, 2025, 20 pages.
Non-Final Office Action received for U.S. Appl. No. 18/645,292, mailed on Feb. 21, 2025, 39 pages.
Non-Final Office Action received for U.S. Appl. No. 18/988,115, mailed on Feb. 24, 2025, 40 pages.
Notice of Allowability received for U.S. Appl. No. 17/812,965, mailed on Jan. 15, 2025, 3 pages.
Notice of Allowability received for U.S. Appl. No. 17/814,455, mailed on Jan. 13, 2025, 7 pages.
Notice of Allowance received for U.S. Appl. No. 18/154,757, mailed on Aug. 26, 2024, 12 pages.
Notice of Allowance received for U.S. Appl. No. 14/531,874, mailed on Mar. 28, 2017, 9 pages.
Notice of Allowance received for U.S. Appl. No. 15/644,639, mailed on Jan. 16, 2020, 16 pages.
Notice of Allowance received for U.S. Appl. No. 16/881,599, mailed on Dec. 17, 2021, 7 pages.
Notice of Allowance received for U.S. Appl. No. 17/123,000, mailed on May 27, 2022, 8 pages.
Notice of Allowance received for U.S. Appl. No. 17/123,000, mailed on Sep. 19, 2022, 7 pages.
Notice of Allowance received for U.S. Appl. No. 17/448,875, mailed on Apr. 17, 2024, 8 pages.
Notice of Allowance received for U.S. Appl. No. 17/448,875, mailed on Jul. 12, 2024, 8 pages.
Notice of Allowance received for U.S. Appl. No. 17/448,876, mailed on Apr. 7, 2022, 9 pages.
Notice of Allowance received for U.S. Appl. No. 17/448,876, mailed on Jul. 20, 2022, 8 pages.
Notice of Allowance received for U.S. Appl. No. 17/469,788, mailed on Feb. 5, 2025, 5 pages.
Notice of Allowance received for U.S. Appl. No. 17/478,593, mailed on Aug. 31, 2022, 10 pages.
Notice of Allowance received for U.S. Appl. No. 17/479,791, mailed on Mar. 13, 2023, 9 pages.
Notice of Allowance received for U.S. Appl. No. 17/479,791, mailed on Nov. 17, 2022, 9 pages.
Notice of Allowance received for U.S. Appl. No. 17/580,495, mailed on Jun. 6, 2023, 6 pages.
Notice of Allowance received for U.S. Appl. No. 17/580,495, mailed on Nov. 30, 2022, 12 pages.
Notice of Allowance received for U.S. Appl. No. 17/650,775, mailed on Jan. 25, 2024, 10 pages.
Notice of Allowance received for U.S. Appl. No. 17/650,775, mailed on Sep. 18, 2023, 10 pages.
Notice of Allowance received for U.S. Appl. No. 17/655,347, mailed on Feb. 20, 2025, 7 pages.
Notice of Allowance received for U.S. Appl. No. 17/659,147, mailed on Jan. 26, 2024, 13 pages.
Notice of Allowance received for U.S. Appl. No. 17/659,147, mailed on May 29, 2024, 13 pages.
Notice of Allowance received for U.S. Appl. No. 17/814,462, mailed on Feb. 26, 2025, 8 pages.
Notice of Allowance received for U.S. Appl. No. 17/816,314, mailed on Jan. 4, 2024, 6 pages.
Notice of Allowance received for U.S. Appl. No. 17/932,655, mailed on Jan. 24, 2024, 7 pages.
Notice of Allowance received for U.S. Appl. No. 17/932,655, mailed on Sep. 29, 2023, 7 pages.
Notice of Allowance received for U.S. Appl. No. 17/932,999, mailed on Sep. 12, 2024, 9 pages.
Notice of Allowance received for U.S. Appl. No. 17/933,707, mailed on Jun. 28, 2024, 8 pages.
Notice of Allowance received for U.S. Appl. No. 17/933,707, mailed on Mar. 6, 2024, 9 pages.
Notice of Allowance received for U.S. Appl. No. 17/935,095, mailed on Jul. 3, 2024, 9 pages.
Notice of Allowance received for U.S. Appl. No. 18/119,219, mailed on Jul. 22, 2024, 7 pages.
Notice of Allowance received for U.S. Appl. No. 18/146,234, mailed on Jan. 24, 2025, 12 pages.
Notice of Allowance received for U.S. Appl. No. 18/152,656, mailed on Dec. 17, 2024, 12 pages.
Notice of Allowance received for U.S. Appl. No. 18/154,697, mailed on Aug. 6, 2024, 8 pages.
Notice of Allowance received for U.S. Appl. No. 18/154,697, mailed on Dec. 3, 2024, 7 pages.
Notice of Allowance received for U.S. Appl. No. 18/154,757, mailed on Jan. 23, 2024, 10 pages.
Notice of Allowance received for U.S. Appl. No. 18/154,757, mailed on Jan. 23, 2025, 12 pages.
Notice of Allowance received for U.S. Appl. No. 18/154,757, mailed on May 10, 2024, 12 pages.

(56) References Cited

OTHER PUBLICATIONS

Notice of Allowance received for U.S. Appl. No. 18/174,337, mailed on Jan. 2, 2025, 8 pages.
Notice of Allowance received for U.S. Appl. No. 18/182,304, mailed on Jan. 24, 2024, 9 pages.
Notice of Allowance received for U.S. Appl. No. 18/182,304, mailed on Oct. 2, 2023, 9 pages.
Notice of Allowance received for U.S. Appl. No. 18/317,893, mailed on Jan. 13, 2025, 11 pages.
Notice of Allowance received for U.S. Appl. No. 18/336,770, mailed on Nov. 29, 2024, 9 pages.
Notice of Allowance received for U.S. Appl. No. 18/421,675, mailed on Apr. 11, 2024, 9 pages.
Notice of Allowance received for U.S. Appl. No. 18/421,675, mailed on Jul. 31, 2024, 8 pages.
Notice of Allowance received for U.S. Appl. No. 18/421,827, mailed on Aug. 14, 2024, 10 pages.
Notice of Allowance received for U.S. Appl. No. 18/423,187, mailed on Jun. 5, 2024, 9 pages.
Notice of Allowance received for U.S. Appl. No. 18/429,294, mailed on Jun. 21, 2024, 10 pages.
Notice of Allowance received for U.S. Appl. No. 18/429,294, mailed on Oct. 31, 2024, 10 pages.
Notice of Allowance received for U.S. Appl. No. 18/429,301, mailed on Nov. 22, 2024, 8 pages.
Notice of Allowance received for U.S. Appl. No. 18/463,739, mailed on Feb. 1, 2024, 10 pages.
Notice of Allowance received for U.S. Appl. No. 18/463,739, mailed on Jun. 17, 2024, 9 pages.
Notice of Allowance received for U.S. Appl. No. 18/463,739, mailed on Oct. 30, 2023, 11 pages.
Notice of Allowance received for U.S. Appl. No. 18/465,098, mailed on Jun. 20, 2024, 8 pages.
Notice of Allowance received for U.S. Appl. No. 18/465,098, mailed on Mar. 4, 2024, 6 pages.
Notice of Allowance received for U.S. Appl. No. 18/465,098, mailed on Nov. 17, 2023, 8 pages.
Notice of Allowance received for U.S. Appl. No. 18/473,180, mailed on Jan. 2, 2025, 12 pages.
Notice of Allowance received for U.S. Appl. No. 18/515,188, mailed on Nov. 27, 2024, 9 pages.
Notice of Allowance received for U.S. Appl. No. 18/668,032, mailed on Jan. 16, 2025, 9 pages.
Notice of Allowance received for U.S. Appl. No. 18/671,936, mailed on Jan. 15, 2025, 9 pages.
Notice of Allowance received for U.S. Appl. No. 18/671,936, mailed on Mar. 5, 2025, 7 pages.
Open Source Voxel Editor for Windows, Mac, Linux, iOS, and Android, GOXEL [online]. Goxel by Guillaume Chereau, Available Online at: <URL: https://goxel.xyz/>, [retrieved on Apr. 25, 2024], 2024, 3 pages.
POP 2 3D Scanner (Infrared Light | Precision 0.05mm), REVPOINT [online]. Revopoint 3D, <URL: https://global.revopoint3d.com/products/face-3d-scanner-pop2?_ga=2.182721893.277596832.1650264227-586470518.1640327512&ref=dh0L07OOzRuqo&utm_campaign=pop2_banner&utm_medium=referral&utm_source=Official_Website>, [retrieved on Apr. 25, 2024], 2014, 16 pages.
Restriction Requirement received for U.S. Appl. No. 17/932,999, mailed on Oct. 3, 2023, 6 pages.
Restriction Requirement received for U.S. Appl. No. 18/473,187, mailed on Dec. 30, 2024, 5 pages.
Search Report received for Chinese Patent Application No. 202310873465.7, mailed on Feb. 1, 2024, 5 pages (2 pages of English Translation and 3 pages).
ShareVOX, PHORIA [online]. PHORIA Pty Ltd, Available Online at: <URL: https://www.phoria.com.au/projects/sharevox/>, [retrieved on Apr. 25, 2024], 2024, 2 pages.
Sliders, Mixed Reality Toolkit Documentation [online]. Features and Architecture [retrieved on 2025-03-21]. Retrieved from the Internet: <URL: https://microsoft.github.io/MixedRealityToolkit-Unity/Documentation/README_Sliders.html>, 3 pages.
Spatial Audio Head Tracking on Apple Tv Automatically Resets when You Get Up from the Couc . . . , AppleInsider [online]. Jun. 10, 2021 [retrieved on Dec. 20, 2024]. Retrieved from the Internet: <https://forums.appleinsider.com/discussion/222259/spatial-audio-head-tracking-on-apple-tv-automatically-resets-when-you-get-up-from-the-couc>, 2024, 6 pages.
Supplemental Notice of Allowability received for U.S. Appl. No. 18/317,893, mailed on Jan. 29, 2025, 3 pages.
Supplemental Notice of Allowance received for U.S. Appl. No. 14/531,874, mailed on Jul. 26, 2017, 5 pages.
Supplemental Notice of Allowance received for U.S. Appl. No. 18/515,188, mailed on Dec. 12, 2024, 2 pages.
VoxEdit Beta Tutorial—Introduction and How To Animate Voxel Creations, YouTube [online], Google LLC, Available Online at: <URL: https://www.youtube.com/watch?v=fqcArJWtyqM>, [retrieved on Apr. 25, 2024], 2024, 2 pages.
Voxel World Lens, Snapchat [online]. Snapchat Inc., Available Online at: <URL: https://www.snapchat.com/lens/689751dd6a7d446280d903d15d79f104?locale=en-US>, [retrieved on Apr. 25, 2024], 2024, 1 page.
Voxelize, Rossiev [online]. Denis Rossiev 2018-2024, Available Online at: <URL: https://www.rossiev.pro/voxelize/>, [retrieved on Apr. 25, 2024], 2024, 16 pages.
Your PC in VR, Virtual Desktop [online]. Virtual Desktop, Inc., 2023 [retrieved on Apr. 17, 2024]. Retrieved from the Internet: <URL: https://www.vrdesktop.net/>, 4 pages.
Coloring a Point Cloud Using 3DF Zephyr Pro, Wayback Machine, https://web.archive.org/web/20170522233043/http://www.3dflow.net:80/technology/documents/3df-zephyr-tutorials/point-cloud-coloring-using-3df-zephyr/, May 22, 2017, 1 page.
Apple, "Use Continuity to Connect Your Mac, iPhone, iPad, and Apple Watch", Apple Support, Available online at <https://support.apple.com/en-us/HT204681>, [Retrieved from Internet on Dec. 23, 2022], 4 pages.
Apple, "Use Message Effects with iMessage on Your iPhone, iPad, and iPod Touch", Apple Support, Available online at: <https://support.apple.com/en-US/HT206894>, [retrieved on Feb. 22, 2024], 5 pages.
Berard Francois, "A Study on Two-Dimensional Scrolling with Head Motion", CLIPS-IMAG Technical Report. France, Ref: <TR-IMAG-CLIPS-IHM-199901>, Retrieved from: <http://iihm.imag.fr/publs/1999/TR199901_PWindowRate.pdf>, Retrieved on Dec. 26, 2024, Jan. 8, 1999, 7 pages.
Bhowmick Shimmila, "Explorations on Body-Gesture Based Object Selection on HMD Based VR Interfaces for Dense and Occluded Dense Virtual Environments", Report: State of the Art Seminar, Department of Design Indian Institute of Technology, Guwahati, Nov. 2018, 25 pages.
Bohn Dieter, "Rebooting WebOS: How LG Rethought The Smart TV", The Verge, Available online at: <http://www.theverge.com/2014/1/6/5279220/rebooting-webos-how-lg-rethought-the-smart-tv>, [Retrieved Aug. 26, 2019], Jan. 6, 2014, 5 pages.
Bolt et al., "Two-Handed Gesture in Multi-Modal Natural Dialog", Uist '92, 5th Annual Symposium on User Interface Software And Technology. Proceedings Of the ACM Symposium on User Interface Software And Technology, Monterey, Nov. 15-18, 1992, pp. 7-14.
Brennan Dominic, "4 Virtual Reality Desktops for Vive, Rift, and Windows VR Compared", [online]. Road to VR, Available online at: <https://www.roadtovr.com/virtual-reality-desktop-compared-oculus-rift-htc-vive/>, [retrieved on Jun. 29, 2023], Jan. 3, 2018, 4 pages.
Capturing Reality, "Data Sheet RealityCapture TARASQUE 1.2", Wayback Machine, https://web.archive.org/web/20220327110303/https://www.capturingreality.com/assets/Documents/datasheet_TARASQUE_1.2.pdf, Mar. 27, 2022, 5 pages.
Capturing Reality, "RealityCapture tutorial: Complete model in PPI", Youtube, https://www.youtube.com/watch?v=tw6wNNEbH_M, Oct. 14, 2021, 2 pages.
Chatterjee et al., "Gaze+Gesture: Expressive, Precise and Targeted Free-Space Interactions", ICMI '15, Nov. 9-13, 2015, 8 pages.

(56) References Cited

OTHER PUBLICATIONS

Choe et al., "Augmented-Reality-Based 3D Emotional Messenger for Dynamic User Communication with Smart Devices", Electronics, vol. 9, No. 1127, Jul. 10, 2020, 15 pages.
Didehkhorshid et al., "Text Input in Virtual Reality Using a Tracked Drawing Tablet", HCII 2020, LNCS 12428, 2020, pp. 314-329.
Edmiston et al., "Touch-Enabled Input Devices for Controlling Virtual Environments", 12th IFAC Symposium on Analysis, Design and Evaluation of Human-Machine Systems, Las Vegas, NV, USA, Aug. 11-15, 2013, pp. 349-356.
Fatima et al., "Eye Movement Based Human Computer Interaction", 3rd International Conference On Recent Advances In Information Technology (RAIT), Mar. 3, 2016, pp. 489-494.
Grey Melissa, "Comcast's New X2 Platform Moves your DVR Recordings from the Box to the Cloud", Engadget, Available online at: <http://www.engadget.com/2013/06/11/comcast-x2-platform/>, Jun. 11, 2013, 15 pages.
Headmaster Introduction, "If You Can Move Your Head, You Can Move Your World", Retrieved from: <https://www.microsoft.com/buxtoncollection/a/pdf/HeadMaster%20Introduction.pdf>, Retrieved on Dec. 26, 2024, 4 pages.
Huang et al., "Proxy-Based Security Audit System for Remote Desktop Access", Computer Communications And Networks, ICCCN 2009. Proceedings of 18th International Conference On, IEEE, Piscataway, NJ, USA, Aug. 3, 2009, 5 pages.
Lachambre et al., "Unity Photogrammetry Workflow", https://unity3d.com/files/solutions/photogrammetry/Unity-Photogrammetry-Workflow_2017-07_v2.pdf, Jun. 23, 2017, pp. 55-64.
Lin et al., "Towards Naturally Grabbing and Moving Objects in VR", IS&T International Symposium on Electronic Imaging and The Engineering Reality of Virtual Reality, 2016, 6 pages.
Lin et al., "Ubii: Physical World Interaction Through Augmented Reality", Publisher: IEEE, vol. 16, No. 3, DOI:10.1109/TMC.2016.2567378, May 13, 2016, pp. 872-885.
Lor Cas, "Reality Capture: Exporting Mesh", Youtube, https://www.youtube.com/watch?v=PdvTRa2B_s0, Dec. 10, 2020, 2 pages.
MACMOSTVIDEO, "A Beginner's Guide to Selecting Items On Your Mac (#1566)", Bibliographic Information, Jan. 4, 2018, Retrieved from <URL:https://www.youtube.com/watch?v=a6MDAuh7M0Q&ab_channel=macmostvideo/>, [retrieved on Feb. 19, 2025], Most relevant passage of the video is 00:10 to 00:30, 2 pages.
McGill et al., "Expanding The Bounds Of Seated Virtual Workspaces", University of Glasgow, Available online at: <https://core.ac.uk/download/pdf/323988271.pdf>, [retrieved on Jun. 27, 2023], Jun. 5, 2020, 44 pages.
METALNWOOD, "Using a Tablet for Touch Control, with VR Headset On. (Demo Vid)", Virtual Reality, ED Forums, Jun. 12, 2020, Available online at <https://forum.dcs.world/topic/237992-using-a-tablet-for-touch-control-with-vr-headset-on-demo-vid/>, [Retrieved from Internet on Jan. 2, 2024], 9 pages.
Pfeuffer et al., "Gaze + Pinch Interaction in Virtual Reality", In Proceedings of SUI '17, Brighton, United Kingdom, Oct. 16-17, 2017, pp. 99-108.
Pfeuffer et al., "Gaze and Touch Interaction on Tablets", UIST '16, Tokyo, Japan, ACM, Oct. 16-19, 2016, pp. 301-311.
Process a 3D Scan With Projection in Reality Capture (RC), Wayback Machine, https://web.archive.org/web/20200116135047/http:/www.pi3dscan.com/index.php/instructions/item/process-a-3d-scan-with-projection-in-reality-capture-rc, Jan. 16, 2020, 1 page.
Qi et al., "PointNet++: Deep Hierarchical Feature Learning on Point Sets in a Metric Space", Stanford University, Jun. 7, 2017, 14 pages.
Schenk et al., "SPOCK: A Smooth Pursuit Oculomotor Control Kit", CHI'16 Extended Abstracts, San Jose, CA, USA, ACM, May 7-12, 2016, pp. 2681-2687.
Schubert Martin, "Design Sprints at Leap Motion: A Playground of 3D User Interfaces", Ultraleap For Developers [online]. Nov. 8, 2017 [retrieved on Mar. 21, 2025]. Retrieved from the Internet: <URL: https://blog.leapmotion.com/design-playground-3d-user-interfaces/>, 17 pages.
Schuetz Markus, "Interactive Exploration of Point Clouds", Technische Universitat Wien, reposiTUm, https://doi.org/10.34726/hss.2021.91668, Mar. 8, 2021, 119 pages.
Strand Robin, "Surface Skeletons in Grids With Non-cubic Voxels", 2004 IEEE Xplore, Available Online at: <DOI: 10.1109/ICPR.2004.1334195>, Sep. 2004, 5 pages.
Sun et al., "MagicHand: Interact with IoT Devices in Augmented Reality Environment", 2019 IEEE Conference on Virtual Reality and 3D User Interfaces, Osaka, Japan, Mar. 23-27, 2019, [retrieved on Dec. 4, 2020], 6 pages.
Tolle et al., "Design of Head Movement Controller System (HEMOCS) for Control Mobile Application through Head Pose Movement Detection", Retrieved from: <https://www.google.com/url?sa=t&source=web&rct=j&opi=89978449&url=https://online-journals.org/index.php/i-jim/article/download/5552/4029/19224&ved=2ahUKEwj-w86vga-HAxUJJDQIHYMNDNw4HhAWegQILhAB&usg=AOWVaw3HR1t7v8Rx7osc1lp0UfOh>, DOI: <httpdx.doi.org/10.3991/ijim.v10i3.5552>, Retrieved on Dec. 26, 2024, 2016, 5 pages.
Simple Modal Window With Background Blur Effect, Available online at: <http://web.archive.org/web/20160313233427/https://www.cssscript.com/simple-modal-window-with-background-blur-effect/>, Mar. 13, 2016, 5 pages.
Wood Tyriel, "The HoloLens 2 Tour!—Discovering a World of Holograms", YouTube [online]. YouTube, Mar. 23, 2021 [retrieved on Dec. 7, 2023], Retrieved from the Internet: <URL: https://www.youtube.com/watch?v=rMks7sMzPxI>, 2 pages.
Writtenhouse Sandy, "How to Use Live View on Google Maps", Available online at <https://www.lifewire.com/use-live-view-google-maps-5323691>, [Retrieved from Internet on Jun. 27, 2024], Jul. 5, 2022, 6 pages.
Yamada Yoshihiro, "How to Generate a Modal Window with ModalPopup Control", Available online at: <http://web.archive.org/web/20210920015801/https://atmarkit.itmedia.co.jp/fdotnet/dotnettips/580aspajaxmodalpopup/aspajaxmodalpopup.html>[Search Date Aug. 22, 2023], Sep. 20, 2021, 8 pages (1 page of English Abstract and 7 pages).
Yue et al., "Optimal Region Selection for Stereoscopic Video Subtitle Insertion", IEEE Transactions on Circuits and Systems for Video Technology, vol. 28, No. 11, Nov. 2018, 13 pages.

\* cited by examiner

SYSTEM AND METHOD OF THREE-DIMENSIONAL OBJECT CLEANUP AND TEXT ANNOTATION

CROSS-REFERENCE TO RELATED APPLICATIONS

This application claims the benefit of U.S. Provisional Application No. 63/264,327, filed Nov. 19, 2021, the content of which is incorporated herein by reference in its entirety for all purposes.

FIELD OF THE DISCLOSURE

This relates generally to systems and methods of three-dimensional object cleanup and text annotation.

BACKGROUND OF THE DISCLOSURE

Some computer graphical environments provide two-dimensional and/or three-dimensional environments where at least some objects displayed for a user's viewing are virtual and generated by a computer. In some examples, the objects are representations of real-world objects (e.g., a table, a chair, a lamp, etc.) scanned using an electronic device (e.g., a mobile phone, a tablet, a laptop computer, etc.). In some uses, a user may manipulate the objects representing real-world objects using a content editing environment, such as a graphics editing interface running on a content editing application, for example. However, the process of scanning objects may result in scanning portions of the real-world environments or adjacent real-world objects that a user did not intend to capture, and/or may result in scanning errors (e.g., false data or compromised data). Systems and methods that allow for intuitive editing of computer-generated virtual objects (e.g., cleaning up an object using a graphic editing tool, such as an eraser tool) presented in three-dimensions are thus desirable.

SUMMARY OF THE DISCLOSURE

Some examples of the disclosure are directed to object manipulators and associated processes for manipulating an object representation in a three-dimensional environment. The object representation may correspond to a scan (e.g., a point cloud or a mesh) of a real-world object in a real-world environment. The object manipulators may include an object cleanup manipulator. The object manipulators may include a text annotation manipulator. The object cleanup manipulator may be selectable to display one or more control affordances providing functionality for selectively removing portions of the object representation in the three-dimensional environment and/or selectively adjusting one or more parameters of the object representation in the three-dimensional environment. The one or more parameters may include a size parameter controlling a size of each of a plurality of data points that form the object representation in the three-dimensional environment. The text annotation manipulator may be selectable to display one or more control affordances providing functionality for selectively generating one or more text labels in the three-dimensional environment. The one or more text labels may be movable and editable in the three-dimensional environment. The one or more text labels may be associated with the object representation in the three-dimensional environment. Associating the one or more text labels with the object representation in the three-dimensional environment may associate text data corresponding to the one or more text labels as metadata stored with metadata corresponding to the object representation.

Some examples of the disclosure are directed to processes of cleaning up an object representation in a three-dimensional environment. The object representation may be a point cloud corresponding to a scan of a real-world object in a physical environment. The three-dimensional environment may be displayed via an electronic device and may include the object representation, a tray on which the object representation is displayed, and/or a plurality of object manipulators, including an object cleanup manipulator. Selection of the object cleanup manipulator may cause display of one or more control affordances, including an eraser control affordance. Selection of the eraser control affordance may cause display of an eraser tool in the three-dimensional environment. The eraser tool may have an adjustable size (e.g., a volume) and an adjustable shape in the three-dimensional environment. The eraser tool may be operable to remove a respective portion of the object representation in the three-dimensional environment. When the eraser tool is overlapped with a respective portion of the object representation, an appearance of the respective portion of the object representation may change in the three-dimensional environment. Respective input directed to the eraser tool may cause the respective portion of the object representation that overlaps with the eraser tool to be removed from the object representation in the three-dimensional environment.

In some examples, the one or more control affordances may include a point size control affordance. Selection of the point size control affordance may cause display of a point size tool in the three-dimensional environment. The point size tool may be operable to adjust a size of each data point that forms the point cloud corresponding to the object representation in the three-dimensional environment. Adjustment of the point cloud tool in a first respective direction optionally causes the size of each data point that forms the point cloud to increase in the three-dimensional environment. Adjustment of the point cloud tool in a second respective direction, different from the first respective direction, optionally causes the size of each data point that forms the point cloud to decrease in the three-dimensional environment.

Some examples of the disclosure are directed to processes of applying text annotation to an object representation in a three-dimensional environment. The object representation may be a point cloud corresponding to a scan of a real-world object in a physical environment. The three-dimensional environment may be displayed via an electronic device and may include the object representation, a tray on which the object representation is displayed, and/or a plurality of object manipulators, including a text annotation manipulator. Selection of the text annotation manipulator may cause display of one or more control affordances, including a text label affordance. Selection of the text label affordance may cause generation and display of a text label in the three-dimensional environment. The text label may be movable within the three-dimensional environment and a text of the text label may be editable within the three-dimensional environment. Selection of the text label may display a plurality of text input elements that are selectable to initiate modify the text label, such as editing the text of the text label. The text label may be moved to a respective location in the three-dimensional environment that is associated with the object representation. Movement of the text label to the respective location in the three-dimensional environment may associate the text label with the object representation.

Transformation of the object representation may cause the text label to transform in accordance with the transformation of the object representation.

The full descriptions of these examples are provided in the Drawings and the Detailed Description, and it is understood that this Summary does not limit the scope of the disclosure in any way.

BRIEF DESCRIPTION OF THE DRAWINGS

For improved understanding of the various examples described herein, reference should be made to the Detailed Description below along with the following drawings. Like reference numerals often refer to corresponding parts throughout the drawings.

DETAILED DESCRIPTION

Figure 1:
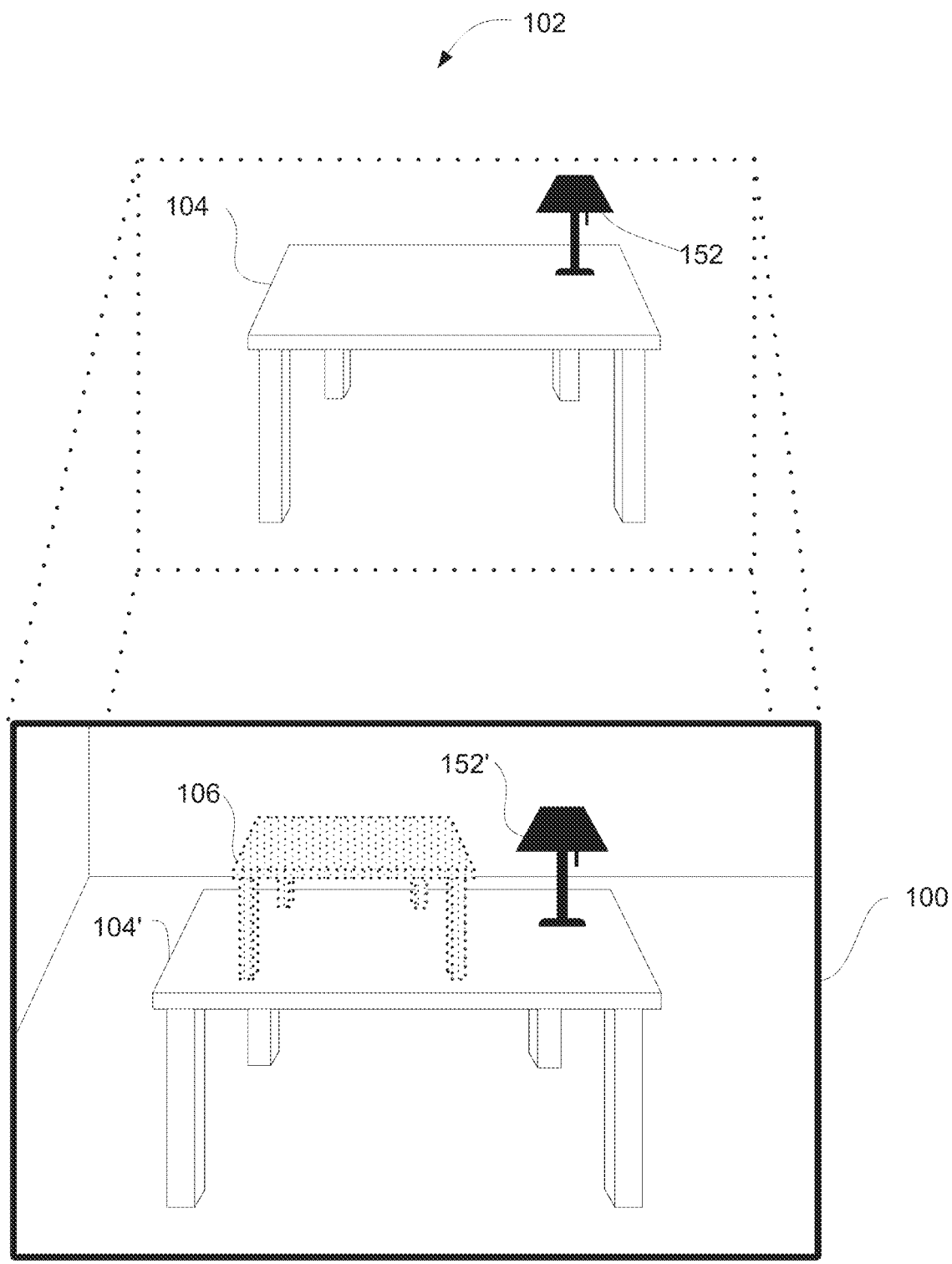
FIG. 1 illustrates an electronic device displaying an extended reality environment according to some examples of the disclosure.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment ("extended reality environment," "computer generated environment") refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. As another example, the XR system may detect an interaction (e.g., a (virtual) touch, tap, pinch, etc.) with one or more objects in the XR environment, and, in response, adjust and/or update graphical content presented to the user in a manner similar to how such objects or views of such objects would change in a physical environment. In some examples, the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems (including hologram-based systems), heads-up displays (HUDs), head mounted displays (HMDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Some examples of the disclosure are directed to object manipulators and associated processes for manipulating an object representation in a three-dimensional environment. The object representation may correspond to a scan (e.g., a point cloud) of a real-world object in a real-world environment. The object manipulators may include an object cleanup manipulator. The object manipulators may include a text annotation manipulator. The object cleanup manipulator may be selectable to display one or more control affordances providing functionality for selectively removing portions of the object representation in the three-dimensional environment and/or selectively adjusting one or more parameters of the object representation in the three-dimensional environment. The one or more parameters may include a size parameter controlling a size of each of a plurality of data points that form the object representation in the three-dimensional environment. The text annotation manipulator may be selectable to display one or more control affordances providing functionality for selectively generating one or more text labels in the three-dimensional environment. The one or more text labels may be movable and editable in the three-dimensional environment. The one or more text labels may be associated with the object representation in the three-dimensional environment. Associating the one or more text labels with the object representation in the three-dimensional environment may associate text data corresponding to the one or more text labels as metadata stored with metadata corresponding to the object representation.

Some examples of the disclosure are directed to processes of cleaning up an object representation in a three-dimensional environment. The object representation may be a point cloud corresponding to a scan of a real-world object in a physical environment. The three-dimensional environment may be displayed via an electronic device and may include the object representation, a tray on which the object representation is displayed, and/or a plurality of object manipulators, including an object cleanup manipulator. Selection of the object cleanup manipulator may cause display of one or more control affordances, including an eraser control affordance. Selection of the eraser control affordance may cause display of an eraser tool in the three-dimensional environment. The eraser tool may have an adjustable size (e.g., a volume) and an adjustable shape in the three-dimensional environment. The eraser tool may be operable to remove a respective portion of the object representation in the three-dimensional environment. When the eraser tool is overlapped with a respective portion of the object representation, an appearance of the respective portion of the object representation may change in the three-dimensional environment. Respective input directed to the eraser tool may cause the respective portion of the object representation that overlaps with the eraser tool to be removed from the object representation in the three-dimensional environment.

In some examples, the one or more control affordances may include a point size control affordance. Selection of the point size control affordance may cause display of a point size tool in the three-dimensional environment. The point size tool may be operable to adjust a size of each data point that forms the point cloud corresponding to the object representation in the three-dimensional environment. Adjustment of the point cloud tool in a first respective direction optionally causes the size of each data point that forms the point cloud to increase in the three-dimensional environment. Adjustment of the point cloud tool in a second respective direction, different from the first respective direction, optionally causes the size of each data point that forms the point cloud to decrease in the three-dimensional environment.

Some examples of the disclosure are directed to processes of applying text annotation to an object representation in a three-dimensional environment. The object representation may be a point cloud corresponding to a scan of a real-world object in a physical environment. The three-dimensional environment may be displayed via an electronic device and may include the object representation, a tray on which the object representation is displayed, and/or a plurality of object manipulators, including a text annotation manipulator. Selection of the text annotation manipulator may cause display of one or more control affordances, including a text label affordance. Selection of the text label affordance may cause generation and display of a text label in the three-dimensional environment. The text label may be movable within the three-dimensional environment and a text of the text label may be editable within the three-dimensional environment. Selection of the text label may display a plurality of text input elements that are selectable to initiate modify the text label, such as editing the text of the text label. The text label may be moved to a respective location in the three-dimensional environment that is associated with the object representation. Movement of the text label to the respective location in the three-dimensional environment may associate the text label with the object representation. Transformation of the object representation may cause the text label to transform in accordance with the transformation of the object representation.

In some examples, interacting with the object representation in the three-dimensional environment may include movement of the object representation. In some examples, a user's gaze may be tracked by the electronic device as an input for targeting and/or selecting the object representation within the three-dimensional environment. For example, gaze can be used to identify one or more virtual objects targeted for selection using another selection input, or select a virtual object when gaze is maintained for a threshold period of time. In some examples, gaze can also identify a target location for movement of an object. In some examples, the object representation may be selected using hand-tracking input detected via a first input device in communication with the electronic device. In some examples, the object representation may be moved and/or reoriented in the three-dimensional environment in accordance with movement input detected via the first input device. In some examples, the eraser tool controllable by hand-tracking input detected via a second input device in communication with the electronic device may be used to remove highlighted portions of the object representation while the object representation is moved and/or reoriented in accordance with the movement input detected via the first input device. For example, hand-tracking movements corresponding to movements of a first hand of the user of the electronic device directed to the object representation can reorient the object representation, and hand-tracking movements corresponding to movements of a second hand of the user of the electronic device can control the eraser tool to remove desired portions of the reoriented object representation.

FIG. 1 illustrates an electronic device 100 displaying an extended reality (XR) environment (e.g., a computer-generated environment) according to some examples of the disclosure. In some examples, electronic device 100 is a hand-held or mobile device, such as a tablet computer, laptop computer, smartphone, or head-mounted display. Examples of device 100 are described below with reference to the architecture block diagram of FIG. 2. As shown in FIG. 1, electronic device 100 and table 104 are located in the physical environment 102. In some examples, electronic device 100 may be configured to capture areas of physical environment 102 including table 104 and lamp 152 (illustrated in the field of view of electronic device 100). In some examples, in response to a trigger, the electronic device 100 may be configured to display a virtual object 106 in the computer-generated environment (e.g., represented by a table illustrated in FIG. 1) that is not present in the physical environment 102, but is displayed in the computer-generated environment positioned on (e.g., anchored to) the top of a computer-generated representation 104' of real-world table 104. For example, virtual object 106 can be displayed on the surface of the representation 104' in the computer-generated environment displayed via device 100 in response to detecting the planar surface of table 104 in the physical environment 102.

In some examples, the virtual object 106 is a representation of a physical object in the physical environment 102. In some examples, device 100 is optionally configured to take a scan (e.g., capture and process an image) of physical objects in physical environment 102. For example, device 100 may, via one or more input device (e.g., camera(s) and/or other suitable sensor(s)) in communication with device 100, capture an image of real-world table 104. In some examples, the scan of the real-world object is optionally generated and presented as a virtual object in the computer-generated environment displayed via device 100. In some examples, the object representation (e.g., virtual object 106) of the real-world object (e.g., table 104) is optionally presented in the computer-generated environment as a point cloud, as shown in FIG. 1. It should be understood that virtual object 106 is a representative virtual object and one or more different virtual objects (e.g., of various dimensionality such as two-dimensional or three-dimensional virtual objects) can be included and rendered in a three-dimensional computer-generated environment. For example, the virtual object can represent an application or a user interface displayed in the computer-generated environment. In some examples, the virtual object 106 is optionally configured to be interactive and responsive to user input, such that a user may virtually touch, tap, move, rotate, or otherwise interact with, the virtual object. Additionally, it should be understood, that the 3D environment (or 3D virtual object) described herein may be a representation of a 3D environment (or three-dimensional virtual object) projected or presented at an electronic device.

In the discussion that follows, an electronic device that is in communication with a display generation component and one or more input devices is described. It should be understood that the electronic device optionally is in communication with one or more other physical user-interface devices, such as touch-sensitive surface, a physical keyboard, a mouse, a joystick, a hand tracking device, an eye tracking device, a stylus, etc. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device, or touch input received on the surface of a stylus) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

Figure 2:
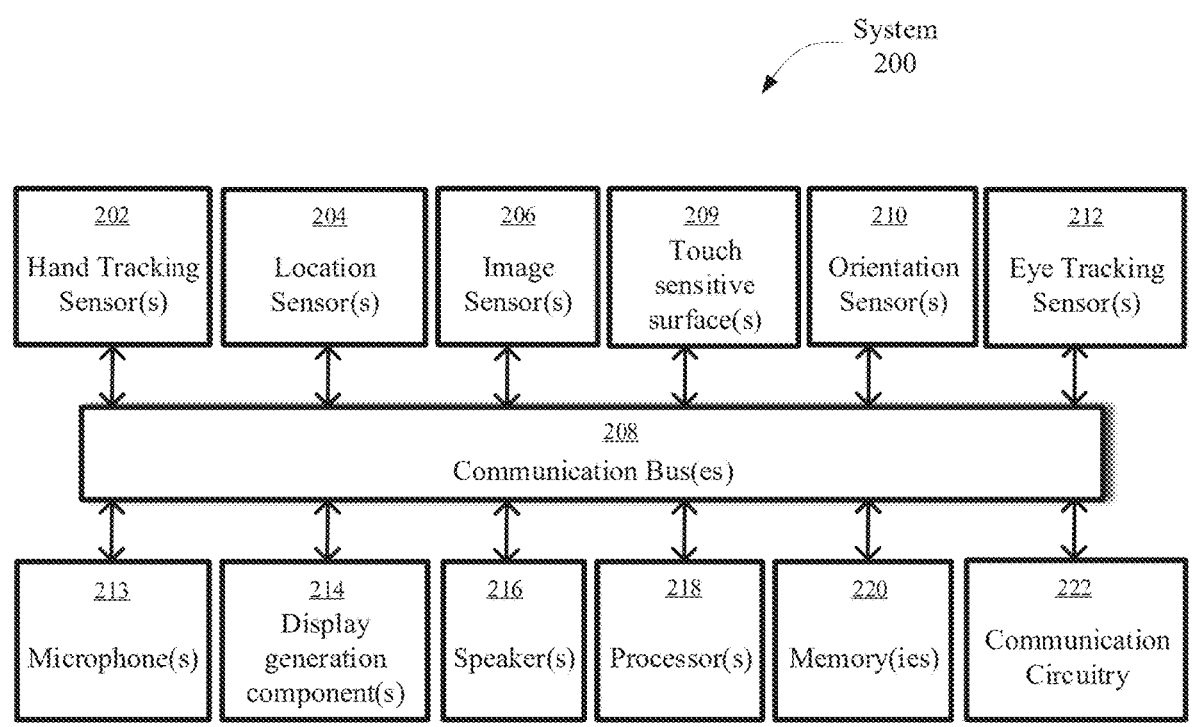
FIG. 2 illustrates a block diagram of an exemplary architecture for a system or device according to some examples of the disclosure.

FIG. 2 illustrates a block diagram of an exemplary architecture for a system or device according to some examples of the disclosure. In some examples, device 200 is a portable device, such as a mobile phone, smart phone, a tablet computer, a laptop computer, an auxiliary device in communication with another device, etc. As illustrated in FIG. 2, device 200 optionally includes various sensors (e.g., one or more hand tracking sensor(s) 202, one or more location sensor(s) 204, one or more image sensor(s) 206, one or more touch-sensitive surface(s) 209, one or more motion and/or orientation sensor(s) 210, one or more eye tracking sensor(s) 212, one or more microphone(s) 213 or other audio sensors, etc.), one or more display(s) 214, one or more speaker(s) 216, one or more processor(s) 218, one or more memories 220, and/or communication circuitry 222. One or more communication buses 208 are optionally used for communication between the above-mentioned components of device 200.

Communication circuitry 222 optionally includes circuitry for communicating with electronic devices, networks, such as the Internet, intranets, a wired network and/or a wireless network, cellular networks and wireless local area networks (LANs). Communication circuitry 222 optionally includes circuitry for communicating using near-field communication (NFC) and/or short-range communication, such as Bluetooth®.

Processor(s) 218 optionally include one or more general purpose processors, one or more graphics processors, and/or one or more digital signal processors (DSPs). In some examples, memory 220 is a non-transitory computer-readable storage medium (e.g., flash memory, random access memory, or other volatile or non-volatile memory or storage) that stores computer-readable instructions configured to be executed by processor(s) 218 to perform the techniques, processes, and/or methods described below. In some examples, memories 220 include more than one non-transitory computer-readable storage medium. A non-transitory computer-readable storage medium can be any medium (e.g., excluding a signal) that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like.

Display(s) 214 optionally include a single display (e.g., a liquid-crystal display (LCD), organic light-emitting diode (OLED), or other types of display). In some examples, display(s) 214 include multiple displays. In some examples, display(s) 214 includes a display with a touch-sensitive surface (e.g., a touch screen), a projector, a holographic projector, a retinal projector, etc.

In some examples, device 200 includes touch-sensitive surface(s) 209 configured to receive user inputs (touch and/or proximity inputs), such as tap inputs and swipe inputs or other gestures. In some examples, display(s) 214 and touch-sensitive surface(s) 209 together form touch-sensitive display(s) (e.g., a touch screen integrated with device 200 or external to device 200 that is in communication with device 200).

Image sensors(s) 206 optionally include one or more visible light image sensor, such as charged coupled device (CCD) sensors, and/or complementary metal-oxide-semiconductor (CMOS) sensors operable to obtain images of physical objects from the real-world environment. Image sensor(s) 206 optionally include one or more infrared (IR) or near infrared (NIR) sensors, such as a passive or an active IR or NIR sensor, for detecting infrared or near infrared light from the real-world environment. For example, an active IR sensor includes an IR emitter for emitting infrared light into the real-world environment. Image sensor(s) 206 optionally include one or more cameras configured to capture movement of physical objects in the real-world environment. Image sensor(s) 206 optionally include one or more depth sensors configured to detect the distance of physical objects from device 200. In some examples, information from one or more depth sensors can allow the device to identify and differentiate objects in the real-world environment from other objects in the real-world environment. In some examples, one or more depth sensors can allow the device to determine the texture and/or topography of objects in the real-world environment.

In some examples, device 200 uses CCD sensors, event cameras, and depth sensors in combination to detect the physical environment around device 200. In some examples, image sensor(s) 206 include a first image sensor and a second image sensor. The first image sensor and the second image sensor work together and are optionally configured to capture different information of physical objects in the real-world environment. In some examples, the first image sensor is a visible light image sensor and the second image sensor is a depth sensor. In some examples, device 200 uses image sensor(s) 206 to detect the position and orientation of device 200 and/or display generation component(s) 214 in the real-world environment. For example, device 200 uses image sensor(s) 206 to track the position and orientation of display(s) 214 relative to one or more fixed objects in the real-world environment.

In some examples, device 200 optionally includes hand tracking sensor(s) 202 and/or eye tracking sensor(s) 212. Hand tracking sensor(s) 202 are configured to track the position/location of a user's hands and/or fingers, and/or motions of the user's hands and/or fingers with respect to the computer-generated environment, relative to the display(s) 214, and/or relative to another coordinate system. Eye tracking sensor(s) 212 are configured to track the position and movement of a user's gaze (eyes, face, or head, more generally) with respect to the real-world or computer-generated environment and/or relative to the display generation component(s) 214. In some examples, hand tracking sensor(s) 202 and/or eye tracking sensor(s) 212 are implemented together with the display(s) 214 (e.g., in the same device). In some examples, the hand tracking sensor(s) 202 and/or eye tracking sensor(s) 212 are implemented separate from the display(s) 214 (e.g., in a different device).

In some examples, the hand tracking sensor(s) 202 uses image sensor(s) 206 (e.g., one or more IR cameras, 3D cameras, depth cameras, etc.) that capture three-dimensional information from the real world including one or more hands. In some examples, the hands can be resolved with sufficient resolution to distinguish fingers and their respective positions. In some examples, one or more image sensor(s) 206 are positioned relative to the user to define a field of view of the image sensor(s) and an interaction space in which finger/hand position, orientation and/or movement captured by the image sensors are used as inputs (e.g., to distinguish from a user's resting hand or other hands of other persons in the real-world environment). Tracking the fingers/hands for input (e.g., gestures) can be advantageous in that it provides an input means that does not require the user to touch or hold input device, and using image sensors allows for tracking without requiring the user to wear a beacon or sensor, etc. on the hands/fingers.

In some examples, eye tracking sensor(s) 212 includes one or more eye tracking cameras (e.g., IR cameras) and/or illumination sources (e.g., IR light sources/LEDs) that emit light towards a user's eyes. Eye tracking cameras may be pointed towards a user's eyes to receive reflected light from the light sources directly or indirectly from the eyes. In some examples, both eyes are tracked separately by respective eye tracking cameras and illumination sources, and gaze can be determined from tracking both eyes. In some examples, one eye (e.g., a dominant eye) is tracked by a respective eye tracking camera/illumination source(s).

Device 200 optionally includes microphones(s) 213 or other audio sensors. Device 200 uses microphone(s) 213 to detect sound from the user and/or the real-world environment of the user. In some examples, microphone(s) 213 includes an array of microphones that optionally operate together (e.g., to identify ambient noise or to locate the source of sound in space of the real-world environment).

Device 200 optionally includes location sensor(s) 204 configured to detect a location of device 200 and/or of display(s) 214. For example, location sensor(s) 204 optionally includes a GPS receiver that receives data from one or more satellites and allows device 200 to determine the device's absolute position in the physical world.

Device 200 optionally includes motion and/or orientation sensor(s) 210 configured to detect orientation and/or movement of device 200 and/or display generation component(s) 214. For example, device 200 uses orientation sensor(s) 210 to track changes in the position and/or orientation of device 200 and/or display(s) 214 (e.g., with respect to physical objects in the real-world environment). Orientation sensor(s) 210 optionally include one or more gyroscopes, one or more accelerometers, and/or one or more inertial measurement units (IMUs).

It is understood that the architecture of FIG. 2 is an example architecture, but that system/device 200 is not limited to the components and configuration of FIG. 2A. For example, the device/system can include fewer, additional, or other components in the same or different configurations. In some examples, system/device 250 can be divided between multiple devices. A person using system/device 200, is optionally referred to herein as a user of the device. Attention is now directed towards exemplary interactions with a virtual object in a three-dimensional environment. As discussed below, an electronic device may present the virtual object with one or more graphics editing tools associated with a graphics editing application in the three-dimensional environment. In some examples, the one or more graphics editing tools provide for three-dimensional cleanup of the virtual object, as discussed below.

Figure 3A:
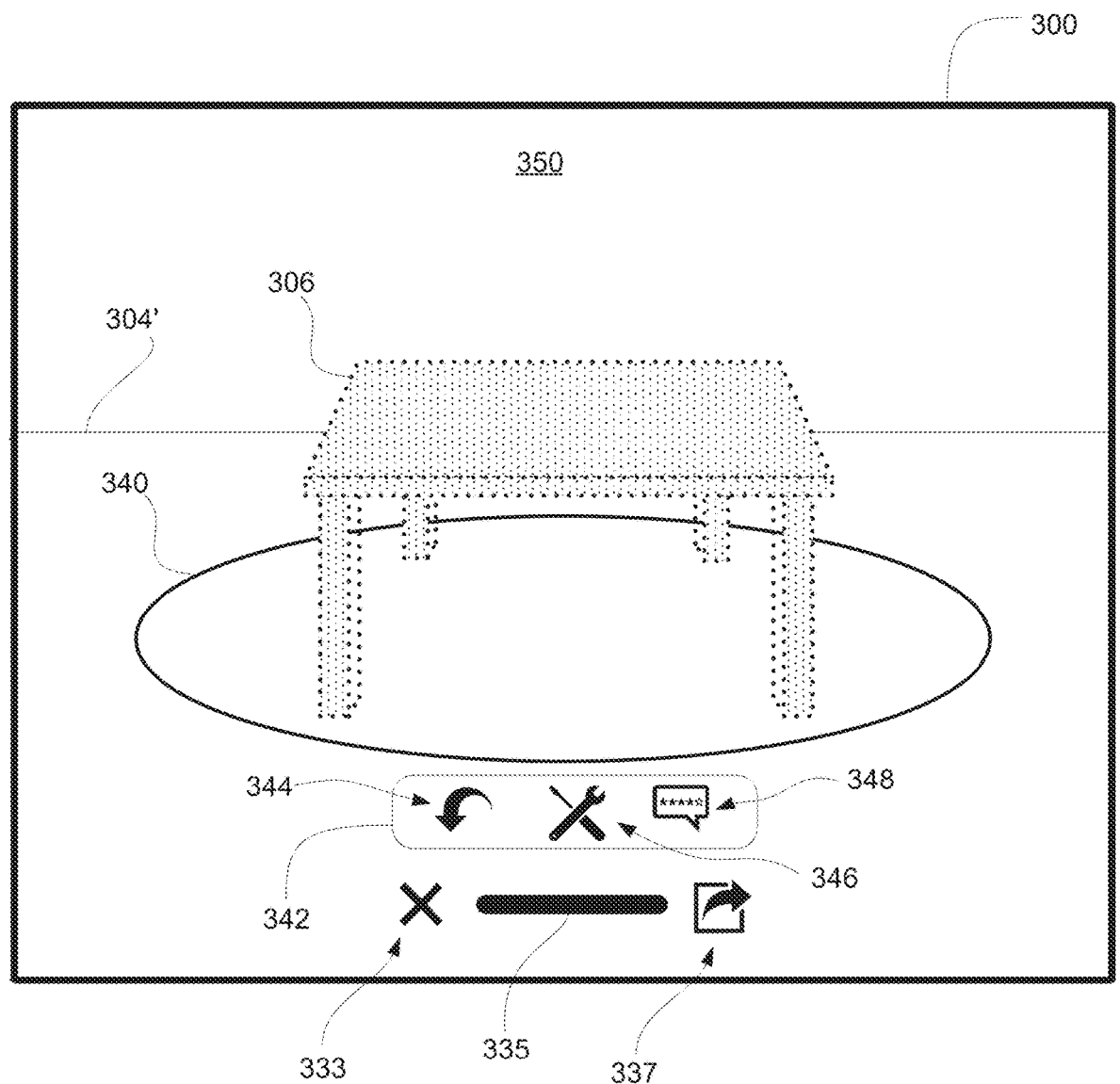
FIGS. 3A-3E illustrate example interactions with a virtual object in a three-dimensional computer-generated environment including captured representations of a physical (e.g., real-world) environment.

FIGS. 3A-3E illustrate example interactions with a virtual object 306 in a three-dimensional computer-generated environment 350 including captured representations of a physical (e.g., real-world) environment. In some examples, the three-dimensional environment 350 may be presented using electronic device 300. The electronic device 300 may be similar to device 100 or 200, and/or may be a head mountable system/device and/or projection-based system/device (including a hologram-based system/device) configured to generate and present a three-dimensional environment, such as, for example, heads-up displays (HUDs), head mounted displays (HMDs), windows having integrated display capability, displays formed as lenses designed to be placed on a person's eyes (e.g., similar to contact lenses). In the example of FIGS. 3A-3E, the user is optionally wearing the electronic device 300, such that the three-dimensional environment 350 can be defined by X, Y and Z axes as viewed from a perspective of the electronic device (e.g., a viewpoint associated with the electronic device 300, which may be a head-mounted display, for example). For example, the physical environment includes a table, and the three-dimensional environment includes a representation of the table 304'. As discussed above with reference to FIG. 1, the virtual object 306, which is optionally a table, may be an object representation corresponding to a three-dimensional scan of a physical object (e.g., table 104). As shown in FIG. 3A, the virtual object 306 is optionally presented in the three-dimensional environment 350 as a point cloud or mesh (e.g., a plurality of data points forming the three-dimensional object representation). In some examples, the virtual object 306 may be presented on and/or within a three-dimensional stage or tray 340, as shown. The stage/tray 340 can be representative of the graphics editing application. In FIG. 3A, the stage 340 and virtual object 306 are presented above the table 304' in the three-dimensional environment 350.

In some examples, the virtual object 306 may be presented in three-dimensional environment 350 in response to a request to display the virtual object 306 within a graphics editing application running on the electronic device 300. For example, the user may provide a request to launch the object representation of the table in three-dimensions (e.g., by selecting one or more user interface elements) within a user interface of a graphics editing application running on the electronic device 300 (or on a second electronic device (e.g., a tablet, desktop computer, laptop, etc.) in communication with the electronic device 300). In response to receiving the request, the electronic device 300 may generate a virtual object (e.g., virtual object 306) corresponding to the object representation of the table and present the virtual object in three-dimensional environment 350.

In some examples, it may be advantageous to provide a fully functional editing environment in three-dimensions representative of interactions with a graphics editing application provided on laptop, tablet, desktop computer, etc. in a real-world environment (e.g., an XR environment). Accordingly, providing one or more object manipulation tools in the three-dimensional may be particularly useful for editing interactions with the object representation without the constraints of physical display of a laptop, tablet, desktop computer, etc. in the real-world environment. For example, as described herein, presentation of the object representation in three-dimensions in the three-dimensional environment can provide for changing the size and/or orientation of the object representation beyond the dimensions of the physical display of the laptop, tablet, desktop computer, etc. (e.g., enlarging the object representation and/or reorienting the object representation beyond the region corresponding to the display of the laptop, tablet, desktop computer, etc.). Additionally, in some examples, it may be advantageous to present the object representation in three-dimensions for case of editing the data corresponding to the object representation. For example, a user editing content for display in a three-dimensional environment may view the content in three-dimensions. For example, a user may modify an appearance of the object representation (e.g., erase and/or remove respective portions of the object representation, provide text labels to respective portions of the object representation, etc.) and thus modify the data corresponding to the object representation, as described herein in more detail.

In some examples, one or more object manipulators ("object manipulators," "object manipulation tools," "control affordances," "graphics editing tools") are optionally provided in the three-dimensional environment 350 for providing editing functionality in three-dimensional environment 350, as described herein. As shown in FIG. 3A, the three-dimensional environment 350 may include one or more object manipulators 344-348 which are optionally presented within toolbar 342 presented below stage 340. In some examples, a first object manipulator 344 of the one or more object manipulators may be a reset or undo manipulator. In some examples, a second object manipulator 346 of the one or more object manipulators may be an object cleanup manipulator. In some examples, a third object manipulator 348 of the one or more object manipulators may be a text annotation manipulator.

Figure 3B:
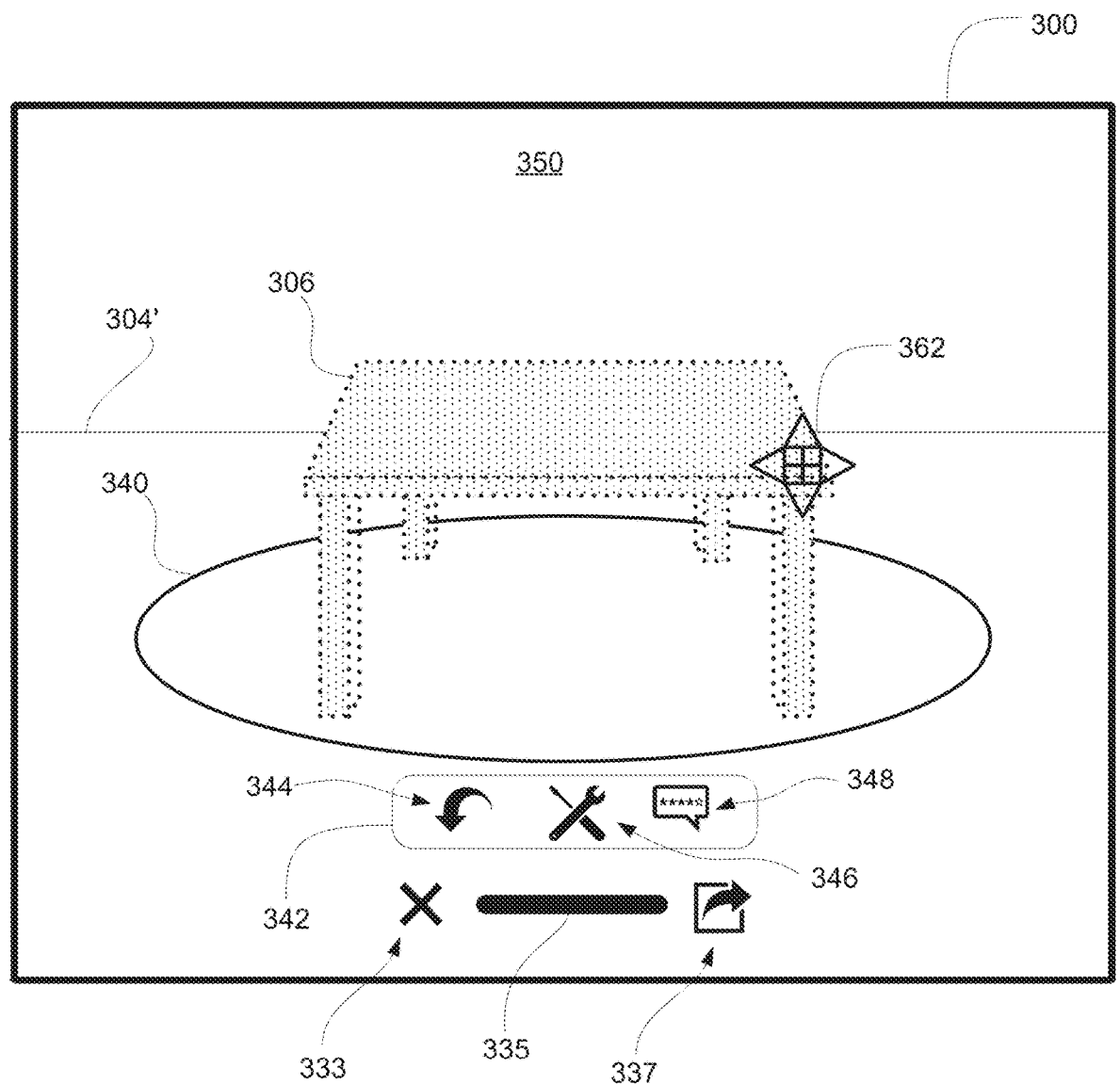

In some examples, virtual object 306 is optionally movable within the three-dimensional environment 350. The user may provide selection input directed to the virtual object 306 (e.g., targeting of virtual object 306 using gaze and providing a pinch gesture (e.g., contact of an index finger and a thumb of a hand of the user) to a portion of the virtual object 306). For example, as shown in FIG. 3B, the electronic device 300 is optionally configured to detect a relative position of a hand of the user with respect to the virtual object 306 in three-dimensional environment 350. In some examples, the electronic device 300 may display a selection user interface element 362 in three-dimensional environment 350 when a relative position of the hand of the user at least partially overlaps with (e.g., or is within a threshold distance (e.g., 1 cm, 2 cm, 4 cm, 5 cm, 10 cm, etc.) of) a portion of the virtual object 306. In some examples, in response to detecting that the relative position of the hand of the user no longer at least partially overlaps with (e.g., or is no longer within the threshold distance of) a portion of the virtual object 306, the electronic device 300 ceases display of the selection user interface element 362. In some examples, movement of a relative position of the hand of the user to at least partially overlap with (e.g., or come within a threshold distance of) a portion of the virtual object 306 optionally causes electronic device 300 to display a respective selection user interface element controllable for indirectly manipulating virtual object 306 (e.g., via a movement affordance and/or a rotation affordance displayed in response to detecting input directed to the respective selection user interface element).

Figure 3C:
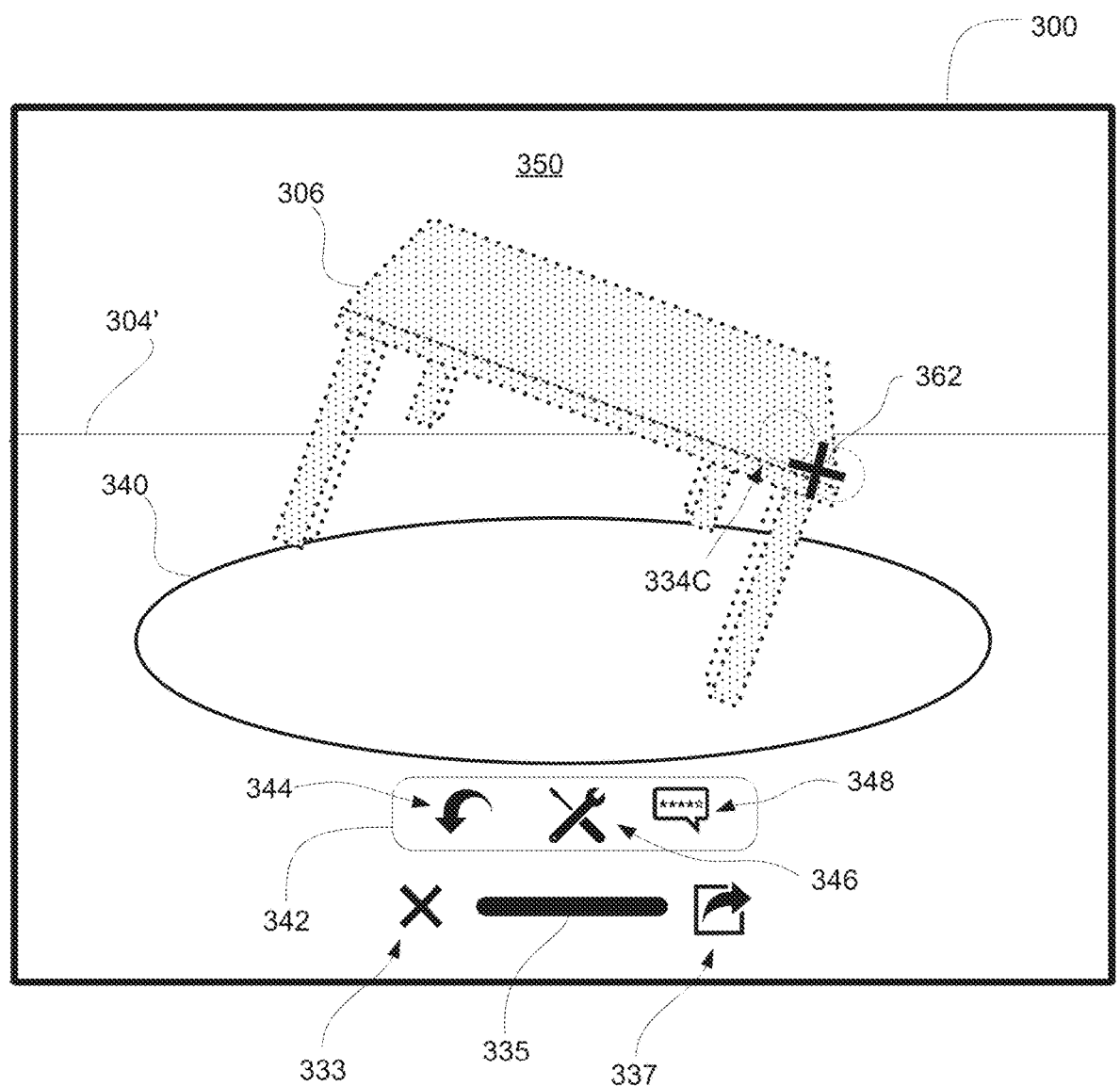

As shown in FIG. 3B, the selection user interface element 362 is displayed overlaid on a respective portion of the virtual object 306 (e.g., at or near a corner of the object representation of the table), which optionally corresponds to a detected position of the hand of the user with respect to virtual object 306 in three-dimensional environment 350. In some examples, an orientation of the selection user interface element 362 may be altered to correspond to that of the respective portion of the virtual object 306 (e.g., such that the six degrees of freedom (6DOF) of the selection user interface element 362 align to the geometry (e.g., dimensions of width, length, and height) of the corner of the object representation of the table) in three-dimensional environment 350. The user may provide selection input directed to the virtual object 306 (e.g., targeting of virtual object 306 using gaze and providing a pinch gesture (e.g., contact of an index finger and a thumb of a hand of the user) to a portion of the virtual object 306). In some examples, in response to detecting the selection (e.g., of a portion) of the virtual object 306, the electronic device 300 alters display of the selection user interface element 362 in three-dimensional environment 350. For example, as shown in FIG. 3C, electronic device 300 changes an appearance of the selection user interface element 362 in three-dimensional environment 350 in response to detecting the selection input directed toward virtual object 306. The selection user interface element 362 is optionally displayed at the location at which the selection input (e.g., the pinch gesture) was detected. In some examples, as above, the orientation of the selection user interface element 362 may be altered to correspond to that of the respective portion of the virtual object 306 at (e.g., or near) which the selection input was detected. In some examples, the user may move the virtual object 306 by moving the hand of the user (e.g., while holding the pinch gesture of the hand) in three-dimensional environment 350. For example, as shown in FIG. 3C, a position and/or orientation of the virtual object 306 is optionally changed in three-dimensional environment 350. In some examples, the movement of the virtual object 306 in three-dimensional environment 350 is optionally directly proportional to (e.g., 1:1 relationship with) the movement of the hand of the user (e.g., in the 6DOF). In some examples, the movement of the virtual object 306 in three-dimensional environment 350 is optionally scaled with respect to the movement of the hand of the user. In some examples, the stage 340 and/or the one or more object manipulators 344-348 are not moved in response to detecting the movement input directed to virtual object 306.

Figure 3D:
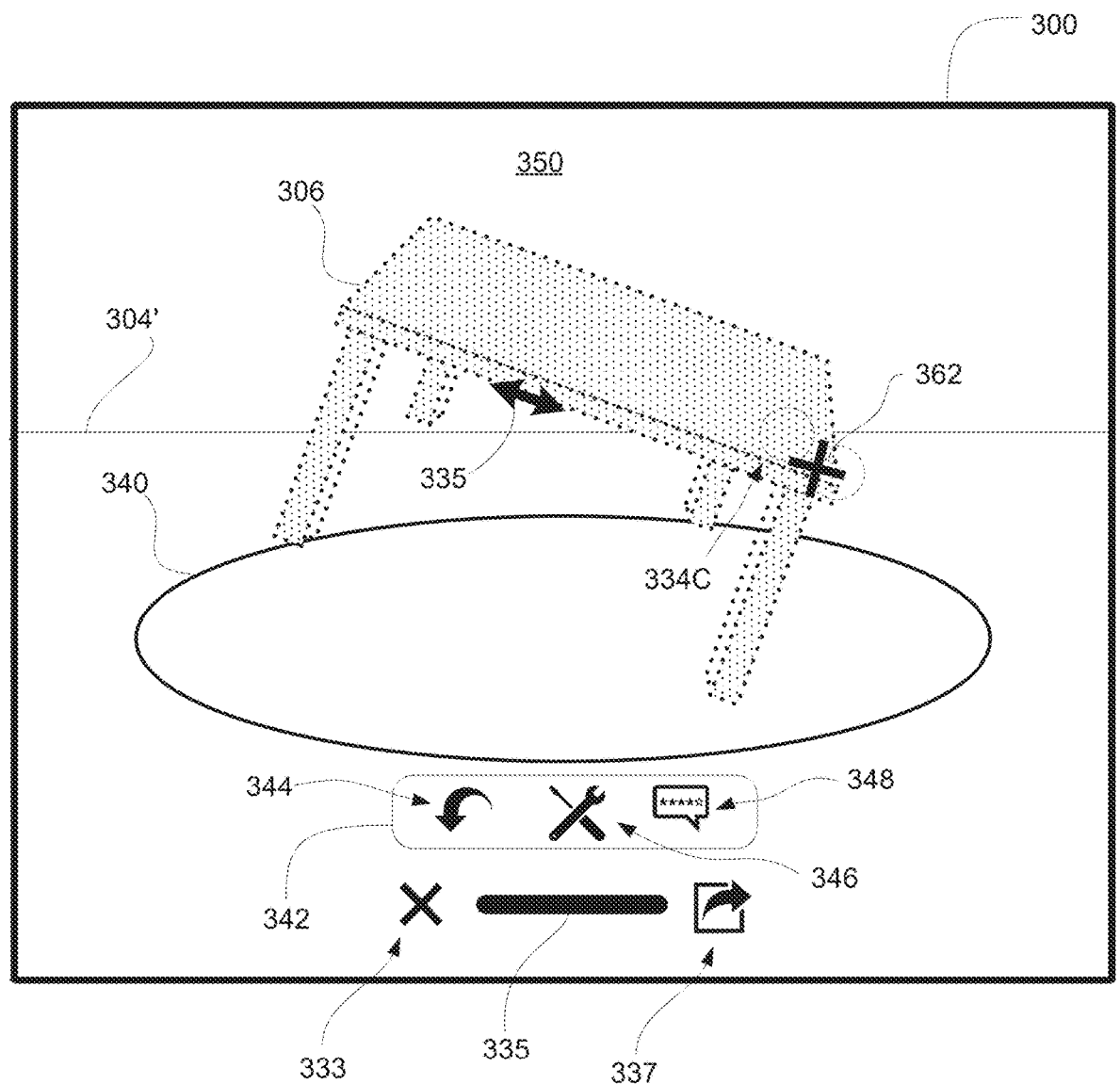
Figure 3E:
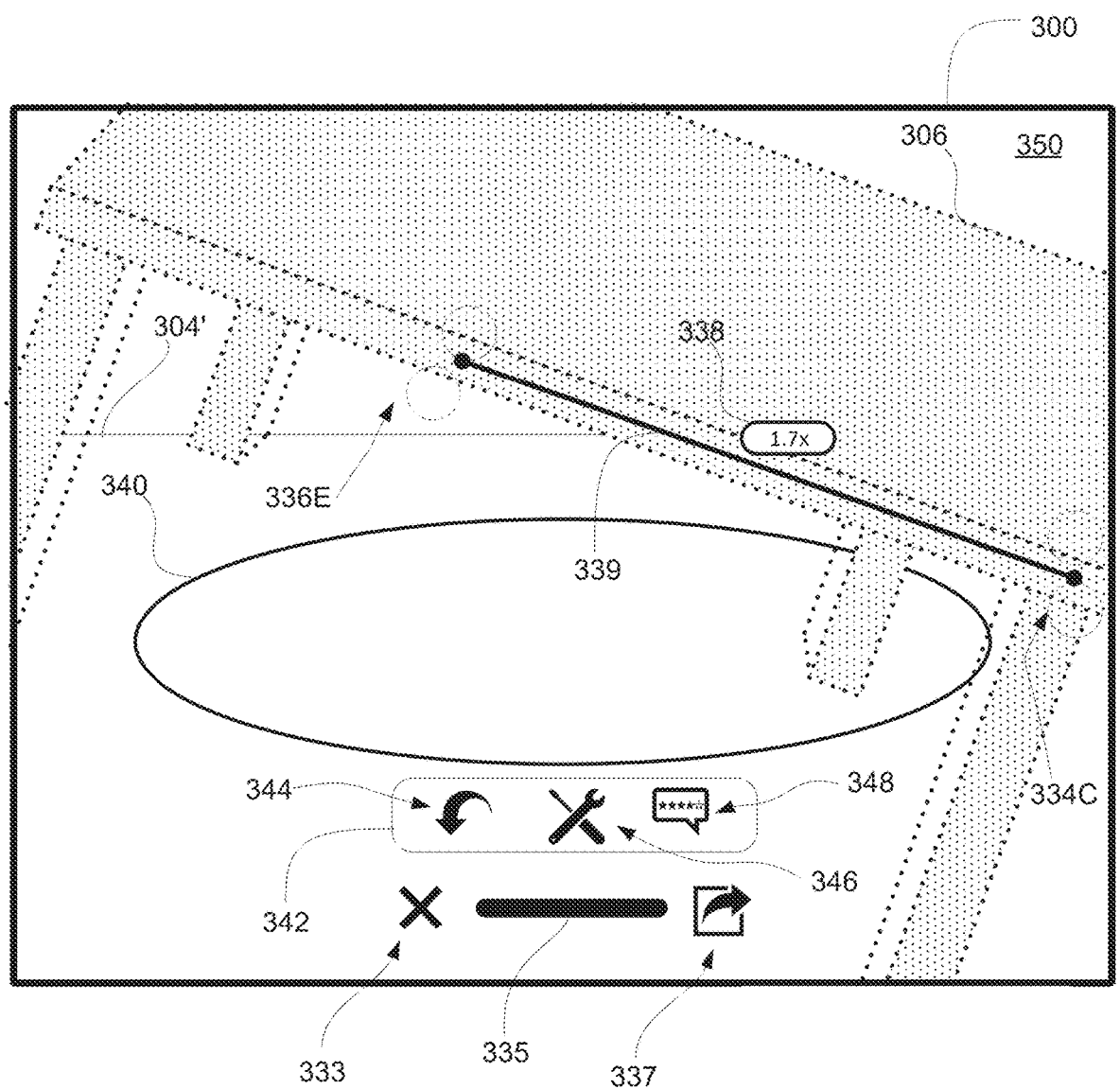

In some examples, virtual object 306 is optionally resizable within the three-dimensional environment 350. In some examples, the user may provide resizing input directed to the virtual object 306 by providing a two-hand pinch gesture at virtual object 306. For example, as the user maintains the selection input directed to virtual object 306 with one hand (e.g., as represented by selection user interface element 362), the user may provide a second selection input directed to virtual object 306 with a second hand. As shown in FIG. 3D, the electronic device 300 optionally displays a scale user interface element 336 in three-dimensional environment 350 when a relative position of the second hand of the user at least partially overlaps with a portion of the virtual object 306. As shown in FIG. 3D, the scale user interface element 336 is displayed overlaid on a respective portion of the virtual object 306 (e.g., at or near a corner of the object representation of the table), which optionally corresponds to a detected position of the hand of the user with respect to virtual object 306 in three-dimensional environment 350. In some examples, an axis through the scale user interface element 336 aligns with one of the axes of the selection user interface element 362 in three-dimensional environment 350. In some examples, in response to detecting the second selection input directed to virtual object 306, the electronic device 300 optionally replaces display of the selection user interface element 362 and/or the scale user interface element 335 with a scale 339 along the aligned axes of the scale user interface element 336 and the selection user interface element 362, as shown in FIG. 3E. In some examples, the electronic device 300 may display a pill 338 disposed near a portion of the scale 339 (e.g., disposed centrally above the scale 339) in three-dimensional environment 350 for indicating a magnitude of scaling of the virtual object 306. For example, as shown in FIG. 3E, the user increases the size of the virtual object 306 by a magnitude of 1.7× (e.g., as indicated in pill 338) in three-dimensional environment 350 by moving the two hands of the user farther apart while in the hands are in the pinch gesture. Additionally or alternatively, in some examples, the user may decrease the size of the virtual object 306 in three-dimensional environment 350 by moving the two hands of the user closer together while the hands each maintain the pinch gesture.

As mentioned above, in some examples, the one or more object manipulators optionally include a first object manipulator (e.g., a reset or undo affordance) 344. In some such examples, selection of the first object manipulator 344 optionally causes the virtual object 306 to be reset in three-dimensional environment 350 back to an initial state (e.g., corresponding to the original capture) before clean-up and/or to undo a previous clean-up operation. For example, in response to detecting selection of the first object manipulator 344, the electronic device 300 optionally rescales virtual object 306 to have its original size (e.g., size of virtual object 306 in FIG. 3A), and/or moves virtual object 306 in three-dimensional environment 350 to be displayed above the stage or tray 340 (e.g., the location of virtual object 306 in FIG. 3A), which optionally correspond to the size and/or location of the virtual object 306 when the virtual object 306 was first presented in three-dimensional environment 350.

As mentioned above, the electronic device 300 may provide graphics editing functionality within three-dimensional environment 350. As mentioned above, in some examples, the one or more object manipulators optionally include a second object manipulator (e.g., an object cleanup manipulator) 346. As discussed herein with reference to FIGS. 4A-4M, in response to detecting selection of the second object manipulator 346, the electronic device 300 may provide functionality for manually and effectively removing respective portions of the object representation (e.g., virtual object 306) and/or adjusting an appearance of the data points that form the object representation (e.g., the point cloud) in the three-dimensional environment 350. In some examples, the electronic device 300 may provide text generation and annotation functionality within three-dimensional environment 350. As mentioned above, in some examples, the one or more object manipulators optionally include a third object manipulator (e.g., a text annotation manipulator) 348. As discussed herein with reference 5A-5D, in response to detecting selection of the third object manipulator 348, the electronic device may provide functionality for manually and effectively generating and editing text labels to add to the object representation in three-dimensional environment 350 (e.g., and thereby associate text data with the object representation data).

In some examples, the three-dimensional environment 350 may further include one or more user interface elements 333-337 associated with the one or more object manipulators 344-348 and/or stage 340. In some examples, a first user interface element 333 of the one or more user interface elements is optionally selectable to close the graphics editing application displayed in three-dimensional environment 350. For example, in response to detecting selection of the first user interface element 333, the electronic device 300 optionally ceases to display the virtual object 306, the stage 340, the one or more object manipulators 342-348, and/or the one or more user interface elements 333-337. In some examples a second user interface element 335 of the one or more user interface elements is optionally selectable to initiate movement of the graphics editing application displayed in three-dimensional environment 350. For example, the second interface element 335 is a grabber or handlebar that, when selected (e.g., via pinch gesture of a hand of the user directly or when targeted by gaze), is optionally movable to cause the virtual object 306, the stage 340, the one or more object manipulators 344-348, and/or the one or more user interface elements 333-337 to move in three-dimensional environment 350 in accordance with the movement of the grabber or handlebar. In some examples, a third user interface element 337 of the one or more user interface elements 337 is optionally selectable to perform one or more additional actions associated with the virtual object 306 (e.g., sharing the object data corresponding to virtual object 306). For example, in response to detecting selection of the third user interface element 337, the electronic device 300 optionally initiates a process to share the virtual object data with one or more secondary devices (e.g., send a copy of the virtual object data, display the virtual object (or a two-dimensional representation of the virtual object) on a second electronic device, etc.). In some examples, in response to detecting selection of the third user interface element 337, the electronic device 300 optionally initiates a process to save the virtual object data (e.g., in a new or existing data file) on the electronic device 300. In some examples, in response to detecting selection of the third user interface element 337, the electronic device optionally initiates a process to export the virtual object data (e.g., as a new data type or format) on the electronic device 300. It should be understood that the above-described user interface elements are examples and that additional, fewer, or alternative user interface elements may be displayed in three-dimensional environment 350.

FIGS. 4A-4M illustrate example interactions with a virtual object 406 for performing object cleanup using one or more object manipulators in a computer-generated environment 450 according to some examples of the disclosure. In some examples, the three-dimensional environment 450 is presented using electronic device 400. In some examples, the three-dimensional environment 450 includes virtual object 406, stage or tray 440, and/or the one or more object manipulators 444-448 disposed within toolbar 442. In some examples, the three-dimensional environment includes captured portions of the physical environment in which electronic device 400 is located, such as a table (e.g., representation of table 404'). As described above, the virtual object 406 is optionally a point cloud corresponding to an object representation of the real-world table 404'.

Figure 4A:
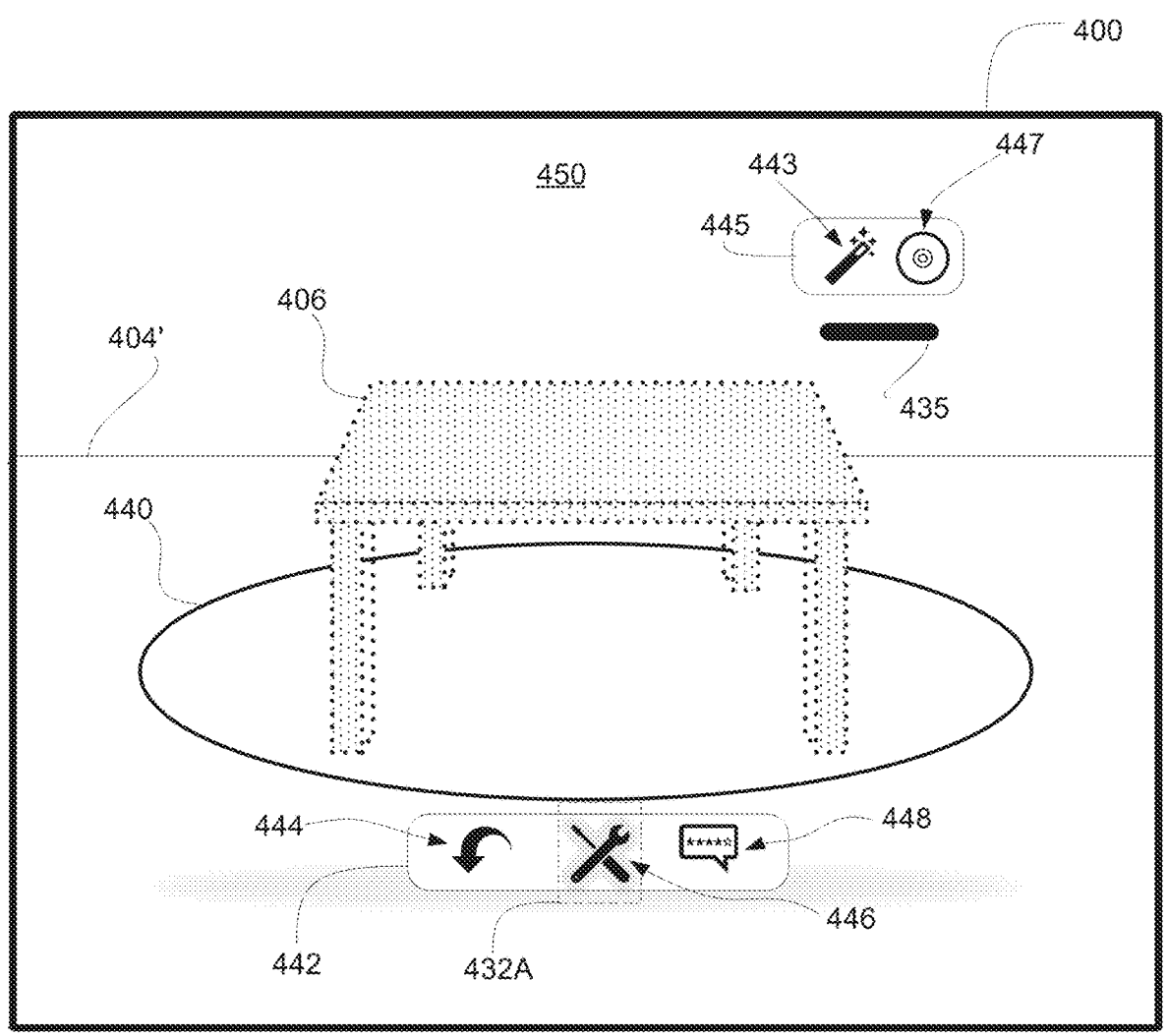
FIGS. 4A-4M illustrate example interactions with a virtual object for performing object cleanup using one or more object manipulators in a computer-generated environment according to some examples of the disclosure.

As shown in FIG. 4A, a selection input 432A is provided to the second object manipulator 446, which, as discussed above, optionally corresponds to the object cleanup manipulator. In some examples, the selection input 432A is provided via a finger touch, tap, click, etc. detected via one or more input devices (e.g., hand tracking sensors) in communication with electronic device 400. In some examples, the selection input 432A is provided via a pinch gesture (e.g., contact between an index finger and thumb of a hand of the user) detected via the one or more input devices in communication with electronic device 400. In some examples, selection input 432A is provided via input received via a physical device in communication with electronic device 400, such as a click or key press detected via a mouse, trackpad, keyboard, etc. In some examples, selection of the object cleanup manipulator 446 optionally causes the electronic device 400 to alter an appearance of the object cleanup manipulator 446. For example, as shown in FIG. 4A, selection of the object cleanup manipulator 446 causes the object cleanup manipulator 446 to become highlighted. It should be understood that, generally, in response to receiving selection of a respective object manipulator, the electronic device alters the appearance of the respective object manipulator (e.g., by highlighting, fading, bolding, etc.).

As shown in FIG. 4A, in some examples, in response to receiving the selection input 432A, the electronic device 400 optionally displays a first window 445 in three-dimensional environment 450. In some examples, the first window 445 is displayed with a respective user interface element 435, which is optionally a grabber or handlebar, that is selectable to initiate movement of the first window 445 within the three-dimensional environment 450. In some examples, the first window 445 includes one or more control affordances for initiating manipulation (e.g., editing, clean up, text labeling, etc.) of the virtual object 406 in three-dimensional environment 450. For example, in FIG. 4A, the first window 445 is displayed with a first control affordance 443, which optionally enables control of an eraser tool ("eraser tool," "eraser," "first tool"), and a second control affordance 447, which optionally enables control of a point sizing tool ("point sizing tool," "point size tool," "point sizer," "second tool"). As discussed in detail herein, selection of the one or more control affordances provides the user with functionality to manually manipulate various aspects of the virtual object 406 in three-dimensional environment 450.

Figure 4B:
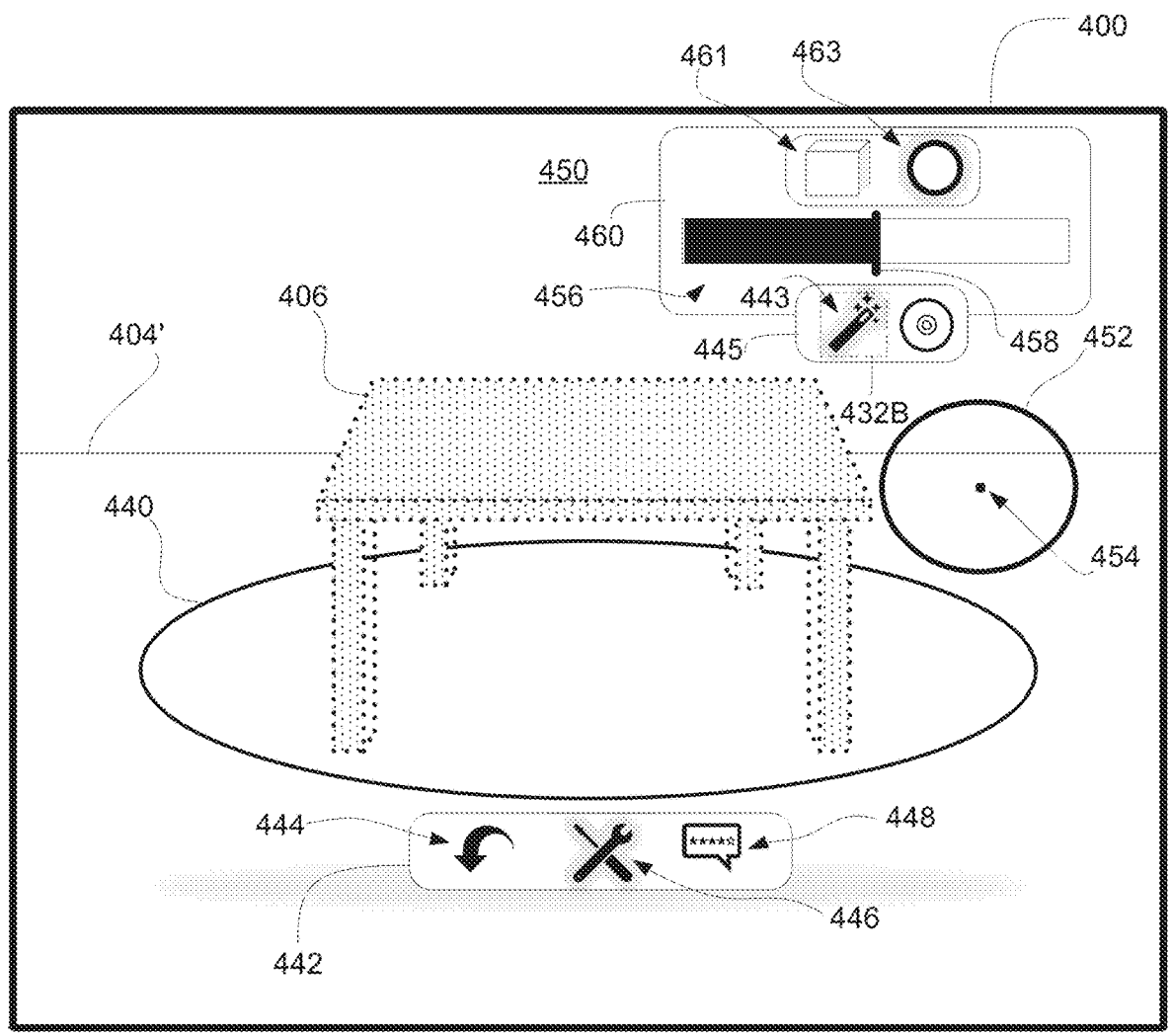

As shown in FIG. 4B, a selection input 432B is provided to the first control affordance 443. In some examples, in response to receiving the selection input 432B, the electronic device 400 displays an eraser tool 452 in three-dimensional environment 450, as shown in FIG. 4B. In some examples, the eraser tool 452 optionally has a first shape (e.g., a disc/circle or sphere). In some examples, the eraser tool 452 is optionally a three-dimensional object in three-dimensional environment 450, and thus has a first volume (e.g., dependent on the shape of the eraser tool 452). In some examples, the provided shape and/or volume of the eraser tool 452 is selected to be a default shape and/or a default volume. In some examples, the shape and/or volume of the eraser tool 452 is optionally adjustable to be alternative shapes and/or alternative volumes, as discussed in detail below. In some examples, as shown in FIG. 4B, the eraser tool 452 is displayed in the three-dimensional environment 450 with a center point 454, which is optionally visible to the user of the electronic device 400, and, in the example of FIG. 4B, optionally corresponds to a center of the circular/spherical eraser tool 452. In some examples, the eraser tool 452 is displayed in the three-dimensional environment 450 at a respective location that is based on a hand of the user of the electronic device 400. For example, the eraser tool 452 may be anchored to a relative position of the hand of the user in the field of view of the electronic device 400. In some examples, movement of the eraser tool 452 in the three-dimensional environment 450 is based on movement of the hand to which the eraser tool 452 is anchored, as described below.

Additionally, in some examples, in response to receiving the selection input 432B, the electronic device 400 displays an eraser tool window 460, as shown in FIG. 4B. Additionally or alternatively, in some examples, when the eraser tool window 460 is displayed in three-dimensional environment 450, the first window 445 ceases to be displayed in three-dimensional environment 450. In some examples, the eraser tool window 460 includes a plurality of editing affordances that are selectable/adjustable to provide editing functionality, particularly, for example, erasing/cleanup functionality. In some examples, the plurality of editing affordances includes one or more eraser shape affordances 461-463 that are selectable to change the shape of the eraser tool 452. In some examples, the plurality of editing affordances includes a size bar 456 including a size slider 458. In some examples, a position of the size slider 458 within the size bar 456 is optionally adjustable to adjust the size of the eraser tool 452 in three-dimensional environment 450, as discussed below.

Figure 4C:
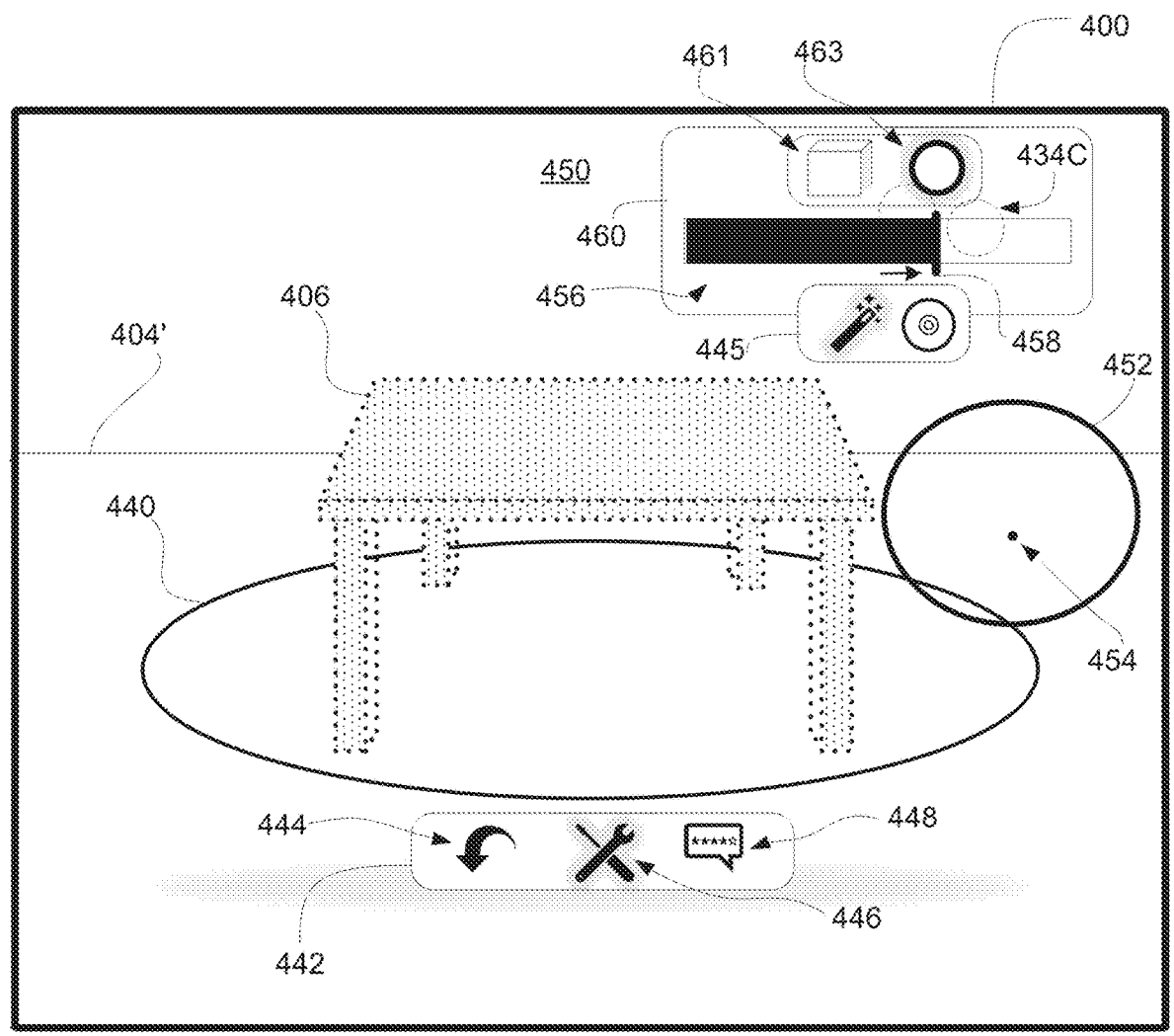

As shown in FIG. 4C, a pinch input 434C is provided to the size slider 458 of the size bar 456 in three-dimensional environment 450. In some examples, sliding the size slider 458 in a respective direction within the size bar 456 optionally causes the size of the eraser tool 452 to change. For example, as shown in FIG. 4C, pinch input 434C (e.g., a pinch gesture formed by an index finger and thumb of a hand of the user) moves the size slider 458 in a first respective direction (e.g., rightward) within size bar 456. In some examples, in response to receiving the pinch input 434C, the electronic device 400 increases the size (e.g., and/or volume) of the eraser tool 452 in three-dimensional environment 450. Additionally or alternatively, in some examples, in response to receiving a pinch input corresponding to movement of the size slider 458 in a second respective direction (e.g., leftward) within size bar 456, the electronic device 400 decreases the size (e.g., and/or volume) of the eraser tool 452 in three-dimensional environment 450. It should be understood that, while direct manipulations are described herein (e.g., direct manipulation of the size slider 458), in some examples, indirect manipulations of the various graphics editing tools discussed herein are possible.

Figure 4D:
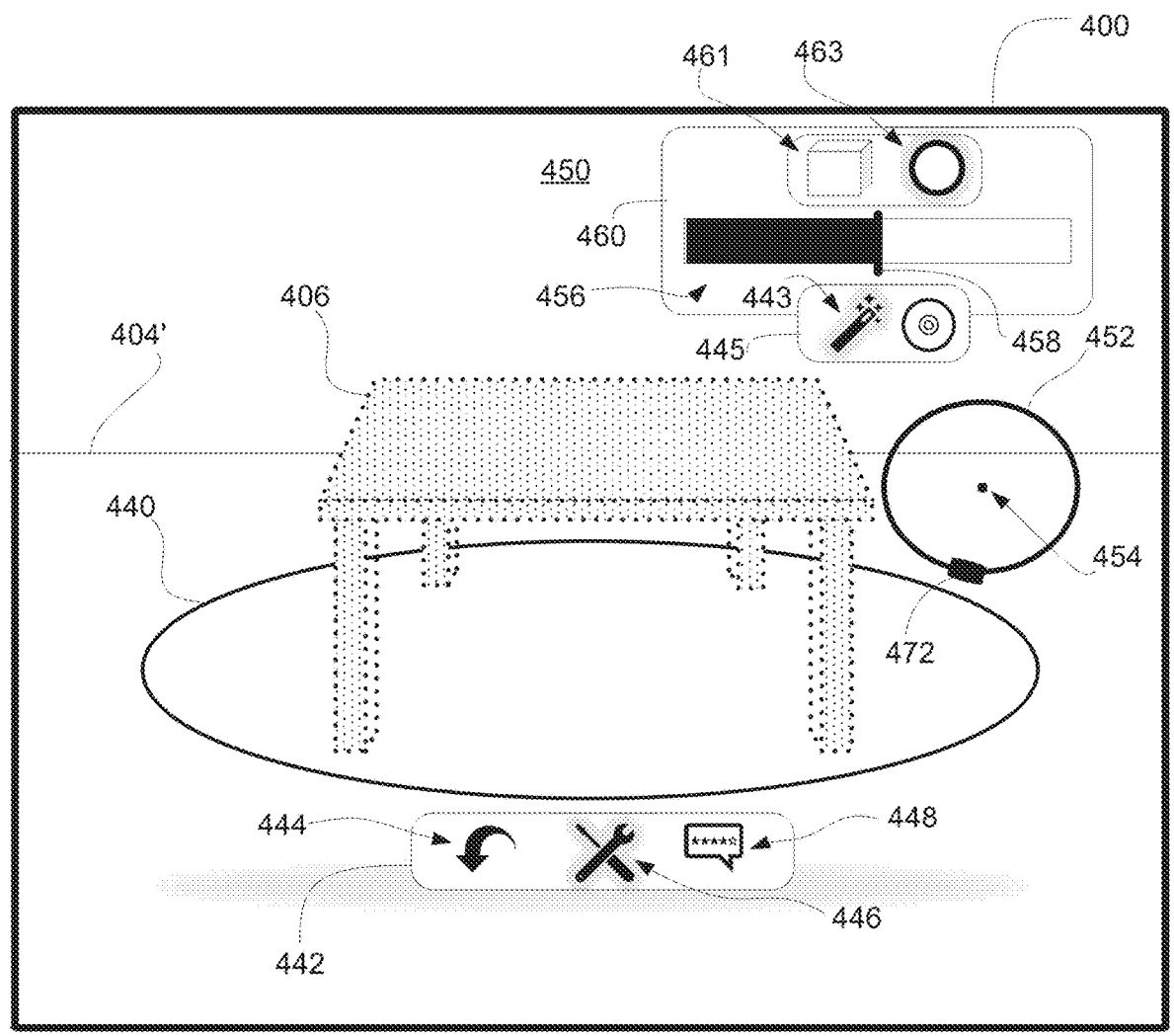
Figure 4E:
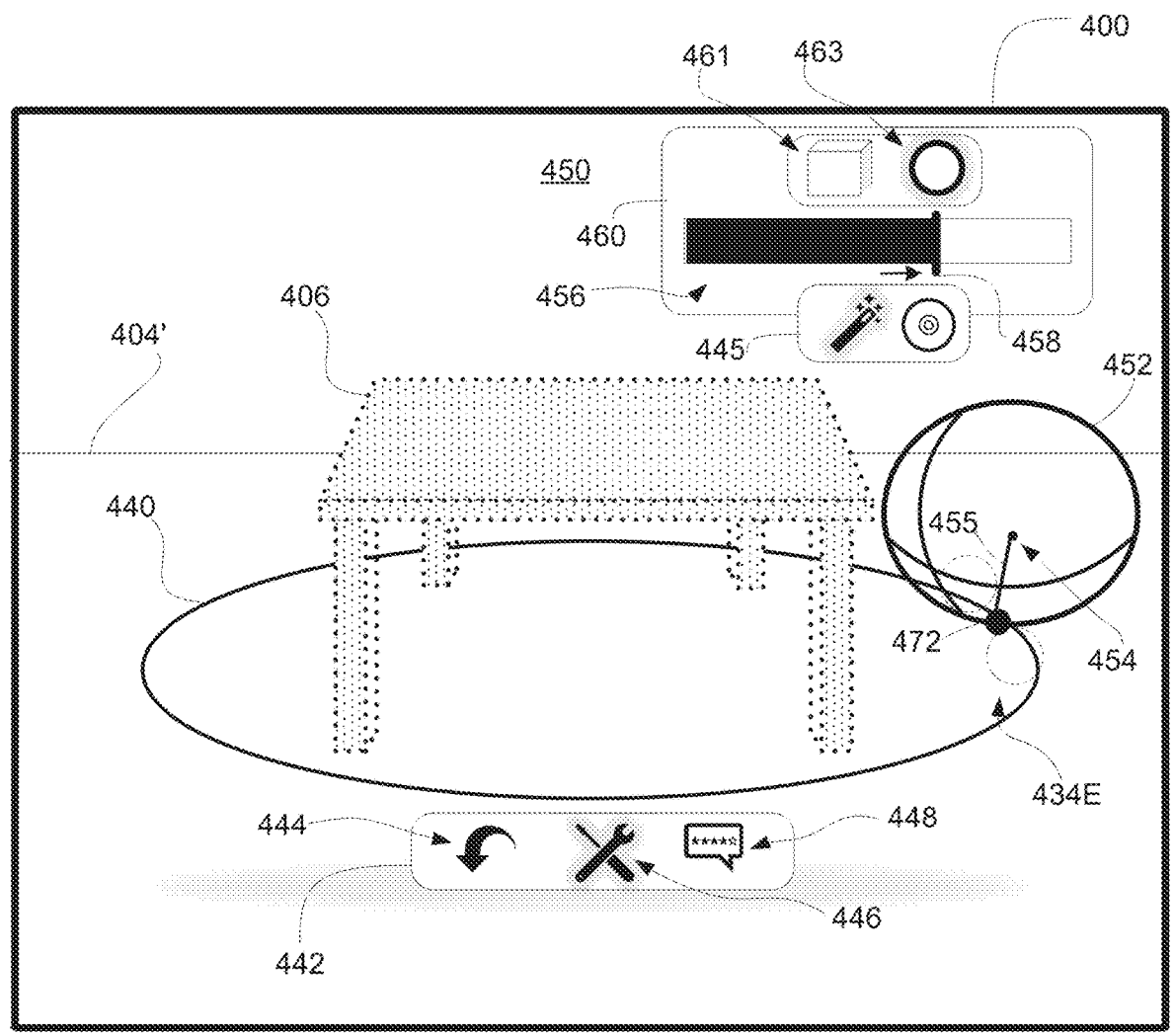

Additionally or alternatively, in some examples, pinch gestures received by a second hand received by electronic device 400 may change a size of the eraser tool 452 in three-dimensional environment 450. In some embodiments, the electronic device 300 may display a selection user interface element 472 in three-dimensional environment 450 when a relative position of a second hand of the user at least partially overlaps with (e.g., or is within a threshold distance (e.g., 1 cm, 2 cm, 4 cm, 5 cm, 10 cm, etc.) of) a portion of the eraser tool 452. For example, as shown in FIG. 4D, the selection user interface element 472 may be displayed in three-dimensional environment 450 overlaid on a portion of an edge of the eraser tool 452, indicating that the second hand of the user is detected. In some examples, pinch input directed to the selection user interface element 472 optionally causes the size of the eraser tool 452 to become adjustable in three-dimensional environment 450. For example, as shown in FIG. 4E, a pinch input 434E (e.g., provided by the second hand of the user) may be directed toward the selection user interface element 472 (e.g., at or near a point on the edge of the spherical eraser tool 452). In some examples, in response to detecting the pinch input, an appearance of the selection user interface element 472 is optionally altered in three-dimensional environment 450, as shown from FIG. 4D to FIG. 4E. In some examples, in response to detecting a subsequent input corresponding to a request to increase the size of the eraser tool 452, the electronic device 400 may increase the size of the eraser tool 452 in accordance with the input. For example, in FIG. 4E, while the pinch input 434E is maintained, a separation or movement of the second hand away from the first hand optionally causes the size of the eraser tool 452 to increase according to the separation of the first hand and the second hand. As shown, while the size of the eraser tool 452 is increased in three-dimensional environment 450, the electronic device 400 may display an extension line 455 connecting the center point 454 of the eraser tool 452 to the point on the edge of the eraser tool 452 at which the second pinch input 434E is directed. In some examples, a change in a length of the extension line 455 may signify an amount that the size of the eraser tool 452 changes. In some examples, as the size of the eraser tool 452 changes in response to detecting the pinch and separation input provided via the pinch input 434E, the electronic device 400 may move the size slider 458 within the size bar 456 in three-dimensional environment 450 in accordance with a magnitude of change of the size of the eraser tool 452.

Figure 4F:
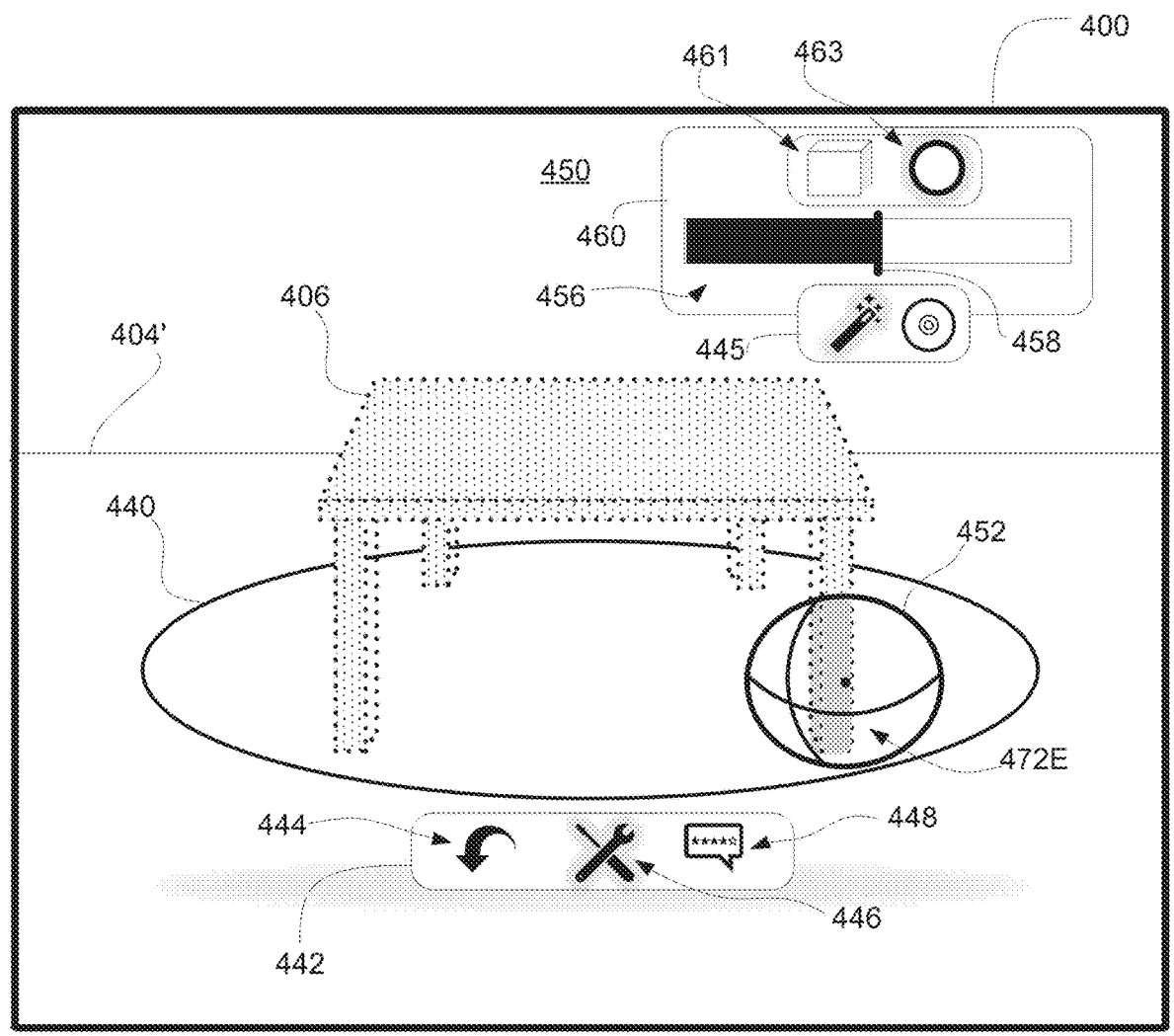

As mentioned herein above, in some examples, the eraser tool 452 may be operable to remove (e.g., cease display of) respective portions of the object representation 406 in the three-dimensional environment 450. For example, as discussed above, a location at which the eraser tool 452 is displayed in three-dimensional environment 450 is optionally based on a relative position of a hand of the user within the field of view of the three-dimensional environment 450. In some examples, the movement of the hand may correspondingly move a position of the eraser tool 452 in the three-dimensional environment 450. In FIG. 4F, to initiate object cleanup of the object representation 406, the user may move the eraser tool 452 (e.g., by moving the hand of the user within the field of view of the three-dimensional environment 450) to a portion of the object representation 406. As mentioned above, the eraser tool 452 may have a volume (e.g., defined by the size of the eraser tool 452) in three-dimensional environment 450. In some examples, when the eraser tool 452 is moved to the portion of the object representation 406 (e.g., a leg of the table), the portion of the object representation 406 may become encompassed by (e.g., overlap with) the eraser tool 452 (e.g., as determined by the volume of the eraser tool 452). In some examples, as shown in FIG. 4F, the electronic device 400 may alter an appearance of the portion of object representation 406 that overlaps with the eraser tool 452. For example, as shown, the portion of the object representation 406 that overlaps with the eraser tool 452 may become highlighted in three-dimensional environment 450. It should be understood that, in some examples, the portion of the object representation 406 that overlaps with the eraser tool 452 may alternatively become faded, bolded, translucent, shaded, patterned, changed in color, and the like.

Figure 4G:
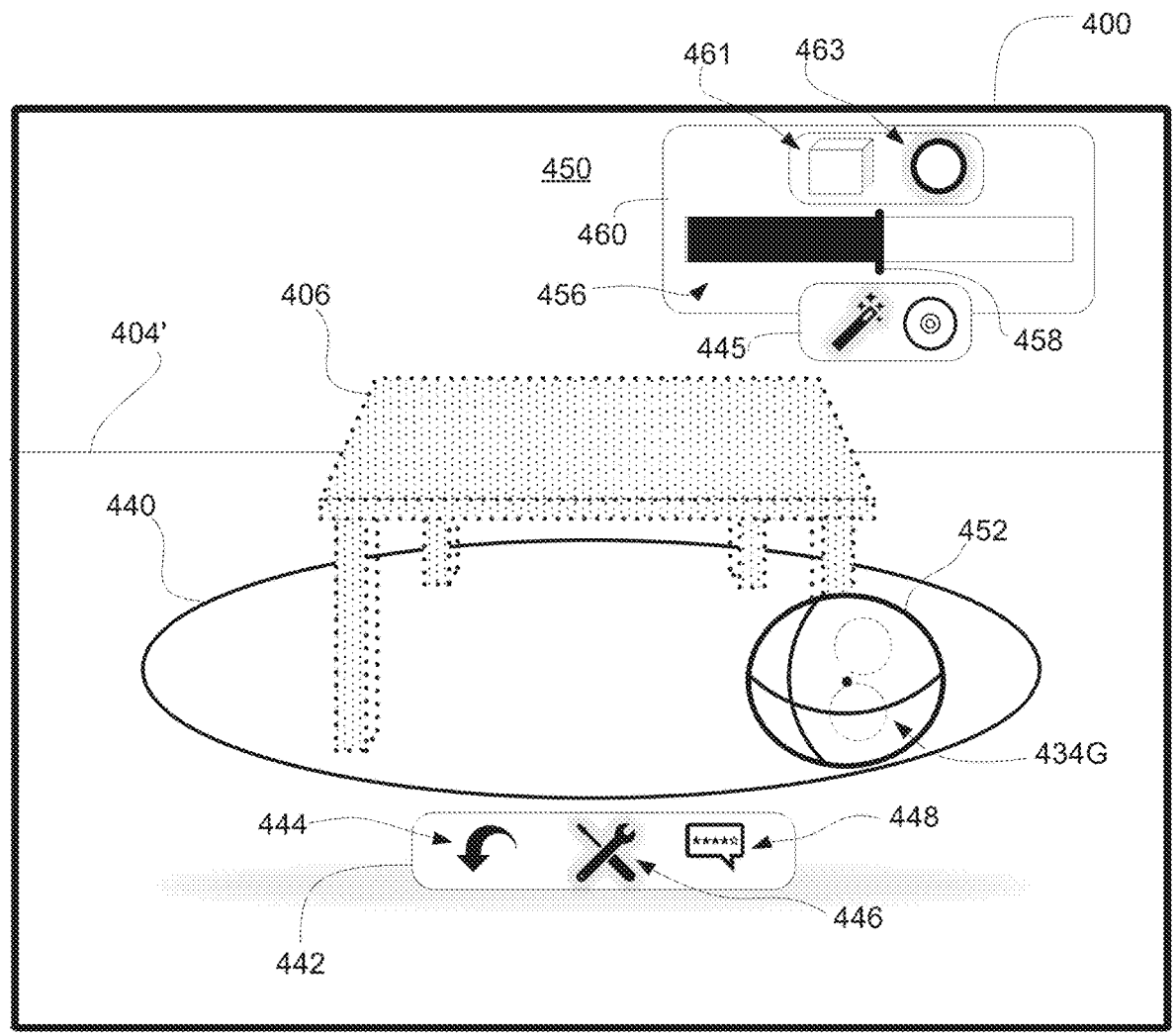

In some examples, the eraser tool 452 may be operable to remove the portion of the object representation 406 that overlaps with the eraser tool 452 in the three-dimensional environment 450. As shown in FIG. 4G, while the eraser tool 452 overlaps with the portion of the object representation 406, a pinch input 434G may be detected by the electronic device 400, which optionally causes the portion of the object representation 406 to be removed from the object representation 406 in the three-dimensional environment 450. In some examples, the pinch input 434G is provided by the same hand of the user to which the eraser tool 452 is anchored. In some examples, the pinch input 434G is provided by a second hand of the user (e.g., separate from the hand of the user to which the eraser tool 452 is anchored). In some examples, the electronic device 400 may stabilize a movement of the eraser tool 452 when a pinch input corresponding to operation of the eraser tool 452 is detected. For example, the electronic device 400 may limit movements or reorientations of the eraser tool 452 in the three-dimensional environment 450 when the pinch input 434G is detected, which may limit and/or avoid shifting of the eraser tool 452 (e.g., and thus removal of other portions of the object representation 406 than originally intended). In some examples, removal of the portion of the object representation 406 corresponds to removal of respective data points defining the portion of the object representation 406. For example, as described herein, the object representation 406 may correspond to a point cloud in three-dimensional environment 450. Thus, removal of the portion of the object representation 406 may correspond to removal of corresponding data points of the point cloud (e.g., of the data file defining and/or describing the point cloud). In some examples, the data points of the point cloud optionally cease being displayed in three-dimensional environment 450. Accordingly, the eraser tool 452 may be used to manually remove portions of the object representation 406 in the three-dimensional environment 450, which optionally corresponds to edits and modifications of the data file defining and/or describing the point cloud corresponding to the object representation 406.

Figure 4H:
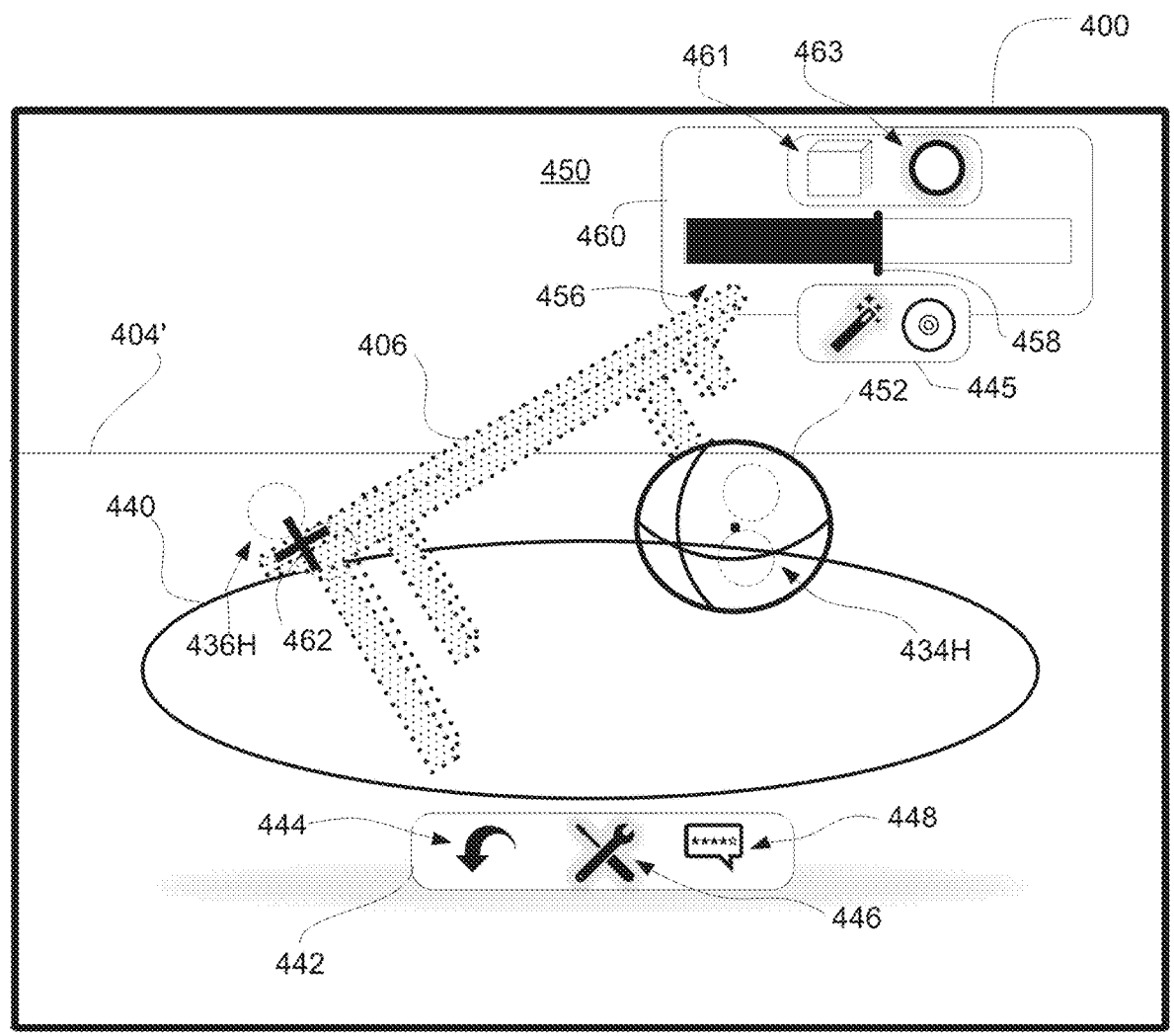

In some examples, the object representation 406 may be moved and/or reoriented in the three-dimensional environment 450 concurrently with the eraser tool 452 being controlled to remove respective portions of the object representation 406. For example, as shown in FIG. 4H, while the eraser tool 452 is controlled by a first hand of the user (e.g., to reposition and/or reorient the eraser tool 452 or remove portions of the object representation 406), a second hand of the user may provide movement input directed to the object representation 406 (e.g., lifting and rotating object representation 406) to enable easier and more efficient object cleanup of respective portions of the object representation 406 (e.g., portions beneath the table). In FIG. 4H, the electronic device 400 detects a pinch gesture 436H directed to a respective portion of the object representation 406. As described above, in some examples, in response to detecting the pinch gesture 436H, the electronic device 400 optionally displays a selection affordance 462 overlaid on the object representation 406 at or near the location in three-dimensional environment 450 at which the pinch input 436H was detected. While the pinch input 436H is maintained, the hand of the user providing the pinch input 436H may move and/or rotate within three-dimensional environment 450 to move and/or rotate the object representation 406 to a new location and/or orientation, as shown in FIG. 4H. While the object representation 406 is displayed in the three-dimensional environment 450 at the new location and/or orientation, the other hand of the user controlling the eraser tool 452 may move to other portions of the object representation 406 to selectively remove the other portions of the object representation 406 (e.g., portions of the object representation 406 that were not visible and/or displayed prior to the movement and/or rotation of the object representation 406). Thus, the eraser tool 452 may be controlled (e.g., moved and operated (e.g., by providing pinch input 434H)) within the three-dimensional environment 450, while the object representation 406 is moved and/or reoriented in the three-dimensional environment 450, to easily and selectively clean up the object representation. Thus, one advantage of the disclosed object cleanup functionality of the graphics editing tools is the ability to selectively clean up a point cloud by manually removing portions of the point cloud in a three-dimensional environment. Another advantage is the flexibility with which portions of the point cloud may be removed by requiring an overlap between the eraser tool and a portion of the point cloud or the orientation of the point cloud and the eraser tool.

Figure 4I:
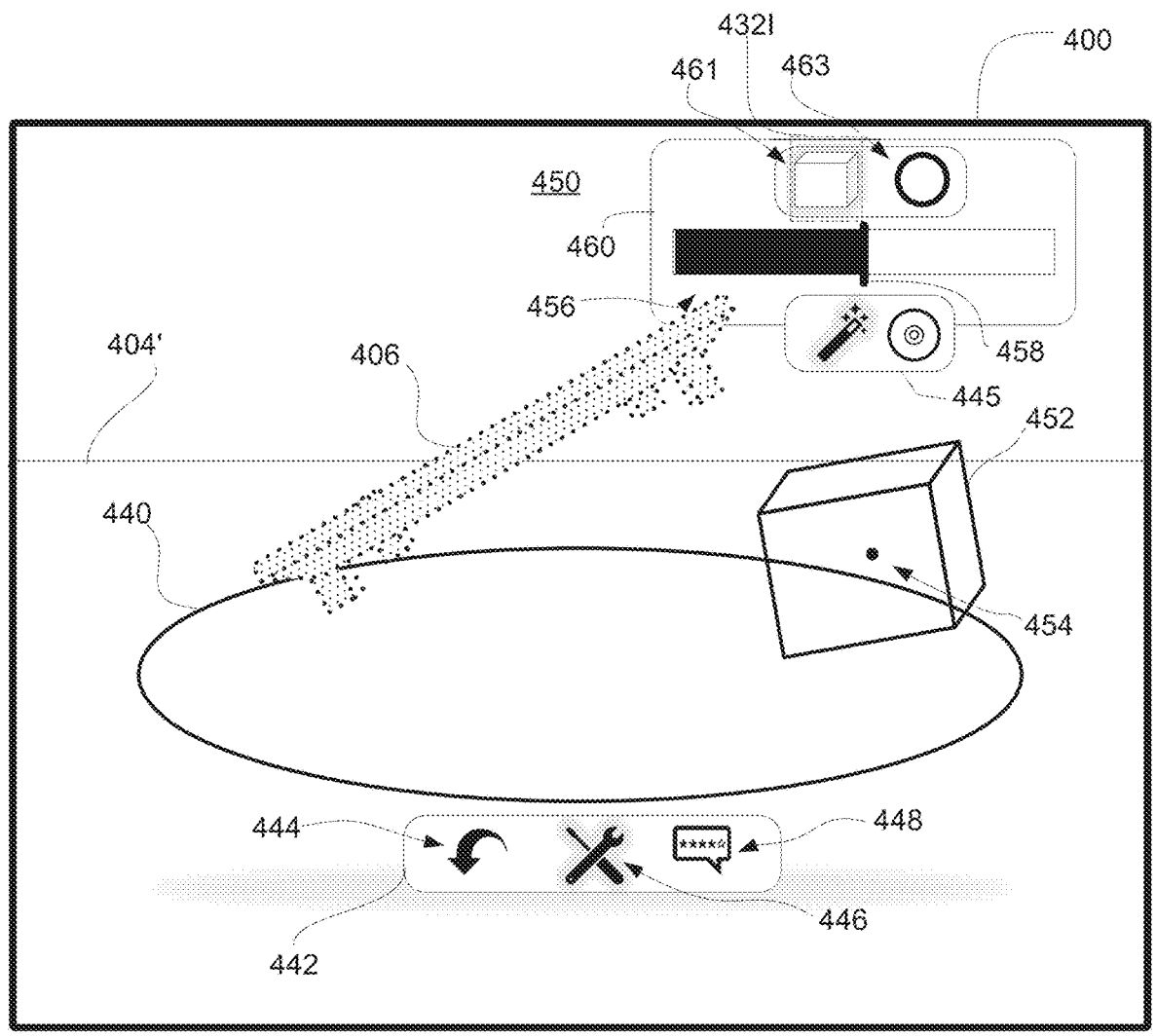

In some instances where the object representation 406 includes one or more flat surfaces (e.g., such as the portions of the legs of the table connected to a bottom surface of the table), removal of portions of the object representation 406 at or near the one or more flat surfaces may be difficult using the circular/spherical eraser tool 452 discussed above. Accordingly, in some examples, the shape of the eraser tool 452 may be changed in the three-dimensional environment 450 to adapt the eraser tool 452 to the one or more flat surfaces of the object representation 406. For example, as shown in FIG. 4I, much of the portions of the legs of the table have been removed from the three-dimensional environment 450 using the eraser tool 452 of FIG. 4H, but portions of the legs connected to the bottom surface of the table may not be easily removed using the spherical eraser tool 452 (e.g., without also removing portions of the bottom surface of the table). As discussed above, the eraser tool window 460 may comprise the eraser shape affordances 461-463 selectable to change the shape of the eraser tool 452. In FIG. 4I, selection input 4321 is directed to a first eraser shape affordance 461, which may indicate the shape (e.g., square/cube) to which the eraser tool 452 will be changed. In some examples, in response to detecting the selection of the first eraser shape affordance 461, the electronic device 400 optionally changes the shape of the eraser tool 452 to correspond to the shape indicated by the first eraser shape affordance 461. For example, as shown in FIG. 4I, the eraser tool 452 is altered from having a spherical shape to a cubic shape. As before, the cubic eraser tool 452 may comprise a center point 454 indicative of the center of the eraser tool 452. It should be understood that while only two different eraser shape affordances are illustrated in FIG. 4I, additional or alternative eraser shape affordances may be provided. For example, a respective eraser shape affordance that is selectable to cause the eraser tool to have a polygonal shape, a geometric shape, a conic shape, a triangular shape, an octagonal shape, a pyramidal shape, etc. may be provided within the eraser tool window 460.

Figure 4J:
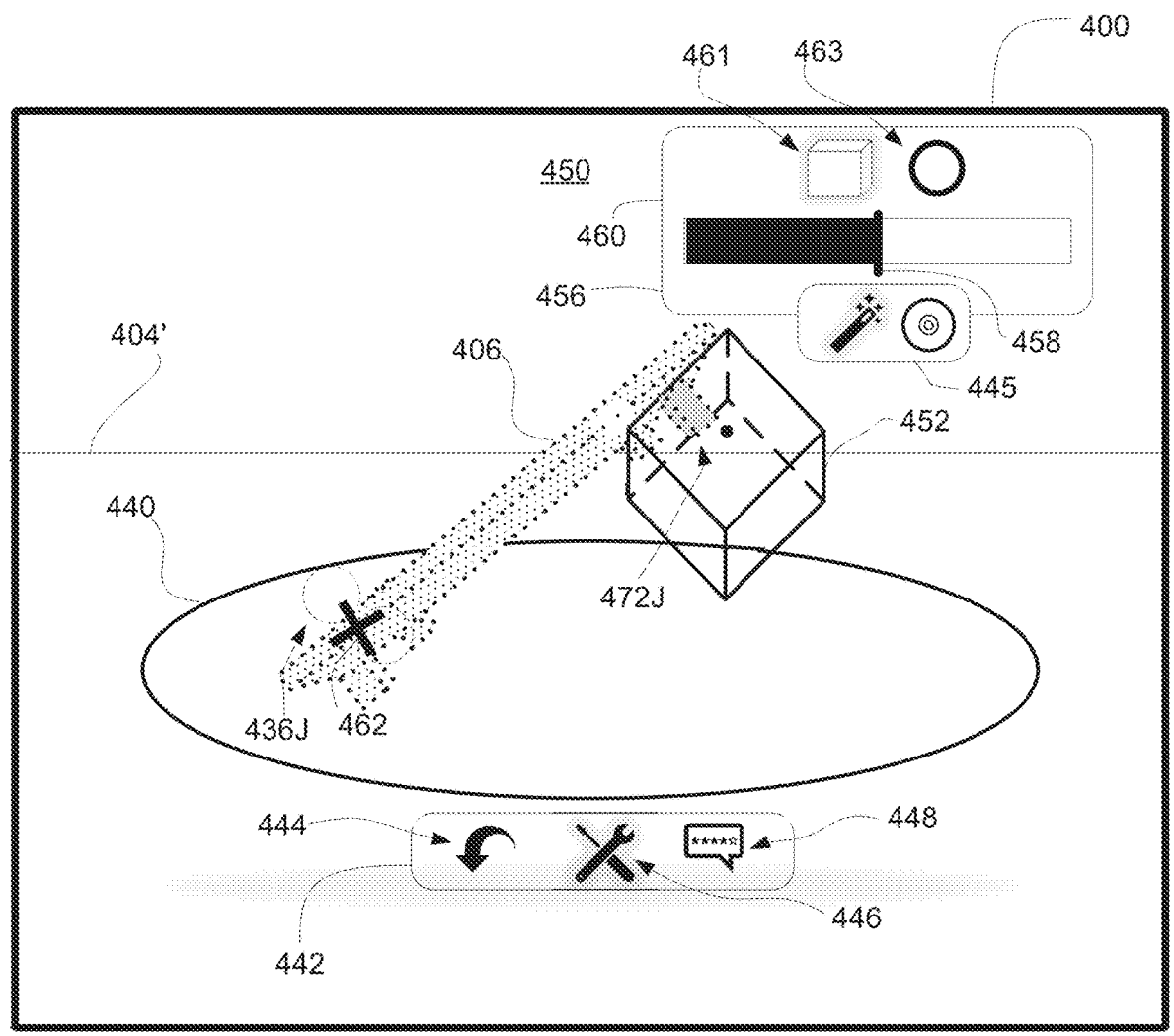

As discussed herein, in some examples, the eraser tool 452 is optionally operable to remove respective portions of the object representation 406 in the three-dimensional environment 450. As shown in FIG. 4J, the cubic eraser tool 452 is moved to the portions of the object representation 406 that were difficult to remove with a spherical-shaped tool, as discussed above. As described above, in some examples, the portion of the object representation 406 that overlaps with the cubic eraser tool 452 (e.g., as defined by the volume of the cubic eraser tool 452) may become altered in appearance in three-dimensional environment 450 (e.g., may become highlighted, as shown). Additionally, as described above, in some examples, the location and/or orientation of the object representation 406 may be changed in three-dimensional environment 450 to allow for ease of selective removal of the portions of the object representation 406. For example, as shown in FIG. 4J, a pinch input 436J is directed to a portion of the object representation 406, which optionally causes the electronic device 400 to display the selection affordance 462 in response to detecting the pinch input 436J. As the pinch input 436J is maintained, the object representation 406 is configurable to be moved and/or reoriented within the three-dimensional environment 450 (e.g., in accordance with movement of the hand providing the pinch input 436J). For example, as shown in FIG. 4J, the object representation 406 is reoriented to reveal more portions of the bottom surface of the table (e.g., while the eraser tool 452 is concurrently moved to the portions of the bottom surface of the table representation 406).

Figure 4K:
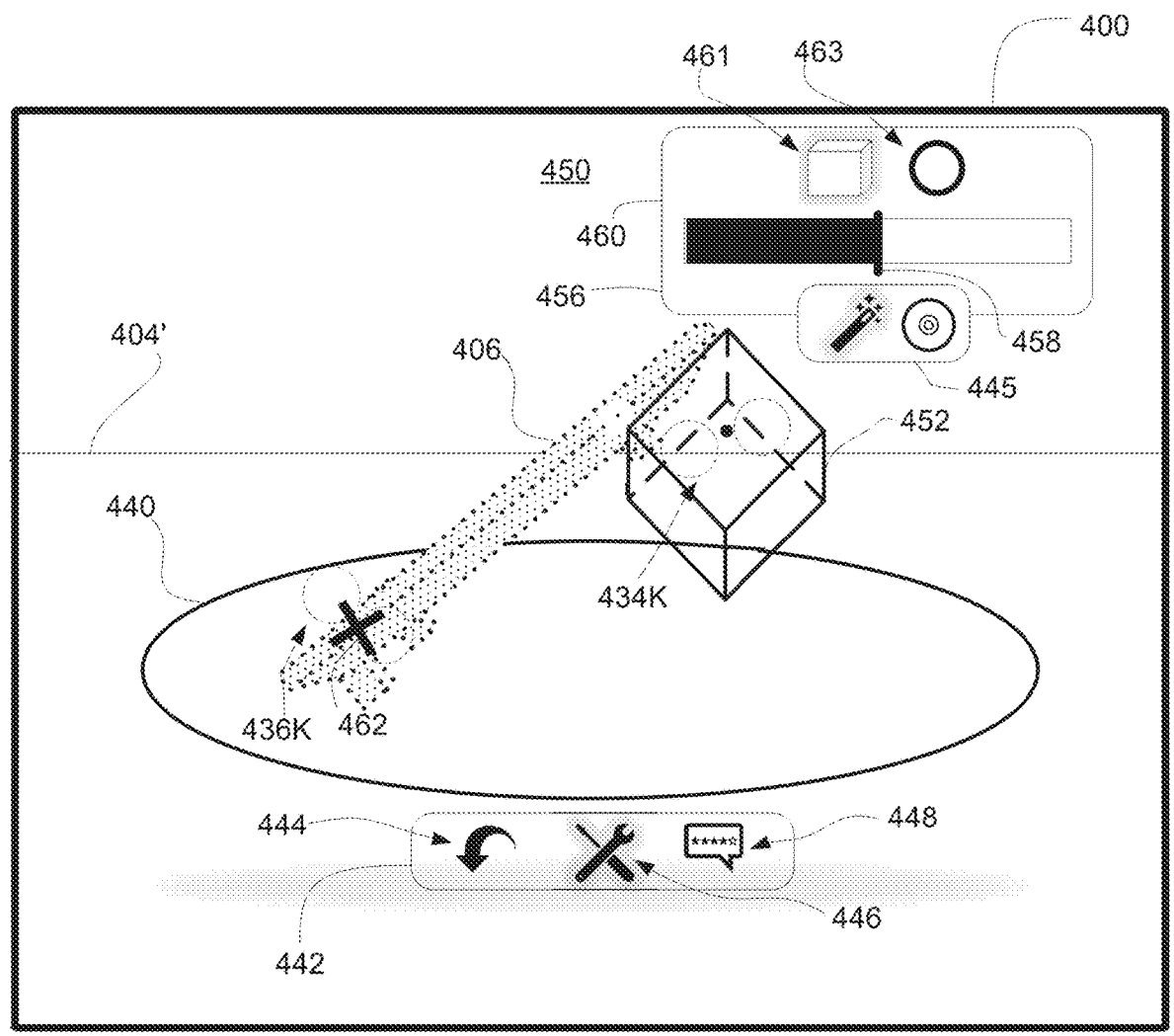

In some examples, the cubic eraser tool 452 is optionally operable to remove the portion of the object representation (e.g., table representation) 406 that overlaps with the cubic eraser tool 452. As discussed above, a pinch input 434K may be directed to the eraser tool 452 (e.g., using the hand controlling the eraser tool 452) to cause the highlighted portions of the object representation (e.g., that overlap with the eraser tool 452) to be removed from the object representation 406 in the three-dimensional environment 450. As shown in FIG. 4K, because the cubic eraser tool 452 includes flat surfaces, the cubic eraser tool 452 may more easily align to the bottom surface of the table representation 406. Accordingly, the leg portions connected to the bottom surface of the table representation 406 may be removed from the table representation 406 using the cubic eraser tool 452 without removing respective portions of the bottom surface of the table representation 406 (e.g., which may have occurred using the spherical eraser tool 452 of FIG. 4H). In some examples, the cubic eraser tool 452 may be controlled to remove the remaining portions of the legs of the table representation 406 while the table representation 406 is further moved and/or reoriented in three-dimensional environment 450 (e.g., via pinch input 436K provided by the other hand of the user) to enable easier removal of the remaining portions of the legs of the table representation 406.

In some examples, following the selective object cleanup of the object representation 406, the graphics editing tools provided in three-dimensional environment 450 may be closed and the object representation 406 may be saved as a new data file or may replace the existing data file from which the object representation 406 was initially launched in three-dimensional environment 450. In some examples, following the selective object cleanup of the object representation 406, the object representation 406 could be shared with a second electronic device or exported to a different data type or format. Additionally or alternatively, in some examples, one or more additional graphics editing actions may be performed using the graphics editing tools in the three-dimensional environment 450, as discussed below.

Figure 4L:
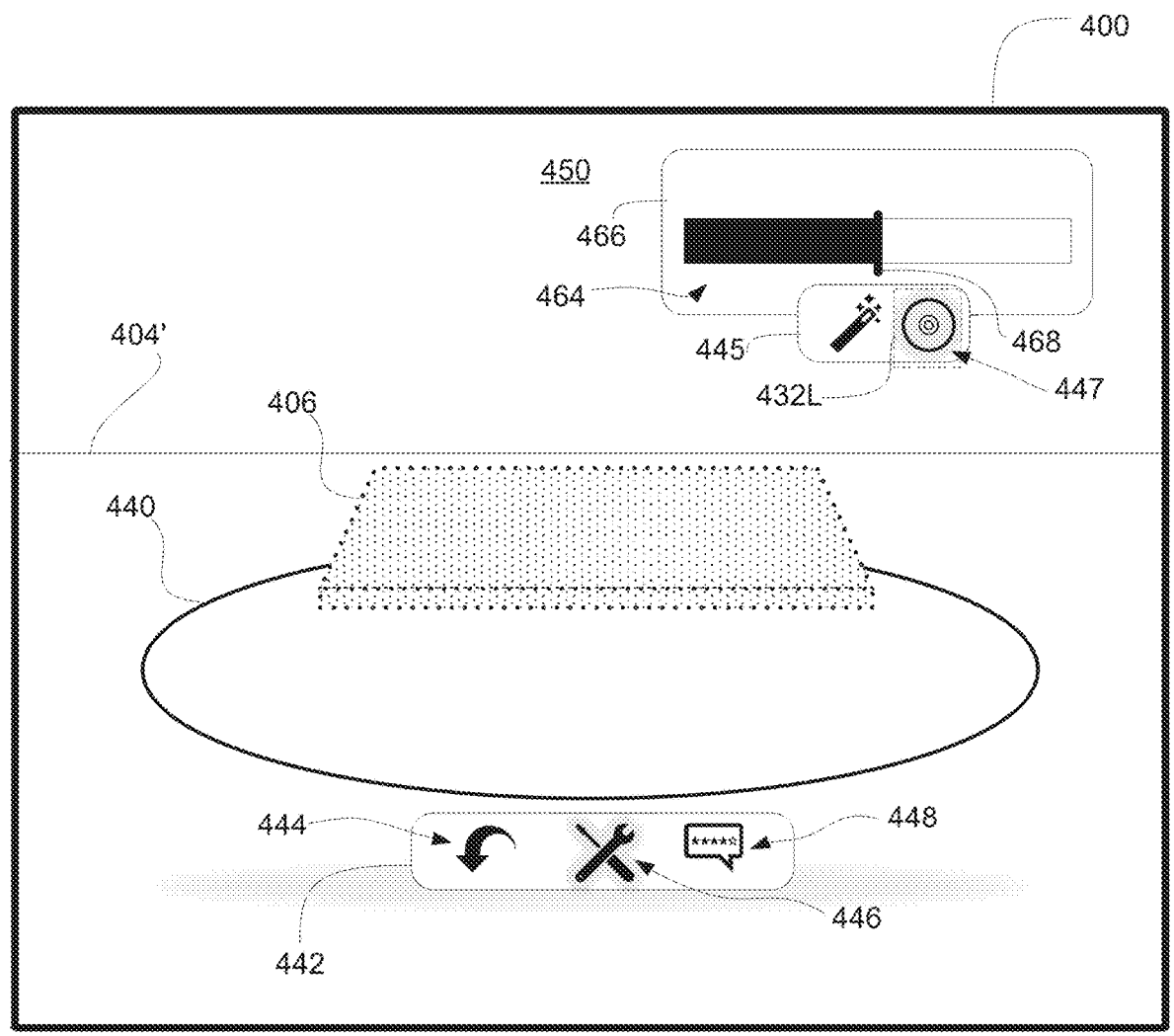

In some examples, the graphics editing tools may include a point sizing tool operable to change a size of each of the data points of the point cloud corresponding to the object representation 406. In some examples, as shown in FIG. 4L, the first window 445 may comprise a second control affordance 447 that is selectable to initiate display of a point sizing tool in the three-dimensional environment 450. For example, in FIG. 4L, a selection input 432L is directed to the second control affordance 447 of the first window 445. In some examples, in response to detecting the selection of the second control affordance 447, the electronic device 400 optionally displays a point size window 466. As shown in FIG. 4L, in some examples, the point size window 466 may comprise the point sizing tool 464, which may be a point size bar. In some examples, the point size bar 464 optionally includes a size slider 468 that is selectable to initiate adjustment of a size of each of the data points of the point cloud corresponding to the object representation 406, as described below.

Figure 4M:
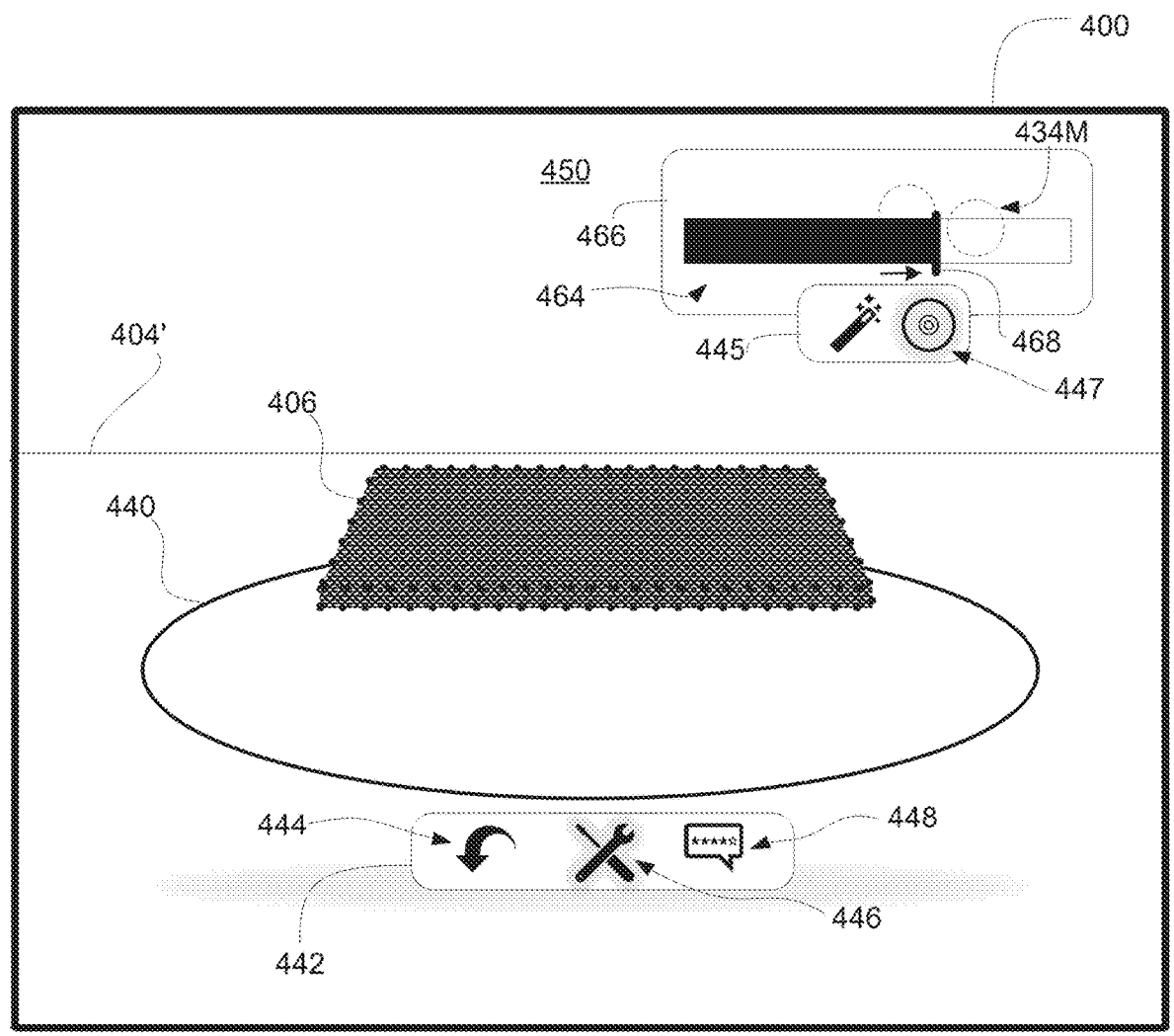

In FIG. 4M, a pinch input 434M is directed to the size slider 468. In some examples, sliding the size slider 468 in a respective direction within the point size bar 464 optionally causes the size of each data point of the point cloud corresponding to the object representation 406 to change. For example, as shown in FIG. 4M, pinch input 434M (e.g., a pinch gesture formed by an index finger and thumb of a hand of the user or via an indirect manipulation) moves the size slider 468 in a first respective direction (e.g., rightward) within the point size bar 464. In some examples, in response to receiving the pinch input 434M, the electronic device 400 increases the size of each data point of the point cloud corresponding to the object representation 406 in three-dimensional environment 450. For example, as shown in FIG. 4M, the individual points of the object representation 406 become larger, which optionally alters an appearance of the object representation 406 (e.g., causes the object representation to appear darker in shade/color). Additionally or alternatively, in some examples, in response to receiving a pinch input corresponding to movement of the size slider 468 in a second respective direction (e.g., leftward) within the point size bar 464, the electronic device 400 decreases the size of each data point of the point cloud corresponding to the object representation 406 in three-dimensional environment 450. In some examples, changes to the point size of the point cloud in three-dimensional environment 450 optionally correspond to edits or modifications to the data file defining and/or describing the point cloud. For example, decreasing the size of the data points of the point cloud in three-dimensional environment 450 optionally changes the size of the data points of the point cloud in the data file from which the object representation 406 was initially launched in three-dimensional environment 450. In some examples, changes to the point size of the point cloud in three-dimensional environment 450 optionally correspond to changes in a density of data points of the point cloud. For example, increasing the size of data points of the point cloud in three-dimensional environment 450 optionally decreases the density of (e.g., the number of) data points in the point cloud. Decreasing the size of data points of the point cloud in three-dimensional environment 450 optionally increases the density of data points in the point cloud.

As described herein, the graphics editing tools may provide text annotation functionality in the three-dimensional environment. Attention is now directed to text annotation control affordances and associated processes for the generation and modification of text labels in the three-dimensional environment. As described below, the text labels may become associated with the object representation in the three-dimensional environment, such that text data corresponding to the text labels become associated with the metadata corresponding to the object representation.

FIGS. 5A-5E illustrate example interactions with a virtual object 506 for performing text annotation using one or more object manipulators in a computer-generated environment 550 according to some examples of the disclosure. In some examples, the three-dimensional environment 550 is presented using electronic device 500. In some examples, the three-dimensional environment 550 includes virtual object 506 (e.g., which optionally corresponds to virtual object 406 in FIGS. 4A-4M), stage or tray 540, and/or the one or more object manipulators 544-548 disposed within toolbar 542. In some examples, the three-dimensional environment 550 includes captured portions of the physical environment in which electronic device 500 is located, such as a table (e.g., representation of table 504'). As described above, the virtual object 506 is optionally a point cloud corresponding to an object representation of the real-world table 504'.

Figure 5A:
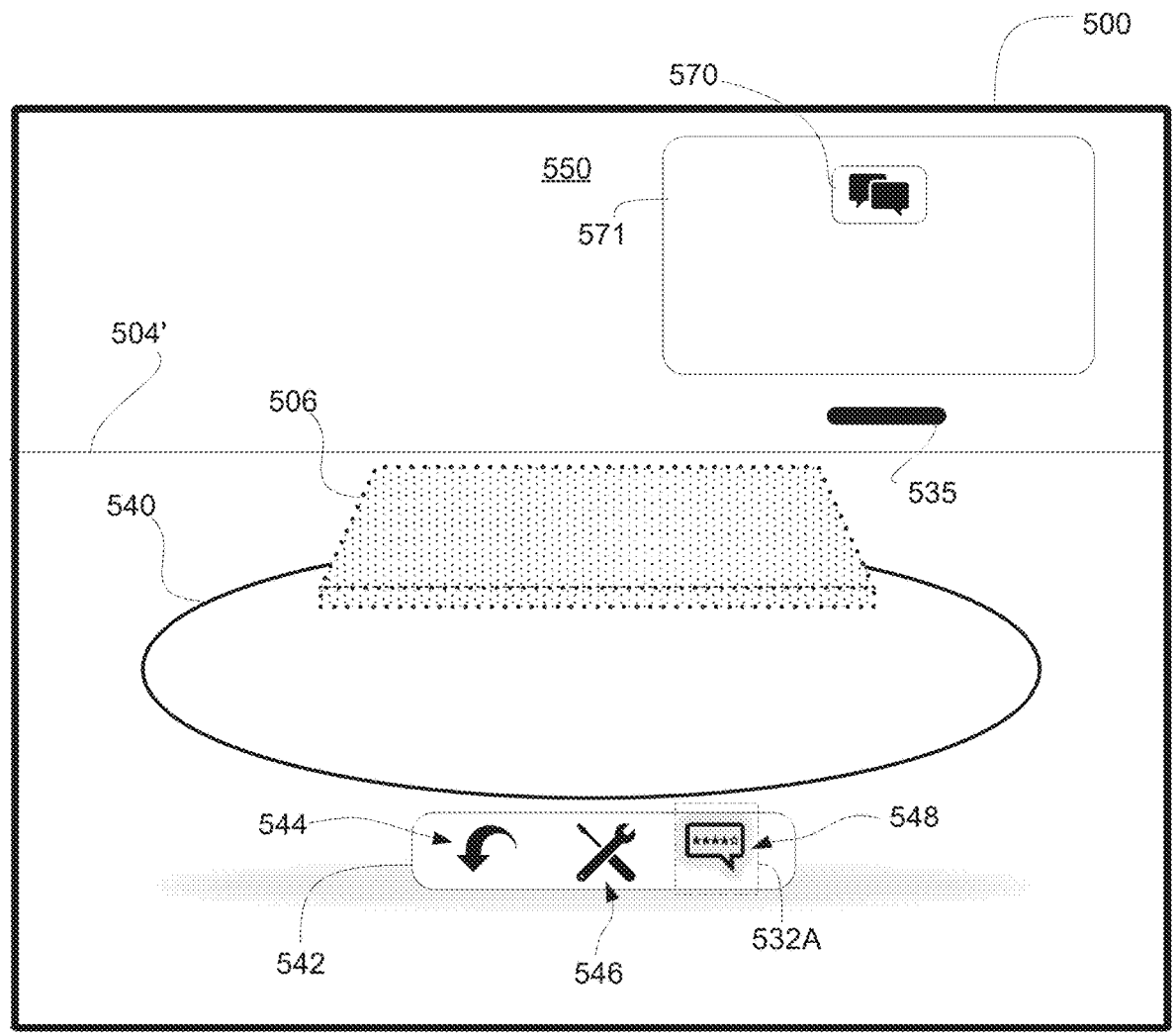
FIGS. 5A-5E illustrate example interactions with a virtual object for performing text annotation using one or more object manipulators in a computer-generated environment according to some examples of the disclosure.

In some examples, one or more text labels may be generated and associated with the virtual object 506 within three-dimensional environment 550. For example, in FIG. 5A, a selection input is directed to the third object manipulator 548, which optionally corresponds to the text annotation manipulator in three-dimensional environment 550. In some examples, in response to detecting the selection of the third object manipulator 548, the electronic device 500 optionally displays a second window 571 in the three-dimensional environment 550. As shown in FIG. 5A, in some examples, the second window 571 may include a text label affordance 570 that is selectable to initiate generation of a text label in the three-dimensional environment 550. Additionally, in some examples, the second window 571 is displayed with a respective user interface element 535, which is optionally a grabber or handlebar that is selectable to initiate movement of the second window 571 within the three-dimensional environment 550. For example, as similarly discussed above, a pinch input directed to the grabber or handlebar 535 optionally causes the second window 571 to be moved to a new location and/or orientation (e.g., elevation) within the three-dimensional environment 550 (e.g., in response to a movement of the hand providing the pinch input).

Figure 5B:
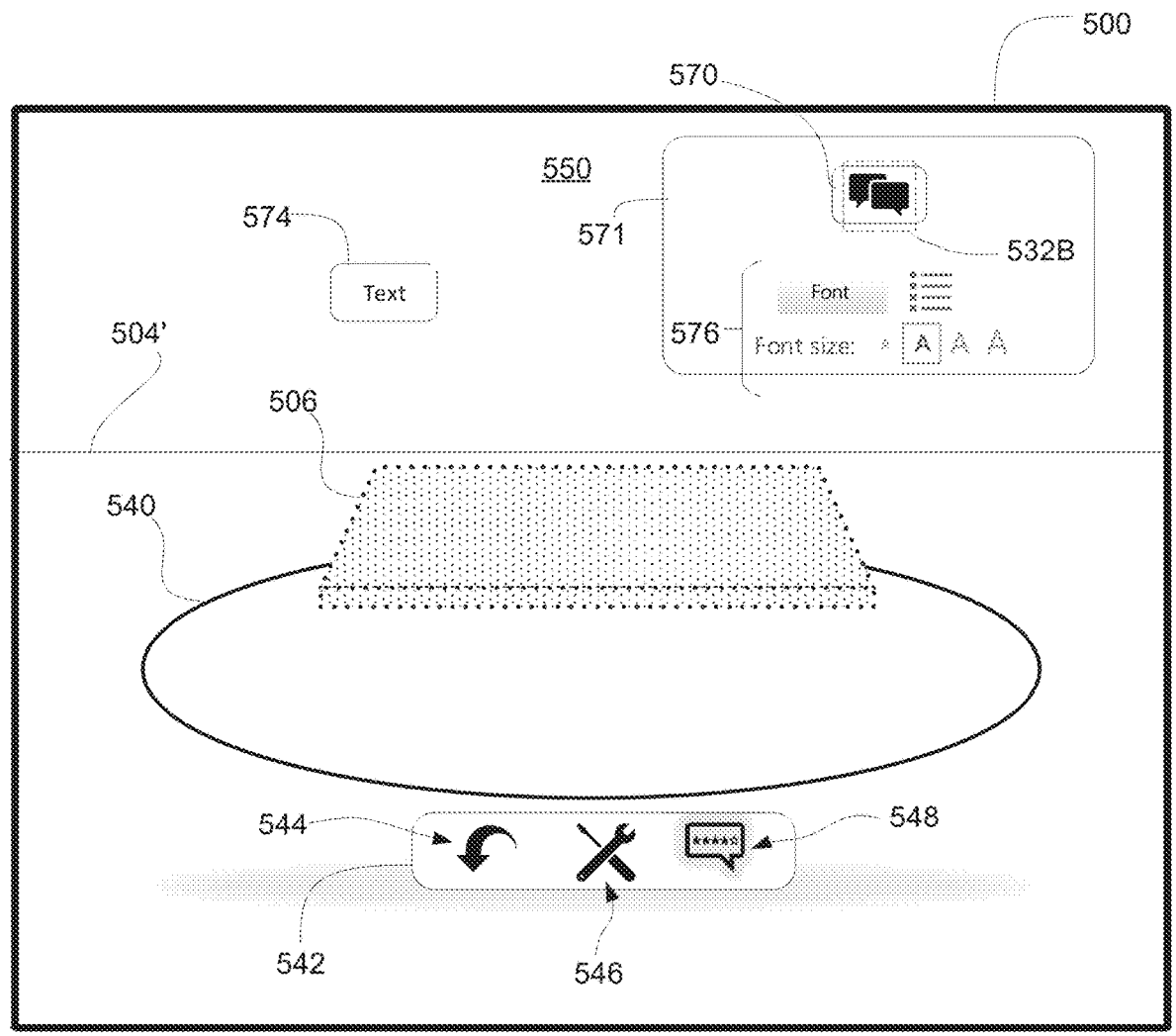

In some examples, a text label may be generated within the three-dimensional environment and can be associated with the object representation 506. For example, as shown in FIG. 5B, a respective input 532B may be directed to the text label affordance 570 of the second window 571 in the three-dimensional environment 550. In some examples, the respective input may be a selection input (e.g., corresponding to a touch, tap, double tap, etc. of a finger of a hand of the user) directed to the text label affordance 570. In some examples, the respective input may be a pinch input (e.g., corresponding to a contact of an index finger and thumb of a hand of the user) directed to the text label affordance 570. In some examples, in response to detecting the respective input, the electronic device 500 may generate and display a text label 574 in the three-dimensional environment 550. In some examples, the text label 574 may be displayed without text in the three-dimensional environment 550. In some examples, as shown in FIG. 5B, the text label 574 may be displayed with placeholder text (e.g., "Text") in the three-dimensional environment 550.

In some examples, in response to the display of the text label 574 in the three-dimensional environment 550, the electronic device 500 may reveal one or more text user interface elements 576. For example, as shown in FIG. 5B, the text user interface elements 576 may include one or more respective user interface elements for changing a font of the text of the text label 574. The text user interface elements 576 may include one or more respective user interface elements for changing a font size of the text of the text label 574. As another example, the text user interface elements 576 may include one or more respective user interface elements for creating a bulleted list within the text label 574. It should be understood that various additional or alternative text user interface elements may be included in the second window 571 for adjusting or controlling a respective aspect of the text of the text label 574, such as, for example, bolding, italics, underlining, strikethrough, highlighting, font color, and the like.

Figure 5C:
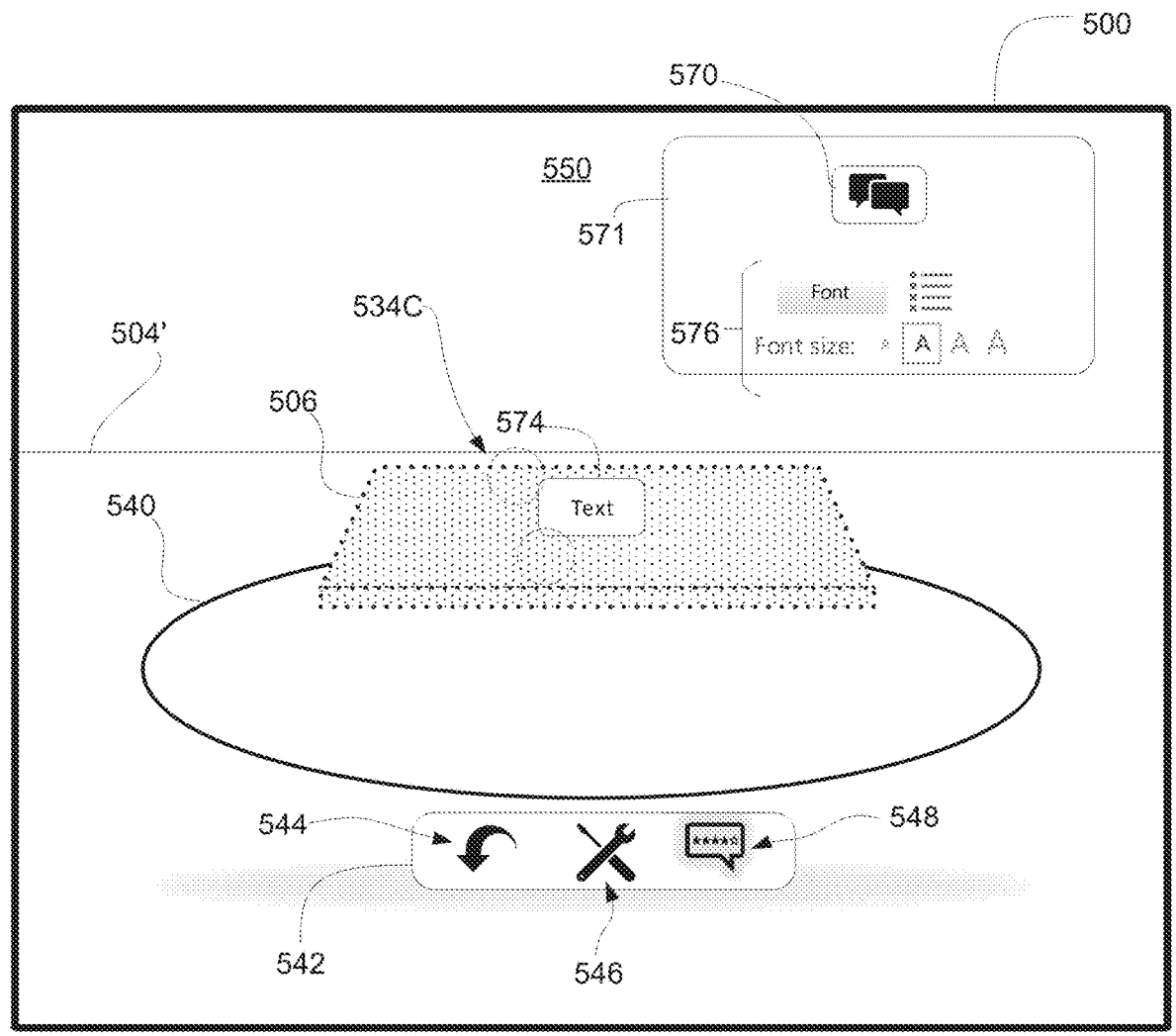

In some examples, the text label 574 is configured to be movable within the three-dimensional environment 550. For example, as shown in FIG. 5C, a pinch input 534C may be directed to the text label 574 for moving the text label 574 to a respective location in the three-dimensional environment 550. For example, as shown in FIG. 5C, in response to detecting movement of the text label 574, the electronic device 500 moves the text label 574 in accordance with the movement. The text label 574 may be moved to a respective location at, on, or near the object representation 506. As mentioned above, the text label 574 may be associated with the object representation 506. In some examples, movement of the text label 574 to the respective location associated with the object representation 506 optionally associates the text data corresponding to the text label with the metadata (e.g., the data points of the point cloud) corresponding to the object representation 506. For example, opening the data file defining and/or describing the object representation 506 on a second electronic device or as a second scene on the electronic device (e.g., corresponding to an updated version of the object representation 506) to display the object representation 506 causes the text label 574 to be displayed with the object representation 506 (e.g., with a size, position, and/or orientation relative to the object representation as provided in the editing tool). In some examples, the text label 574 (e.g., an appearance, text, size, etc. of the text label 574) may be un-editable on the second electronic device.

Figure 5D:
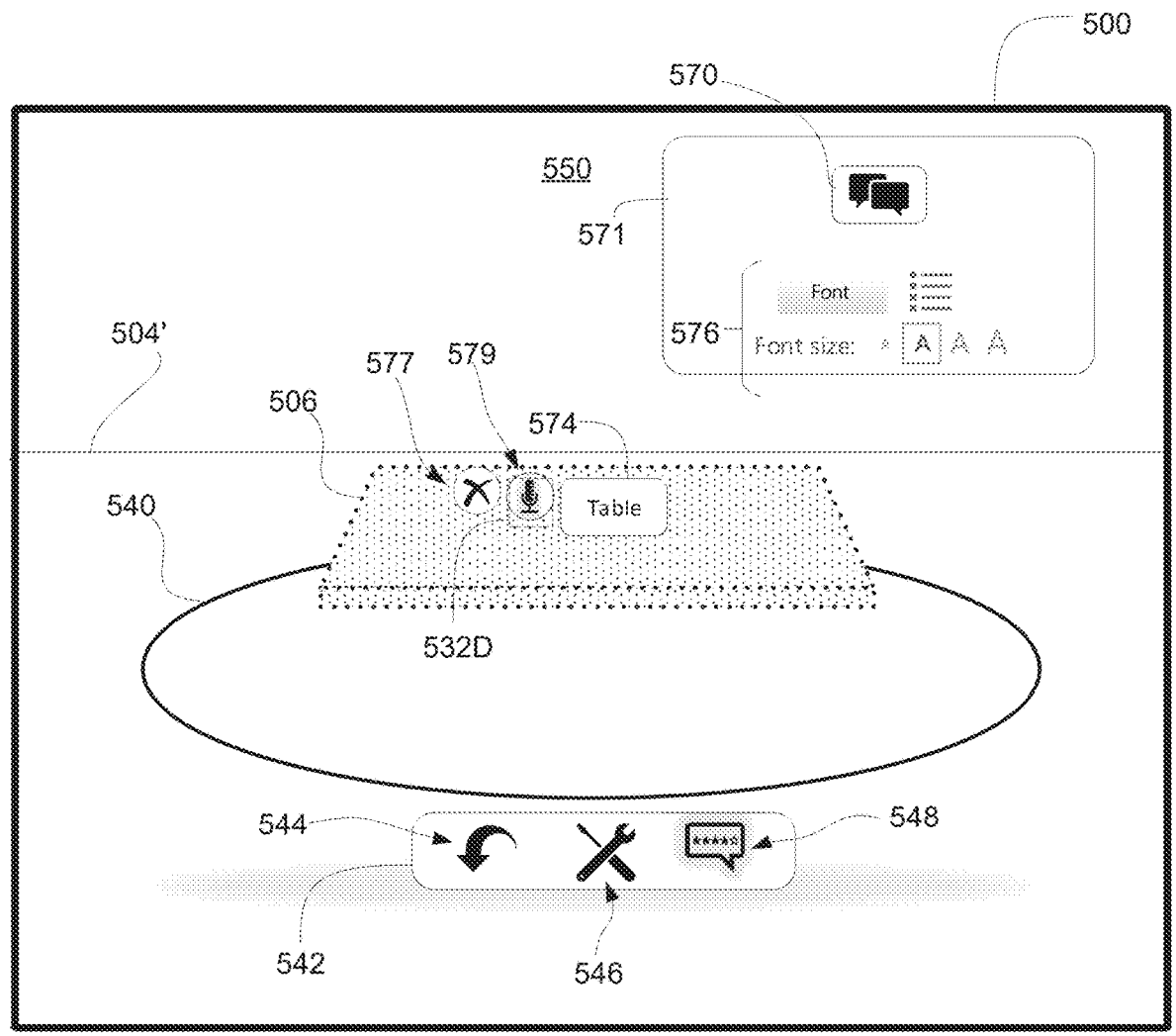

In some examples, the text of the text label 574 may be edited in the three-dimensional environment 550. In some examples, selection of the text label 574 in the three-dimensional environment 550 optionally causes the electronic device 500 to display a plurality of text control elements 577-579. For example, as shown in FIG. 5D, the plurality of text control elements includes a delete element 577 that is selectable to delete (e.g., cease display of) the text label 574 in the three-dimensional environment 550. Additionally, the plurality of text control elements optionally includes a text input element 579 that is selectable to initiate editing of the text of the text label 574 in the three-dimensional environment 550. For example, as shown in FIG. 5D, a selection input 532D may be directed to the text input element 579 in the three-dimensional environment 550. In some examples, in response to detecting the selection of the text input element 579, the electronic device 500 may provide provision for editing the text of the text label 574. For example, selection of the text input element 579 may initiate an audible cue (e.g., by emitting audio (e.g., a sound, chime, or other tune)) for the user to provide a vocal command for editing the text of the text label 574 (e.g., speaking the word "Table"). As another example, selection of the text input element may initiate provision (e.g., by displaying a cursor within the text of the text label 574 or highlighting the text of the text label 574) for the user to provide input for editing the text of the text label 574 (e.g., typing "Table" using a plurality of keys of a keyboard in communication with the electronic device 500 or a virtual keyboard displayed in the three-dimensional environment 550 in response to selection of the text input element 579). In some examples, selection of the text label 574 enables additional movement and/or reorientation of the text label 574 in the three-dimensional environment 550.

Figure 5E:
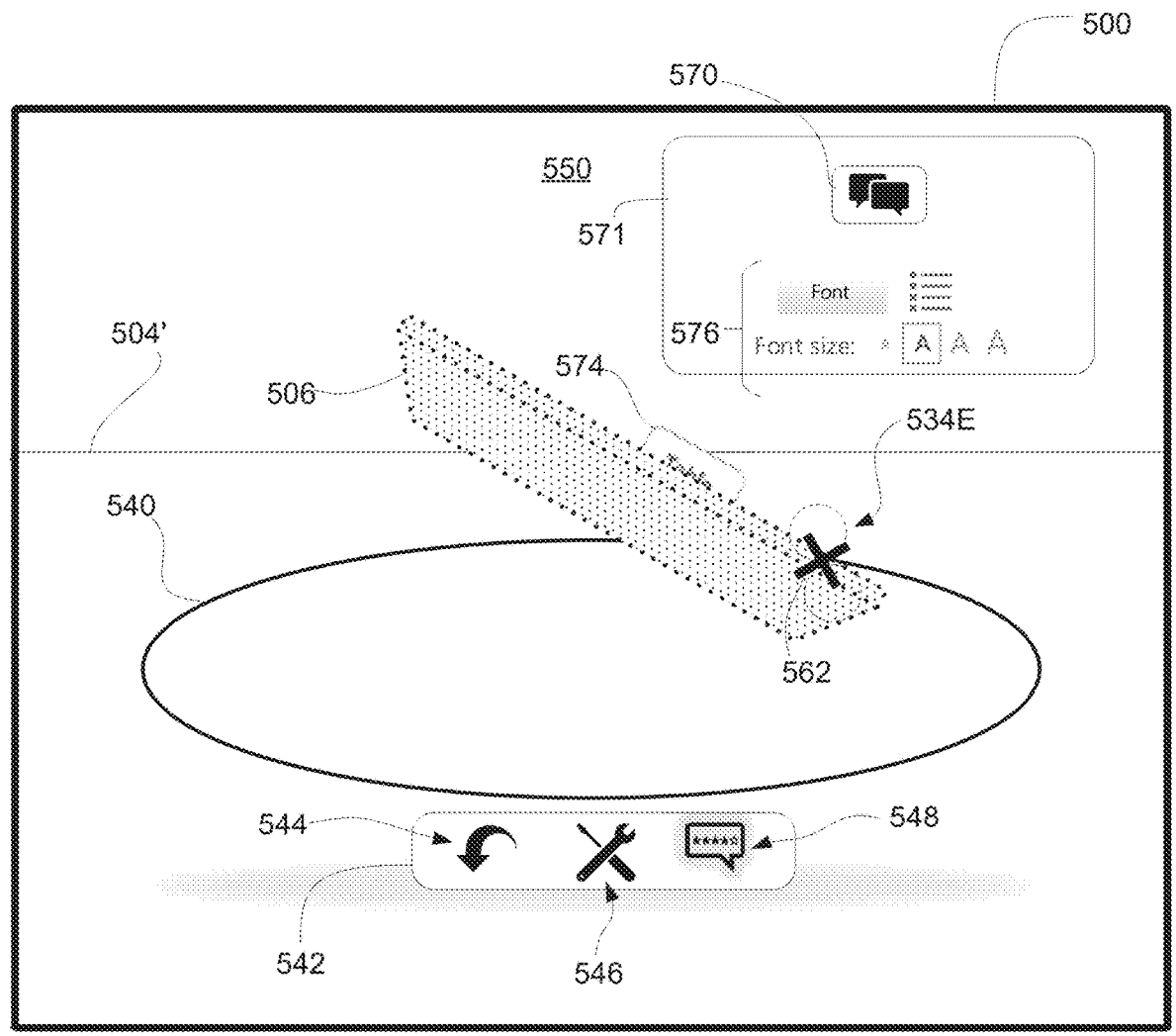

In some examples, association of the text label 574 with the object representation 506 optionally anchors the text label 574 to the object representation 506 in the three-dimensional environment 550. In some such examples, transformation (e.g., movement, reorientation, etc.) of the object representation 506 optionally transforms the text label 574 associated with the object representation 506 in accordance with the transformation of the object representation 506. For example, as shown in FIG. 5E, a pinch input 534E may be directed to a portion of the object representation 506 in the three-dimensional environment 550. In some examples, a discussed herein, the electronic device 500 may display the selection affordance 562 in response to detecting the pinch input 534E. In some examples, while maintaining the pinch input 534E, the user may move and/or reorient the object representation 506 in the three-dimensional environment 550 (e.g., by moving and/or reorienting the hand providing the pinch input 534E). As shown in FIG. 5E, in response to the transformation of the object representation 506 in the three-dimensional environment 550, the text label 574 may be transformed in the three-dimensional environment 550 with the object representation 506 (to retain its position/orientation and/or scale relative to the object representation). For example, as shown, the text label 574 is partially obstructed by the object representation 506 and is angled in a respective direction (e.g., upward) in the field of view of the three-dimensional environment 550 in accordance with the transformation of the object representation 506. Thus, as outlined above, a respective text label that has been associated with the object representation transforms with the object representation in response to a respective transformation of the object representation in the three-dimensional environment.

In some examples, the text label 574 may be a three-dimensional mesh. In some examples, a back portion of the text label 574 (e.g., a back portion with respect to a viewpoint of the user of the electronic device) may be made reflective (e.g., mirrored, glossed, etc.) to provide the back portion of the text label 574 with an opaque appearance. In some such examples, the text of the text label 574 may thus also have an opaque appearance with respect to the viewpoint of the user of the electronic device 500.

Thus, one advantage of the disclosed text annotation method is that text data may be associated with metadata of an object representation in a physical environment by generating and associating a text label with the object representation in a three-dimensional environment. For example, the text data may be saved as the metadata of a particular associated object representation in a single data file. Alternatively, the text data can be saved in a new data file and associated with a separate data file containing the object representation via custom data. Another advantage is the provided functionality of selectively annotating, cleaning up, and altering an appearance of an object representation in a three-dimensional environment to edit and modify the data file describing and/or defining the object representation in a physical environment.

It is understood that the examples shown and described herein are merely exemplary and that additional and/or alternative elements may be provided within the three-dimensional environment for interacting with the virtual object. It should be understood that the appearance, shape, form and size of each of the various user interface elements and objects shown and described herein are exemplary and that alternative appearances, shapes, forms and/or sizes may be provided. For example, the tray (e.g., tray 440/540) may be provided in an alternative shape than a circular shape, such as a rectangular shape, triangular shape, etc. In some examples, the various control affordances (e.g., the object cleanup manipulator 446 and/or the text annotation manipulator 548), user interface elements, control elements, etc. described herein may be selected vocally via user vocal commands (e.g., "select affordance" vocal command). Additionally or alternatively, in some examples, the various control affordances, user interface elements, control elements, etc. described herein may be selected and/or manipulated via user input received via one or more separate input devices in communication with the electronic device. For example, selection input may be received via physical input devices, such as a mouse, trackpad, keyboard, etc. in communication with the electronic device. Additionally, although the object representation (e.g., object representation 406/506) is primarily described herein as corresponding to a point cloud, it should be understood that other representation types are possible, such as solid or texturized representations.

Figure 6:
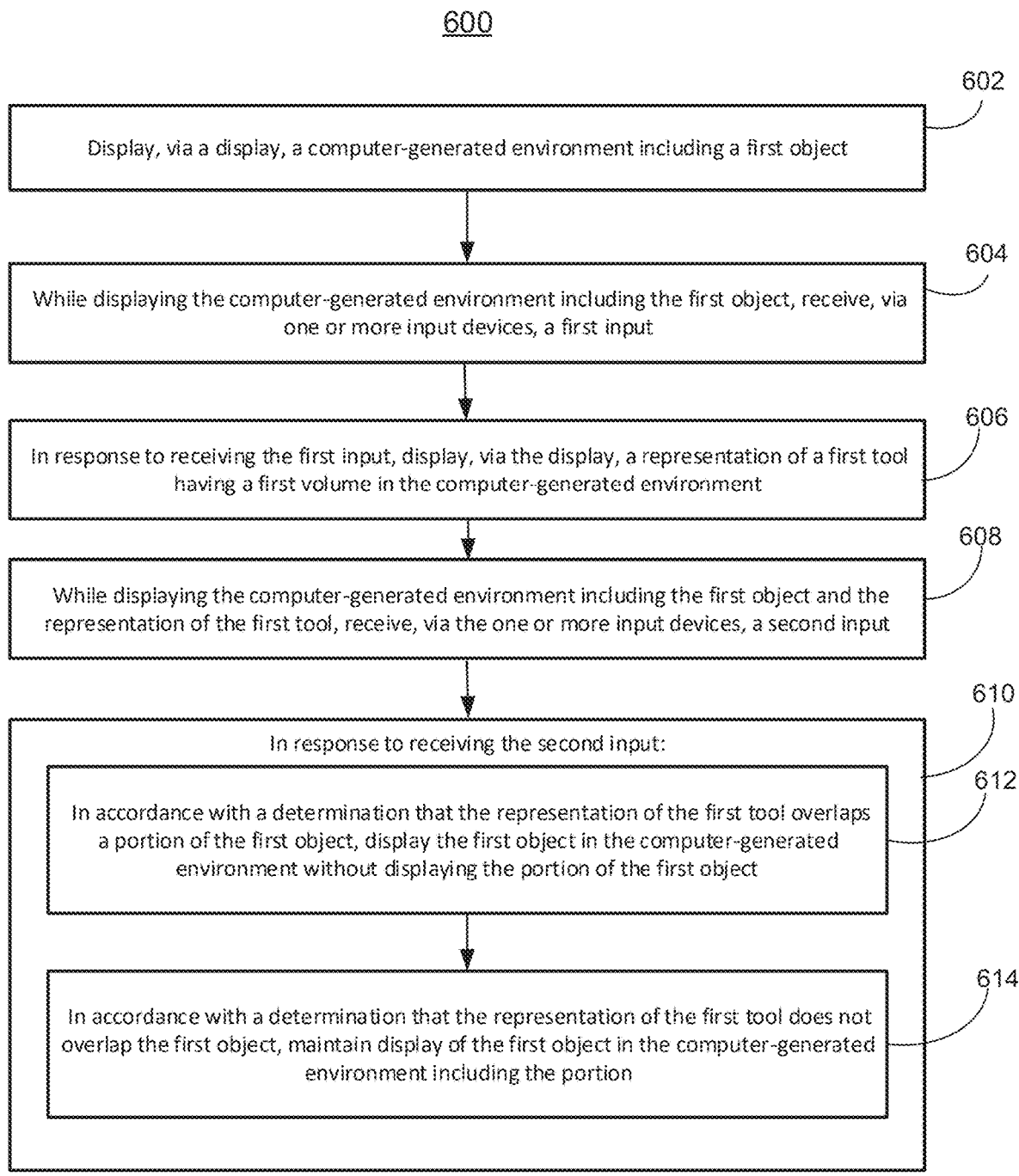
FIG. 6 illustrates a flow diagram illustrating an example process for performing object cleanup using one or more object manipulators according to some examples of the disclosure.

FIG. 6 illustrates a flow diagram illustrating an example process for performing object cleanup using one or more object manipulators according to some examples of the disclosure. In some examples, process 600 begins at an electronic device in communication with a display and one or more input devices. In some examples, the electronic device is optionally a head-mounted display similar or corresponding to device 200 of FIG. 2.

In some examples, at 602, the electronic device (e.g., corresponding to electronic device 400 in FIG. 4A) may display, via a display (e.g., via a display of the electronic device), a computer-generated environment (e.g., such as three-dimensional environment 450 in FIG. 4A) including a first object (e.g., such as virtual object 406, which is optionally a point cloud, in FIG. 4A). In some examples, the first object may be displayed in the three-dimensional environment within a graphics editing application, which optionally includes a stage (e.g., corresponding to stage 440) on which the first object is displayed, and a plurality of graphics editing tools (e.g., such as object manipulators 444-448 in FIG. 4A). In some examples, at 604, while displaying the computer-generated environment including the first object, the electronic device may receive, via one or more input devices (e.g., such as hand-tracking sensors 202 in FIG. 2), a first input. In some examples, the first input optionally corresponds to selection of a first control affordance (e.g., such as eraser tool control affordance 443 in FIG. 4B).

In some examples, at 606, in response to receiving the first input, the electronic device may display, via the display, a representation of a first tool (e.g., such as eraser tool 452 in FIG. 4B) having a first volume in the computer-generated environment. In some examples, the representation of the first tool is optionally displayed at a location that is based on a respective location of a hand of the user of the electronic device. For example, the representation of the first tool is optionally anchored to the respective location of the hand of the user in the three-dimensional environment. In some examples, at 608, while displaying the computer-generated environment including the first object and the representation of the first tool, the electronic device may receive, via the one or more input devices, a second input. In some examples, the second input may correspond to operation of the first tool. In some examples, the representation of the first tool is movable within the three-dimensional environment in response to movement of the hand of the user to which the representation of the first tool is anchored. For example, as discussed above with reference to FIG. 4G, a pinch input (e.g., pinch input 434G) directed to the representation of the first tool (e.g., eraser tool 452) is operable to remove respective portions of the first object from the three-dimensional environment.

In some examples, at 610, in response to receiving the second input, in accordance with a determination that the representation of the first tool overlaps a portion of the first object, at 612, the electronic device may display the first object in the computer-generated environment without displaying the portion of the first object. For example, as described above with respect to FIG. 4F, the representation of the first tool may overlap with a portion of the first object in the three-dimensional environment. In some examples, the portion of the first object that overlaps with the representation of the first tool may become altered in appearance (e.g., may become highlighted, as shown in FIG. 4F). In some examples, in response to receiving the second input, the portion of the first object that overlaps with the representation of the first tool may be removed from the first object in the three-dimensional environment, as shown in FIG. 4G. In some examples, at 614, in accordance with a determination that the representation of the first tool does not overlap the first object, the electronic device may maintain display of the first object in the computer-generated environment including the portion. For example, as shown in FIG. 4B, no portion of the first object (e.g., virtual object 406) ceases to be displayed in the three-dimensional environment because no portion of the representation of the first tool (e.g., eraser tool 452) overlaps with the first object.

It is understood that process 600 is an example and that more, fewer, or different operations can be performed in the same or in a different order. Additionally, the operations in process 600 described above are, optionally, implemented by running one or more functional modules in an information processing apparatus such as general-purpose processors (e.g., as described with respect to FIG. 2) or application specific chips, and/or by other components of FIG. 2.

Figure 7:
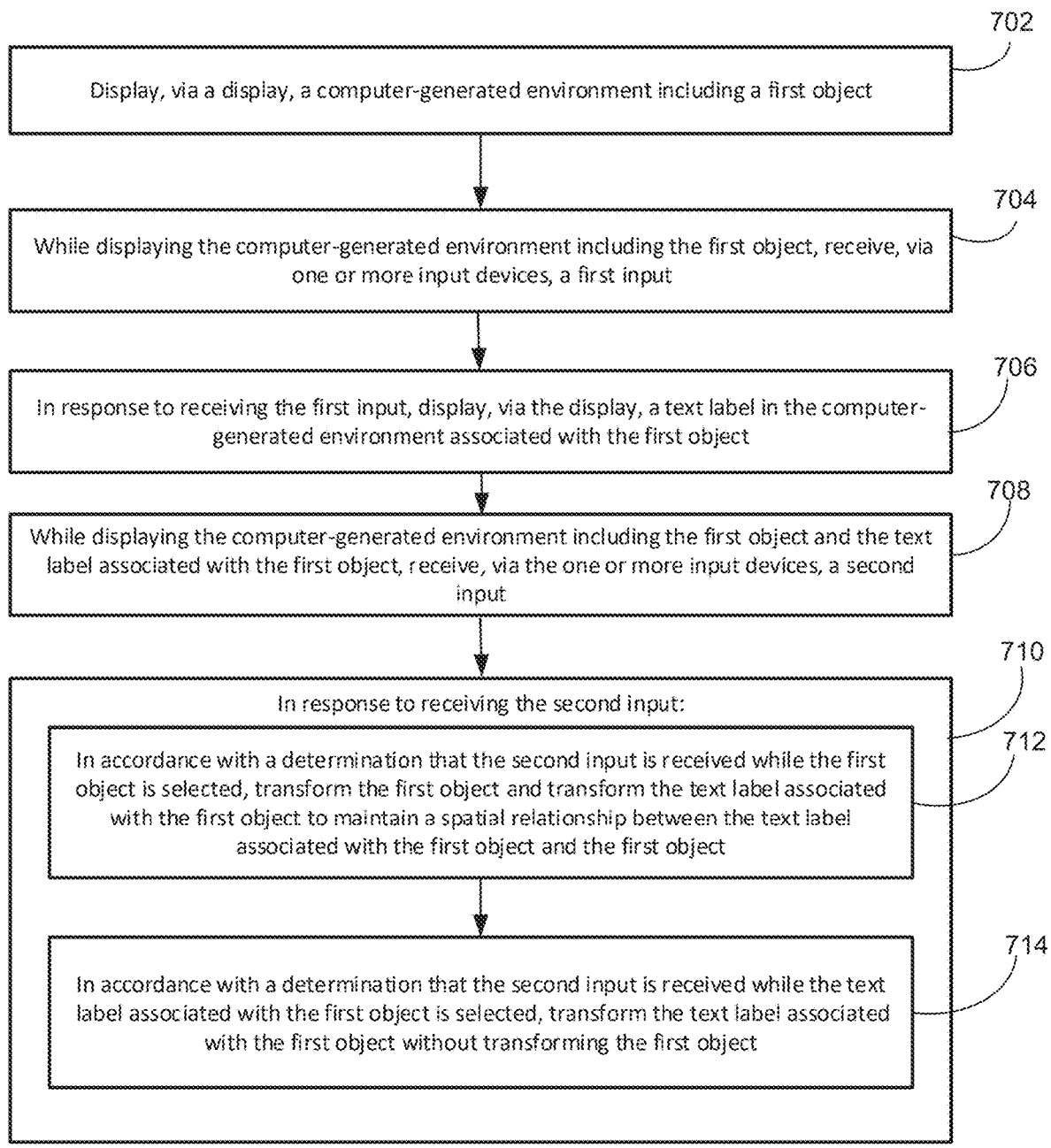
FIG. 7 illustrates a flow diagram illustrating an example process for performing text annotation using one or more object manipulators according to some examples of the disclosure.

FIG. 7 illustrates a flow diagram illustrating an example process for performing text annotation using one or more object manipulators according to some examples of the disclosure. In some examples, process 700 begins at an electronic device in communication with a display and one or more input devices. In some examples, the electronic device is optionally a head-mounted display similar or corresponding to device 200 of FIG. 2. In some examples, at 702, the electronic device may display, via a display (e.g., a display of the electronic device), a computer-generated environment (e.g., such as three-dimensional environment 550 in FIG. 5A) including a first object (e.g., such as virtual object 506, which is optionally a point cloud, as shown in FIG. 5A). In some examples, the first object may be displayed in the three-dimensional environment within a graphics editing application, which optionally includes a stage (e.g., corresponding to stage 540) on which the first object is displayed, and a plurality of graphics editing tools (e.g., such as object manipulators 444-448 in FIG. 5A). In some examples, while displaying the computer-generated environment including the first object, the electronic device may receive, via one or more input devices (e.g., such as hand-tracking sensors 202 in FIG. 2), a first input. In some examples, the first input optionally corresponds to selection of a control affordance (e.g., such as text label affordance 570 in FIG. 5B).

In some examples, at 706, in response to receiving the first input, the electronic device may display, via the display, a text label (e.g., such as text label 574 in FIG. 5B) in the computer-generated environment associated with the first object. For example, text data corresponding to the text label may be associated with metadata corresponding to the first object. In some examples, at 708, while displaying the computer-generated environment including the first object and the text label associated with the first object, the electronic device may receive, via the one or more input devices, a second input. In some examples, the second input optionally corresponds to transformation (e.g., movement and/or reorientation) of the first object in the three-dimensional environment. For example, as described above with respect to FIGS. 5C and 5E, a pinch input (e.g., such as pinch input 534C or 534E) may be directed to the text label and/or the first object in the three-dimensional environment to initiate transformation of the text label and/or the first object in accordance with movement of a hand of the user providing the pinch input.

In some examples, in response to receiving the second input, at 710, in accordance with a determination that the second input is received while the first object is selected, at 712, the electronic device may transform the first object and transform the text label associated with the first object to maintain a spatial relationship between the text label associated with the first object and the first object. In some examples, the display of the text label is optionally fixed to a respective portion of the first object, such that transformation input directed to the first object correspondingly transforms the text label associated with the first object. For example, as described above with reference to FIG. 5E, while the pinch input is directed to the first object (e.g., virtual object 506), the first object and the text label (e.g., text label 574) are moved and/or reoriented in the three-dimensional environment in accordance with the movement and/or reorientation of the hand providing the pinch input. In some examples, at 714, in accordance with a determination that the second input is received while the text label associated with the first object is selected, the electronic device may transform the text label associated with the first object without transforming the first object. For example, as described above with reference to FIG. 5C, as the pinch input (e.g., pinch input 534C) is directed to the text label (e.g., text label 574), transformation of the hand of the user providing the pinch input optionally causes the text label to transform within the three-dimensional environment, without also transforming the first object (e.g., virtual object 506) in the three-dimensional environment.

It is understood that process 700 is an example and that more, fewer, or different operations can be performed in the same or in a different order. Additionally, the operations in process 700 described above are, optionally, implemented by running one or more functional modules in an information processing apparatus such as general-purpose processors (e.g., as described with respect to FIG. 2) or application specific chips, and/or by other components of FIG. 2.

Therefore, according to the above, some examples of the disclosure are directed to a method of performing object cleanup in a three-dimensional environment. The method may comprise: at an electronic device in communication with a display and one or more input devices: displaying, via the display, a computer-generated environment including a first object; while displaying the computer-generated environment including the first object, receiving, via the one or more input devices, a first input; in response to receiving the first input, displaying, via the display, a representation of a first tool having a first volume in the computer-generated environment; while displaying the computer-generated environment including the first object and the representation of the first tool, receiving, via the one or more input devices, a second input; and in response to receiving the second input: in accordance with a determination that the representation of the first tool overlaps a portion of the first object, displaying the first object in the computer-generated environment without displaying the portion of the first object; and in accordance with a determination that the representation of the first tool does not overlap the first object, maintaining display of the first object in the computer-generated environment including the portion.

Additionally or alternatively, in some examples, the method may further comprise while displaying the computer-generated environment including the first object and the representation of the first tool, receiving, via the one or more input devices, a third input corresponding to a movement of the first object in the computer-generated environment and a fourth input corresponding to movement of the first tool in the computer-generated environment. Additionally or alternatively, in some examples, the third input and the fourth input are performed at least partially concurrently. Additionally or alternatively, in some examples, the third input corresponds to movement of a first hand of a user and the third input corresponds to movement of a second hand of the user. Additionally or alternatively, in some examples, the method may further comprise in response to receiving the third input and the fourth input, at least partially concurrently moving the first object from a first position or a first orientation to a second position or a second orientation, different from the first position or from the first orientation, respectively, in accordance with the third input, and moving the first tool in accordance with the fourth input.

Additionally or alternatively, in some examples, the method may further comprise: while displaying the computer-generated environment including the first object and the representation of the first tool, receiving, via the one or more input devices, a third input; and in response to receiving the third input: displaying, via the display, a selection user interface element overlaid on a respective location of the first object, the respective location based on a portion of a body of the user of the electronic device; and in accordance with a determination that the third input corresponds to a rotation of the first object in the computer-generated environment, rotating the first object from a first orientation to a second orientation, different from the first orientation in accordance with the third input.

Additionally or alternatively, in some examples, the method may further comprise: while displaying the computer-generated environment including the first object having the second orientation and the representation of the first tool, receiving, via the one or more input devices, a fourth input; and in response to receiving the fourth input: in accordance with a determination that the representation of the first tool overlaps a second portion of the first object, different from the portion, displaying the first object in the computer-generated environment without displaying the second portion of the first object; and in accordance with a determination that the representation of the first tool does not overlap the first object, maintaining display of the first object in the computer-generated environment including the second portion.

Additionally or alternatively, in some examples, in accordance with the determination that the representation of the first tool overlaps the portion of the first object, the second input includes: moving the representation of the first tool in the computer-generated environment to overlap the portion of the first object; and operating the first tool.

Additionally or alternatively, in some examples, the first object corresponds to a scan of a real-world object.

Additionally or alternatively, in some examples, the electronic device is a head-mounted display.

Additionally or alternatively, in some examples, the representation of the first tool is displayed at a location in the computer-generated environment that is based on a respective portion of a body of a user of the electronic device.

Additionally or alternatively, in some examples, the computer-generated environment includes a tray and the first object is disposed on a surface of the tray.

Additionally or alternatively, in some examples, the method may further comprise, in accordance with the determination that the representation of the first tool overlaps the portion of the first object, before displaying the first object in the computer-generated environment without displaying the portion of the first object, changing an appearance of the portion of the first object in the computer-generated environment.

Additionally or alternatively, in some examples, the computer-generated environment includes a first window containing one or more user interface elements. Additionally or alternatively, in some examples, the first input corresponds to a selection of a first user interface element of the one or more user interface elements.

Additionally or alternatively, in some examples, the representation of the first tool has a first size in the computer-generated environment. Additionally or alternatively, in some examples, the method may further comprise: while displaying the computer-generated environment including the first object and the representation of the first tool, receiving, via the one or more input devices, a third input; and in response to receiving the third input: in accordance with a determination that the third input corresponds to a request to increase a size of the representation of the first tool, increasing the size of the representation of the first tool from the first size to a second size, larger than the first size in accordance with the third input; and in accordance with a determination that the third input corresponds to a request to decrease the size of the representation of the first tool, decreasing the size of the representation of the first tool from the first size to a third size, smaller than the first size in accordance with the third input.

Additionally or alternatively, in some examples, the third input includes adjusting a second user interface element of the one or more user interface elements in the first window. Additionally or alternatively, in some examples, in accordance with a determination that the adjustment of the second user interface element is in a first respective direction, the third input corresponds to the request to increase the size of the representation of the first tool. Additionally or alternatively, in some examples, in accordance with a determination that the adjustment of the second user interface element is in a second respective direction, different from the first respective direction, the third input corresponds to the request to decrease the size of the representation of the first tool.

Additionally or alternatively, in some examples, the one or more user interface elements includes a second user interface element. Additionally or alternatively, in some examples, the method may further comprise: while displaying the computer-generated environment including the first object and the representation of the first tool, receiving, via the one or more input devices, a third input corresponding to a selection of the second user interface element; and in response to receiving the third input, changing a shape of the representation of the first tool from a first shape to a second shape, different from the first shape in accordance with the third input. Additionally or alternatively, in some examples, the representation of the first tool having the second shape has a second volume, different from the first volume.

Additionally or alternatively, in some examples, the first object corresponds to a point cloud representation including a plurality of object data points in the computer-generated environment.

Additionally or alternatively, in some examples, the method may further comprise: while displaying the computer-generated environment including the first object, receiving, via the one or more input devices, a third input; and in response to receiving the third input, displaying, via the display, a second tool, different from the first tool, including a respective user interface element in the computer-generated environment.

Additionally or alternatively, in some examples, the method may further comprise: while displaying the computer-generated environment including the first object and the second tool, receiving, via the one or more input devices, a fourth input corresponding to a request to change a size of each of the plurality of object data points; and in response to receiving the fourth input: in accordance with a determination that the fourth input corresponds to adjustment of the respective user interface element in a first respective direction, increasing the size of each of the plurality of object data points from a first size to a second size, larger than the first size; and in accordance with a determination that the fourth input corresponds to adjustment of the respective user interface element in a second respective direction, different from the first respective direction, decreasing the size of each of the plurality of object data points from the first size to a third size, smaller than the first size.

Some examples of the disclosure are directed to an electronic device. The electronic device can comprise: one or more processors; memory; and one or more programs stored in the memory and configured to be executed by the one or more processors, the one or more programs including instructions for performing any of the above methods.

Some examples of the disclosure are directed to a non-transitory computer readable storage medium. The non-transitory computer readable storage medium can store one or more programs, the one or more programs comprising instructions, which when executed by one or more processors of an electronic device, cause the electronic device to perform any of the above methods.

Some examples of the disclosure are directed to an electronic device. The electronic device can comprise: one or more processors; memory; and means for performing any of the above methods.

Some examples of the disclosure are directed to an information processing apparatus for use in an electronic device. The information processing apparatus can comprise means for performing any of the above methods.

Some examples of the disclosure are directed to a method of performing text annotation in a three-dimensional environment. The method may comprise: at an electronic device in communication with a display and one or more input devices: displaying, via the display, a computer-generated environment including a first object; while displaying the computer-generated environment including the first object, receiving, via the one or more input devices, a first input; in response to receiving the first input, displaying, via the display, a text label in the computer-generated environment associated with the first object; while displaying the computer-generated environment including the first object and the text label associated with the first object, receiving, via the one or more input devices, a second input; and in response to receiving the second input: in accordance with a determination that the second input is received while the first object is selected, transforming the first object and transforming the text label associated with the first object to maintain a spatial relationship between the text label associated with the first object and the first object; and in accordance with a determination that the second input is received while the text label associated with the first object is selected, transforming the text label associated with the first object without transforming the first object.

Additionally or alternatively, in some examples, the first object corresponds to a scan of a real-world object.

Additionally or alternatively, in some examples, the electronic device is a head-mounted display.

Additionally or alternatively, in some examples, the text label is displayed at a location in the computer-generated environment that is based on a respective portion of a body of a user of the electronic device.

Additionally or alternatively, in some examples, the second input corresponds to a movement input. Additionally or alternatively, in some examples, in response to receiving the second input: in accordance with the determination that the second input is received while the first object is selected, transforming the first object and transforming the text label associated with the first object to maintain the spatial relationship between the text label associated with the first object and the first object comprises moving the first object and the text label associated with the first object from a first location to a second location away from the first location in the computer-generated environment in accordance with the second input; and in accordance with the determination that the second input is received while the text label associated with the first object is selected, transforming the text label associated with the first object without transforming the first object comprises: moving the text label associated with the first object from the first location to the second location in the computer-generated environment in accordance with the second input; and maintaining display of the first object at the first location in the computer-generated environment.

Additionally or alternatively, in some examples, the second input corresponds to a rotation input. Additionally or alternatively, in some examples, in response to receiving the second input: in accordance with the determination that the second input is received while the first object is selected, transforming the first object and transforming the text label associated with the first object to maintain the spatial relationship between the text label associated with the first object and the first object comprises rotating the first object and the text label associated with the first object from a first orientation to a second orientation, different from the first orientation, in the computer-generated environment in accordance with the second input; and in accordance with the determination that the second input is received while the text label associated with the first object is selected, transforming the text label associated with the first object without transforming the first object comprises: rotating the text label associated with the first object from the first orientation to the second orientation in the computer-generated environment in accordance with the second input; and maintaining display of the first object with the first orientation in the computer-generated environment.

Additionally or alternatively, in some examples, in response to receiving the second input, in accordance with the determination that the second input is received while the first object is selected, transforming the first object and transforming the text label associated with the first object to maintain the spatial relationship between the text label associated with the first object and the first object further comprises, in accordance with a determination that the rotations of the first object and the text label associated with the first object causes the text label associated with the first object to exceed a viewpoint associated with the electronic device, displaying the first object in the computer-generated environment without displaying the text label associated with the first object.

Additionally or alternatively, in some examples, the second input corresponds to a scaling input. Additionally or alternatively, in response to receiving the second input: in accordance with the determination that the second input is received while the first object is selected, transforming the first object and transforming the text label associated with the first object to maintain the spatial relationship between the text label associated with the first object and the first object comprises changing sizes of the first object and the text label associated with the first object from a first size to a second size, different from the first size, in the computer-generated environment in accordance with the second input; and in accordance with the determination that the second input is received while the text label associated with the first object is selected, transforming the text label associated with the first object without transforming the first object comprises: changing the size of the text label associated with the first object from the first size to the second size in the computer-generated environment in accordance with the second input; and maintaining display of the first object at the first size in the computer-generated environment.

Additionally or alternatively, in some examples, the method may further comprise: while displaying the computer-generated environment including the first object and the text label associated with the first object, receiving, via the one or more input devices, a third input corresponding to a request to alter a text of the text label associated with the first object; and in response to receiving the third input, changing the text of the text label associated with the first object in accordance with the third input.

Additionally or alternatively, in some examples, the one or more input devices include a microphone. Additionally or alternatively, in some examples, the computer-generated environment includes a respective user interface element associated with the text label associated with the first object. Additionally or alternatively, in some examples, the third input includes: a selection of the respective user interface element; and a vocal input received via the microphone.

Additionally or alternatively, in some examples, the one or more input devices include a keyboard. Additionally or alternatively, in some examples, the third input includes: a selection of the text label associated with the first object; and text input received via one or more keys associated with the keyboard.

Additionally or alternatively, in some examples, the first object corresponds to a point cloud representation including a plurality of object data points in the computer-generated environment. Additionally or alternatively, in some examples, the text label corresponds to text data associated with the plurality of object data points in the computer-generated environment.

Additionally or alternatively, in some examples, the method may further comprise: while displaying the computer-generated environment including the first object and the text label associated with the first object, receiving, via the one or more input devices, a third input; and in response to receiving the third input, displaying, via the display, a second text label in the computer-generated environment associated with the first object.

Additionally or alternatively, in some examples, the method may further comprise: while displaying the computer-generated environment including the first object, the text label associated with the first object, and the second text label associated with the first object, receiving, via the one or more input devices, a fourth input; and in response to receiving the fourth input: in accordance with a determination that the fourth input is received while the first object is selected, transforming the first object, transforming the text label associated with the first object, and transforming the second text label associated with the first object to maintain: the spatial relationship between the text label associated with the first object and the first object, and a second spatial relationship between the second text label associated with the first object and the first object; and in accordance with a determination that the second input is received while the second text label associated with the first object is selected, transforming the second text label associated with the first object without transforming the first object and without transforming the text label associated with the first object.

Some examples of the disclosure are directed to an electronic device. The electronic device can comprise: one or more processors; memory; and one or more programs stored in the memory and configured to be executed by the one or more processors, the one or more programs including instructions for performing any of the above methods.

Some examples of the disclosure are directed to a non-transitory computer readable storage medium. The non-transitory computer readable storage medium can store one or more programs, the one or more programs comprising instructions, which when executed by one or more processors of an electronic device, cause the electronic device to perform any of the above methods.

Some examples of the disclosure are directed to an electronic device. The electronic device can comprise: one or more processors; memory; and means for performing any of the above methods.

Some examples of the disclosure are directed to an information processing apparatus for use in an electronic device. The information processing apparatus can comprise means for performing any of the above methods.

The foregoing description, for purpose of explanation, has been described with reference to specific examples. However, the illustrative discussions above are not intended to be exhaustive or to limit the invention to the precise forms disclosed. Many modifications and variations are possible in view of the above teachings. The examples were chosen and described in order to best explain the principles of the invention and its practical applications, to thereby enable others skilled in the art to best use the invention and various described examples with various modifications as are suited to the particular use contemplated.

What is claimed is:

1. A method comprising:
at an electronic device in communication with a display and one or more input devices:
displaying, via the display, a three-dimensional environment including a first virtual object;
while displaying the three-dimensional environment including the first virtual object, receiving, via the one or more input devices, a first input;
in response to receiving the first input, displaying, via the display, a text label in the three-dimensional environment associated with the first virtual object;
while displaying the three-dimensional environment including the first virtual object and the text label associated with the first virtual object, receiving, via the one or more input devices, a second input; and
in response to receiving the second input:
in accordance with a determination that the second input is received while the first virtual object is selected, transforming the first virtual object and transforming the text label associated with the first virtual object to maintain a spatial relationship between the text label associated with the first virtual object and the first virtual object; and
in accordance with a determination that the second input is received while the text label associated with the first virtual object is selected, transforming the text label associated with the first virtual object without transforming the first virtual object.

2. The method of claim 1, wherein the first virtual object corresponds to a scan of a real-world object.

3. The method of claim 1, wherein the electronic device is a head-mounted display.

4. The method of claim 1, wherein the text label is displayed at a location in the three-dimensional environment that is based on a respective portion of a body of a user of the electronic device.

5. The method of claim 1, wherein:
the second input corresponds to a movement input; and
in response to receiving the second input:
in accordance with the determination that the second input is received while the first virtual object is selected, transforming the first virtual object and transforming the text label associated with the first virtual object to maintain the spatial relationship between the text label associated with the first virtual object and the first virtual object comprises:
    moving the first virtual object and the text label associated with the first virtual object from a first location to a second location away from the first location in the three-dimensional environment in accordance with the second input; and
in accordance with the determination that the second input is received while the text label associated with the first virtual object is selected, transforming the text label associated with the first virtual object without transforming the first virtual object comprises:
    moving the text label associated with the first virtual object from the first location to the second location in the three-dimensional environment in accordance with the second input; and
    maintaining display of the first virtual object at the first location in the three-dimensional environment.

6. The method of claim 1, wherein:
the second input corresponds to a rotation input; and
in response to receiving the second input:
  in accordance with the determination that the second input is received while the first virtual object is selected, transforming the first virtual object and transforming the text label associated with the first virtual object to maintain the spatial relationship between the text label associated with the first virtual object and the first virtual object comprises:
    rotating the first virtual object and the text label associated with the first virtual object from a first orientation to a second orientation, different from the first orientation, in the three-dimensional environment in accordance with the second input; and
  in accordance with the determination that the second input is received while the text label associated with the first virtual object is selected, transforming the text label associated with the first virtual object without transforming the first virtual object comprises:
    rotating the text label associated with the first virtual object from the first orientation to the second orientation in the three-dimensional environment in accordance with the second input; and
    maintaining display of the first virtual object with the first orientation in the three-dimensional environment.

7. The method of claim 6, wherein:
in response to receiving the second input:
  in accordance with the determination that the second input is received while the first virtual object is selected, transforming the first virtual object and transforming the text label associated with the first virtual object to maintain the spatial relationship between the text label associated with the first virtual object and the first virtual object further comprises:
    in accordance with a determination that the rotations of the first virtual object and the text label associated with the first virtual object causes the text label associated with the first virtual object to exceed a viewpoint associated with the electronic device, displaying the first virtual object in the three-dimensional environment without displaying the text label associated with the first virtual object.

8. The method of claim 1, wherein:
the second input corresponds to a scaling input; and
in response to receiving the second input:
  in accordance with the determination that the second input is received while the first virtual object is selected, transforming the first virtual object and transforming the text label associated with the first virtual object to maintain the spatial relationship between the text label associated with the first virtual object and the first virtual object comprises:
    changing sizes of the first virtual object and the text label associated with the first virtual object from a first size to a second size, different from the first size, in the three-dimensional environment in accordance with the second input; and
  in accordance with the determination that the second input is received while the text label associated with the first virtual object is selected, transforming the text label associated with the first virtual object without transforming the first virtual object comprises:
    changing the size of the text label associated with the first virtual object from the first size to the second size in the three-dimensional environment in accordance with the second input; and
    maintaining display of the first virtual object at the first size in the three-dimensional environment.

9. The method of claim 1, further comprising:
while displaying the three-dimensional environment including the first virtual object and the text label associated with the first virtual object, receiving, via the one or more input devices, a third input corresponding to a request to alter a text of the text label associated with the first virtual object; and
in response to receiving the third input, changing the text of the text label associated with the first virtual object in accordance with the third input.

10. The method of claim 9, wherein:
the one or more input devices include a microphone;
the three-dimensional environment includes a respective user interface element associated with the text label associated with the first virtual object; and
the third input includes:
  a selection of the respective user interface element; and
  a vocal input received via the microphone.

11. The method of claim 9, wherein:
the one or more input devices include a keyboard; and
the third input includes:
  a selection of the text label associated with the first virtual object; and
  text input received via one or more keys associated with the keyboard.

12. The method of claim 1, wherein:
the first virtual object corresponds to a point cloud representation including a plurality of object data points in the three-dimensional environment; and
the text label corresponds to text data associated with the plurality of object data points in the three-dimensional environment.

13. The method of claim 1, further comprising:
while displaying the three-dimensional environment including the first virtual object and the text label associated with the first virtual object, receiving, via the one or more input devices, a third input; and
in response to receiving the third input, displaying, via the display, a second text label in the three-dimensional environment associated with the first virtual object.

14. The method of claim 13, further comprising:
while displaying the three-dimensional environment including the first virtual object, the text label associated with the first virtual object, and the second text label associated with the first virtual object, receiving, via the one or more input devices, a fourth input; and
in response to receiving the fourth input:
in accordance with a determination that the fourth input is received while the first virtual object is selected, transforming the first virtual object, transforming the text label associated with the first virtual object, and transforming the second text label associated with the first virtual object to maintain:
the spatial relationship between the text label associated with the first virtual object and the first virtual object, and
a second spatial relationship between the second text label associated with the first virtual object and the first virtual object; and
in accordance with a determination that the second input is received while the second text label associated with the first virtual object is selected, transforming the second text label associated with the first virtual object without transforming the first virtual object and without transforming the text label associated with the first virtual object.

15. An electronic device comprising:
one or more processors;
memory; and
one or more programs stored in the memory and configured to be executed by the one or more processors, the one or more programs including instructions for:
displaying, via a display, a three-dimensional environment including a first virtual object;
while displaying the three-dimensional environment including the first virtual object, receiving, via one or more input devices, a first input;
in response to receiving the first input, displaying, via the display, a text label in the three-dimensional environment associated with the first virtual object;
while displaying the three-dimensional environment including the first virtual object and the text label associated with the first virtual object, receiving, via the one or more input devices, a second input; and
in response to receiving the second input:
in accordance with a determination that the second input is received while the first virtual object is selected, transforming the first virtual object and transforming the text label associated with the first virtual object to maintain a spatial relationship between the text label associated with the first virtual object and the first virtual object; and
in accordance with a determination that the second input is received while the text label associated with the first virtual object is selected, transforming the text label associated with the first virtual object without transforming the first virtual object.

16. The electronic device of claim 15, wherein the text label is displayed at a location in the three-dimensional environment that is based on a respective portion of a body of a user of the electronic device.

17. The electronic device of claim 15, wherein:
the first virtual object corresponds to a point cloud representation including a plurality of object data points in the three-dimensional environment; and
the text label corresponds to text data associated with the plurality of object data points in the three-dimensional environment.

18. A non-transitory computer readable storage medium storing one or more programs, the one or more programs comprising instructions, which when executed by one or more processors of an electronic device, cause the electronic device to:
display, via a display, a three-dimensional environment including a first virtual object;
while displaying the three-dimensional environment including the first virtual object, receive, via one or more input devices, a first input;
in response to receiving the first input, display, via the display, a text label in the three-dimensional environment associated with the first virtual object;
while displaying the three-dimensional environment including the first virtual object and the text label associated with the first virtual object, receive, via the one or more input devices, a second input; and
in response to receiving the second input:
in accordance with a determination that the second input is received while the first virtual object is selected, transform the first virtual object and transform the text label associated with the first virtual object to maintain a spatial relationship between the text label associated with the first virtual object and the first virtual object; and
in accordance with a determination that the second input is received while the text label associated with the first virtual object is selected, transform the text label associated with the first virtual object without transforming the first virtual object.

19. The non-transitory computer readable storage medium of claim 18, wherein the instructions further cause the electronic device to:
while displaying the three-dimensional environment including the first virtual object and the text label associated with the first virtual object, receive, via the one or more input devices, a third input; and
in response to receiving the third input, display, via the display, a second text label in the three-dimensional environment associated with the first virtual object.

20. The non-transitory computer readable storage medium of claim 19, wherein the instructions further cause the electronic device to:
while displaying the three-dimensional environment including the first virtual object, the text label associated with the first virtual object, and the second text label associated with the first virtual object, receive, via the one or more input devices, a fourth input; and
in response to receiving the fourth input:
in accordance with a determination that the fourth input is received while the first virtual object is selected, transforming the first virtual object, transform the text label associated with the first virtual object, and transform the second text label associated with the first virtual object to maintain:
the spatial relationship between the text label associated with the first virtual object and the first virtual object, and
a second spatial relationship between the second text label associated with the first virtual object and the first virtual object; and
in accordance with a determination that the second input is received while the second text label associated with the first virtual object is selected, transform the second text label associated with the first virtual object without transforming the first virtual object and without transforming the text label associated with the first virtual object.

* * * * *